(12) United States Patent
Kim et al.

(10) Patent No.: US 11,476,702 B2
(45) Date of Patent: Oct. 18, 2022

(54) METHOD FOR CONTROLLING POWER SUPPLY SYSTEM

(71) Applicant: LS ELECTRIC CO., LTD., Anyang-si (KR)

(72) Inventors: Jihong Kim, Anyang-si (KR); Kwangkyu Hwang, Anyang-si (KR); Dohyun Kim, Anyang-si (KR); Minjun Park, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 0 days.

(21) Appl. No.: 17/275,019

(22) PCT Filed: Sep. 11, 2019

(86) PCT No.: PCT/KR2019/011782
§ 371 (c)(1),
(2) Date: Mar. 10, 2021

(87) PCT Pub. No.: WO2020/055136
PCT Pub. Date: Mar. 19, 2020

(65) Prior Publication Data
US 2022/0069614 A1    Mar. 3, 2022

(30) Foreign Application Priority Data

Sep. 13, 2018  (KR) .................. 10-2018-0109544
Sep. 13, 2018  (KR) .................. 10-2018-0109812

(51) Int. Cl.
*H02J 9/06*    (2006.01)
*H02J 3/38*    (2006.01)
(Continued)

(52) U.S. Cl.
CPC ............ *H02J 9/062* (2013.01); *H02H 1/0007* (2013.01); *H02H 7/266* (2013.01); *H02J 3/381* (2013.01)

(58) Field of Classification Search
CPC ........ H02J 9/062; H02J 3/381; H02J 2300/24; H02J 1/12; H02J 7/35; H02J 9/061;
(Continued)

(56) References Cited

U.S. PATENT DOCUMENTS 9,013,063 B2    4/2015  Sato et al.
2009/0072623 A1  3/2009  Liao
(Continued)

FOREIGN PATENT DOCUMENTS

EP    2442417 B1    3/2016
JP    H11103539 A   4/1999
(Continued)

OTHER PUBLICATIONS

International Search Report for related International Application No. PCT/KR2019/011782; report dated Mar. 19, 2020; (5 pages).
(Continued)

*Primary Examiner* — Toan T Vu
(74) *Attorney, Agent, or Firm* — K&L Gates LLP

(57) ABSTRACT

The present specification relates to an uninterruptible power supply device, an uninterruptible power supply system and a method for controlling the uninterruptible power supply system, and relates to a power supply device comprising a circuit breaker for switching connection to a power bus, thereby controlling the reception and supply of the power by opening and closing the circuit breaker according to various situations occurring in a system, a power supply system and a method for controlling the power supply system.

29 Claims, 23 Drawing Sheets

(51) Int. Cl.
*H02H 1/00* (2006.01)
*H02H 7/26* (2006.01)

(58) Field of Classification Search
CPC ....... H02J 1/086; H02H 1/0007; H02H 7/266; Y02B 10/70; Y02E 10/56
See application file for complete search history.

(56) References Cited

U.S. PATENT DOCUMENTS

| | | |
|---|---|---|
| 2011/0254368 A1 | 10/2011 | Boe |
| 2012/0013193 A1 | 1/2012 | Sato et al. |
| 2014/0240880 A1 | 8/2014 | Chen et al. |

FOREIGN PATENT DOCUMENTS

| | | | |
|---|---|---|---|
| JP | H11266532 A | | 9/1999 |
| JP | 2001327100 A | | 11/2001 |
| JP | 2003309936 A | | 10/2003 |
| KR | 101212262 B1 | | 12/2012 |
| KR | 101223260 | * | 1/2013 |
| KR | 101223260 B1 | | 1/2013 |
| KR | 20170015540 A | | 2/2017 |

OTHER PUBLICATIONS

Written Opinion for related International Application No. PCT/KR2019/011782; report dated Mar. 19, 2020; (5 pages).
Korean Notice of Allowance for related Korean Application No. 10-2018-0109544; action dated Nov. 18, 2021; (2 pages).
Korean Office Action for related Korean Application No. 10-2018-0109544; action dated May 7, 2021; (5 pages).
Japanese Office Action for related Japanese Application No. 2021-513907; action dated May 24, 2022; (4 pages).
Extended European Search Report for related European Application No. 19859467.3; action dated Jul. 11, 2022; (9 pages).

* cited by examiner

METHOD FOR CONTROLLING POWER SUPPLY SYSTEM

CROSS-REFERENCE TO RELATED APPLICATIONS

This application is the National Stage filing under 35 U.S.C. 371 of International Application No. PCT/KR2019/011782, filed on Sep. 11, 2019, which claims the benefit of earlier filing date and right of priority to Korean Application No. 10-2018-0109544, filed on Sep. 13, 2018, and Korean Application No. 10-2018-0109812, filed Sep. 13, 2018, the contents of which are all hereby incorporated by reference herein in their entirety.

FIELD

The present disclosure relates to a power supply device that enables an uninterruptible power supply, a power supply system, and a method for controlling the power supply system.

BACKGROUND

A technology that is the background of the present disclosure relates to a system including a plurality of power supply devices.

A system in which a plurality of power supply devices supply power to each load may be connected in common through a DC bus line. When connected to a common bus line as described above, there is an advantage capable of receiving and supplying power from and to an adjacent power device through the DC bus line. However, when the system is configured in this way, there are limitations such as system stability problem, difficulty in controlling power demand and supply, and a lack of countermeasures in case of an accident.

Since a large number of power devices having a complex configuration are provided, system operation cannot be stably carried out when compatibility between devices is poor. Furthermore, when a load to which each device supplies power is a critical load that needs power supply at all times, it may be required to provide a separate UPS device for an abnormal condition, but when a UPS device is provided, the configuration of the system may become more complicated, and the provision of the UPS device itself may not be easy due to structural/design constraints. In addition, as the configuration becomes more complicated, the control of each device and system may be inevitably more complex, and the risk of occurrence of failures and accidents may increase. As a result, stable and reliable power supply may not be carried out so as to cause an unstable operation of a load, and an appropriate operational response to the occurrence of various accidents may not be made.

SUMMARY

The present disclosure aims at overcoming the limitations of the related art.

That is, one aspect of the present disclosure is to provide a method for controlling a power supply system capable of overcoming the limitations of the related art.

Specifically, an aspect of the present disclosure is to provide a method for controlling a power supply system capable of allowing power reception and power supply among a plurality of power modules provided in the system, so as to enable a UPS function among the plurality of power modules.

Another aspect of the present disclosure is to provide a method for controlling a power supply system capable of effectively maintaining power supply to loads in various abnormal situations.

Another aspect of the present disclosure is to provide a method for controlling a power supply system capable of performing power reception and power supply appropriately and stably, in response to various abnormal situations.

In order to overcome those aspects of the present disclosure, a method for controlling a power supply system according to an embodiment may be configured to control reception and supply of power by opening and closing circuit breakers, which control connection and disconnection between a plurality of power supply devices and a bus line, according to various situations occurred on the system.

That is, a method for controlling a power supply system according to the present disclosure may be configured to supply and receive power through a bus line by controlling circuit breakers which are provided to correspond to a plurality of power supply devices, thereby performing a UPS function among the plurality of power supply devices.

The technical features may be applied to a method for controlling a power supply system, and this specification provides embodiments of the method for controlling the power supply system having the technical features.

To achieve those technical features of the present disclosure, a power supply system according to one embodiment may include a plurality of power panels configured to convert power into Direct-Current (DC) power, which is supplied from each of a plurality of power supply sources including first and second Alternating-Current (AC) power sources supplying AC power and a battery power source storing DC power, convert the DC power into driving power for driving loads, and supply the driving power to the loads, a bus line connected to power ends through which the DC power is input and output to and from the plurality of power panels, respectively, such that the DC power converted in the plurality of power panels flows therethrough, a plurality of circuit breakers disposed between the power ends and the bus line, respectively, to control connection and disconnection between the power ends and the bus line, and a control device configured to monitor and control the plurality of power panels. The control device may determine a supply target power panel to supply the DC power to a fault-occurred power panel among the plurality of power panels, close at least one circuit breaker connected to the fault-occurred power panel and the supply target power panel, among the plurality of circuit breakers, and supply the DC power from the supply target power panel to the fault-occurred power panel through the bus line.

In one embodiment, the control device may determine the fault-occurred power panel and close at least one circuit breaker connected to the determined fault-occurred power panel and the supply target power panel, such that the DC power is supplied from the supply target power panel to the fault-occurred power panel through the bus line.

In one embodiment, the plurality of power supply sources may include first and second AC power sources supplying AC power, and a battery power source storing DC power to supply the stored power to the plurality of power panels while power supply is restored in a switching manner when the power supply of the first and the second AC power sources is interrupted.

In one embodiment, the battery power source may uninterruptibly supply the stored power to the plurality of power panels until the interrupted power supply is restored in the switching manner.

In one embodiment, each of the plurality of power panels may include a plurality of first power conversion devices configured to convert power supplied from each of the plurality of power supply sources into DC power, at least one second power conversion device configured to convert the DC power into driving power for driving the loads to supply the driving power to the loads, a first circuit breaker disposed between a power end commonly connected to output ends of the plurality of first power conversion devices and the bus line connected to the power end to control connection and disconnection between the power end and the bus line, a second circuit breaker disposed between a second output end as an output end of one of the plurality of first power conversion devices and the bus line connected to the second output end to control connection and disconnection between the second output end and the bus line, and a control unit configured to control operations of the plurality of first power conversion devices and the at least one second power conversion device and opening and closing of the first and second circuit breakers according to a state of the DC power or the driving power.

In one embodiment, each of the plurality of power panels may include a plurality of first power conversion devices configured to convert power supplied from each of a plurality of power supply sources into DC power, at least one second power conversion device configured to convert the DC power into driving power for driving loads to supply the driving power to the loads, and a control unit configured to control operations of the plurality of first power conversion devices and the at least one second power conversion device according to a state of the DC power or the driving power.

In one embodiment, each of the plurality of power panels may normally transmit the DC power to the at least one second power conversion device by operating a first conversion device which receives power from the first AC power source.

In one embodiment, each of the plurality of power panels may stop the operation of the first conversion device and operate a third conversion device receiving power from the second AC power source to transmit the DC power to the at least one second power conversion device, when a fault has occurred in at least one of the first AC power source and the first conversion device.

In one embodiment, each of the plurality of power panels may stop the operation of the third conversion device and receive the DC power from the supply target power panel to supply the DC power to the at least one second power conversion device or may stop the operation of the third conversion device and operate the second conversion device receiving power from the battery power source to transmit the DC power to the at least one second power conversion device, when a fault has occurred in at least one of the second AC power and the third conversion device.

In one embodiment, each of the plurality of power panels may operate the second conversion device to transmit the DC power to the at least one second power conversion device when the DC power is being supplied from the supply target power panel to the fault-occurred power panel through the bus line.

In one embodiment, the bus line may configure one DC electric circuit through which the DC power flows.

In one embodiment, the plurality of circuit breakers may include a plurality of first circuit breakers provided on electric circuits to which power ends commonly connected to output ends of the DC power, among output ends of the plurality of power panels, and the bus line are connected, so as to control connection and disconnection between the power ends and the bus line, and a plurality of second circuit breakers provided on electric circuits to which second output ends separately provided from the power ends and the bus line are connected, so as to control connection and disconnection between the second output ends and the bus line.

In one embodiment, the control device may open the plurality of first and second circuit breakers at normal times, and close the first circuit breaker of the fault-occurred power panel and the second circuit breaker of the supply target power panel when the supply target power panel supplies the DC power to the fault-occurred power panel.

In one embodiment, the bus line may configure one DC electric circuit through which the DC power flows.

In one embodiment, the plurality of circuit breakers may be provided on electric circuits, to which the power ends among the plurality of power panels are connected on the bus line, to control connection and disconnection among the plurality of power panels.

In one embodiment, the control device may open the plurality of circuit breakers at normal times, and close a circuit breaker connected to the fault-occurred power panel and the supply target power panel of the plurality of circuit breakers when the supply target power panel supplies the DC power to the fault-occurred power panel.

In one embodiment, the control device may determine the supply target power panel, among remaining power panels excluding the fault-occurred power panel.

In one embodiment, the control device may determine supply priorities of the remaining power panels according to a preset determination criterion, and determine the supply target power panel according to the supply priorities.

In one embodiment, the determination criterion may be a criterion for determining the supply priorities according to at least one of operation states of the remaining power panels and arranged positions of the remaining power panels.

In one embodiment, the control device may determine the supply priorities according to states of the plurality of power supply sources of each of the remaining power panels.

In one embodiment, the control device may determine a power storage state of the battery power source among the plurality of power supply devices of each of the remaining power panels, and determine the supply priorities according to the determined power storage state.

In one embodiment, the power storage state may be a state of an available capacity of the battery power source.

In one embodiment, the control device may determine the supply priorities according to the order of the available capacities of the remaining power panels.

In one embodiment, the control device may determine the supply priorities according to a degree by which a position of each of the remaining power panels is adjacent to the fault-occurred power panel.

In one embodiment, the control device may determine the supply priorities in the order of the degree to which the position of each of the remaining power panels is adjacent to the fault-occurred power panel.

In one embodiment, the control device may determine a supply replacement power panel to replace the supply target power panel according to the supply priorities, and replace the supply target power panel with the supply replacement power panel such that the DC power is supplied from the supply replacement power panel to the fault-occurred power panel, when a fault has occurred in the supply target power panel which is supplying the DC power to the fault-occurred power panel.

In one embodiment, the control device may determine a plurality of supply target power panels corresponding to a plurality of fault-occurred power panels when the fault-occurred power panel exists in plurality, and close a plurality of circuit breakers connected to the plurality of fault-occurred power panels and the plurality of supply target power panels among the plurality of circuit breakers, such that the DC power can be supplied from the plurality of supply target power panels to the plurality of fault-occurred power panels, respectively, through the bus line.

To achieve those technical features of the present disclosure according to another embodiment, there is provided a method for controlling a power supply system, which may include a plurality of power panels configured to convert power, which is supplied from each of a plurality of power supply sources including first and second Alternating-Current (AC) power sources supplying AC power, and a battery power source storing DC power, into Direct-Current (DC) power, convert the DC power into driving power for driving loads, and supply the driving power to the loads, a bus line connected to power ends through which the DC power is input and output to and from the plurality of power panels, respectively, such that the DC power converted in the plurality of power panels flows therethrough, and a plurality of circuit breakers disposed between the power ends and the bus line, respectively, to control connection and disconnection between the power ends and the bus line, the method including determining a supply target power panel to supply the DC power to a fault-occurred power panel when a fault has occurred in at least one of the plurality of power panels, closing at least one circuit breaker connected to the fault-occurred power panel and the supply target power panel among the plurality of power panels, and supplying the DC power from the supply target power panel to the fault-occurred power panel through the bus line.

In one embodiment, the method may further include determining a fault-occurred power panel among the plurality of power panels while controlling operations of the plurality of power panels according to power supply states of the plurality of power panels, respectively.

In one embodiment, the determining the fault-occurred power panel among the plurality of power panels may be configured to determine a power panel, in which a fault has occurred in power supply of the first and second AC power sources among the plurality of power panels, as the fault-occurred power panel.

In one embodiment, the determining may be configured to determine supply priorities of remaining power panels except for the fault-occurred power panel, and determine the supply target power panel according to the supply priorities.

In one embodiment, the determining may be configured to determine the supply priorities according to at least one of states of the remaining power panels and arranged positions of the remaining power panels.

In one embodiment, the determining may be configured to determine the supply priorities according to states of the plurality of power supply sources of each of the remaining power panels.

In one embodiment, the determining may be configured to determine an available capacity of the battery power source of the plurality of power supply sources of each of the remaining power panels, and determine the supply priorities according to the determined available capacities.

In one embodiment, the determining may be configured to determine the supply priorities in the order of the available capacities of the remaining power panels.

In one embodiment, the determining may be configured to determine the supply priorities according to a degree by which a position of each of the remaining power panels is adjacent to the fault-occurred power panel.

In one embodiment, the determining may be configured to determine the supply priorities in the order of the degree to which the position of each of the remaining power panels is adjacent to the fault-occurred power panel.

In one embodiment, the method may further include transmitting information related to reception and supply of the DC power to each of the fault-occurred power panel and the supply target power panel.

In one embodiment, the method may further include replacing the supply target power panel when a fault has occurred in the supply target power panel which is supplying the DC power to the fault-occurred power panel.

In one embodiment, the replacing may include determining a supply replacement power panel to replace the supply target power panel according to the supply priorities, opening a circuit breaker connected to the supply target power panel while closing a circuit breaker connected to the fault-occurred power panel and the supply replacement power panel, and supplying the DC power from the supply replacement power panel to the fault-occurred power panel through the bus line.

In one embodiment, the method may further include detecting a state of at least one of the plurality of power panels, comparing a result of the detection with a preset state criterion, and determining a power panel, corresponding to the state criterion among the plurality of power panels according to a result of the comparison, as the fault-occurred power panel.

To achieve those technical features of the present disclosure according to another embodiment, there is provided a method for controlling a power supply system, which may include a plurality of power panels configured to convert power, which is supplied from each of a plurality of power supply sources including first and second Alternating-Current (AC) power sources supplying AC power, and a battery power source storing DC power, into Direct-Current (DC) power, convert the DC power into driving power for driving loads, and supply the driving power to the loads, a bus line connected to power ends through which the DC power is input and output to and from the plurality of power panels, respectively, and second output ends separately provided from the power ends to output the DC power, such that the DC power converted in the plurality of power panels flows therethrough, a plurality of first circuit breakers disposed between the power ends and the bus line, respectively, to control connection and disconnection between the power ends and the bus line, and a plurality of second circuit breakers disposed between the second output ends and the bus line, respectively, to control connection and disconnection between the second output ends and the bus line, the method including, controlling operations of the plurality of power panels according to power supply states of the plurality of power panels, respectively, determining a fault-occurred power panel among the plurality of power panels, transmitting information related to reception and supply of the DC power to the determined fault-occurred power panel and a supply target power panel which is to supply the DC power to the fault-occurred power panel, closing the first circuit breaker of the fault-occurred power panel and the second circuit breaker of the supply target power panel, and supplying the DC power from the supply target power panel to the fault-occurred power panel through the bus line.

In one embodiment, the battery power source may supply the stored power to the plurality of power panels while the power supply is restored in the switching manner when the power supply of the first AC power and the second AC power is interrupted.

In one embodiment, the plurality of power supply sources may further include an emergency power source configured to supply emergency power to the loads when the power supply of the first AC power source, the second AC power source, and the battery power source is interrupted.

In one embodiment, the controlling the operations of the plurality of power panels may be configured to receive power from the first AC power source and convert the received power into the DC power through a first conversion device receiving power from the first AC power source when the first AC power source and the first conversion device are in a normal state.

In one embodiment, the controlling the operations of the plurality of power panels may be configured to switch the first AC power source and the first conversion device into the second AC power source and a second conversion device receiving power from the second AC power source when a fault has occurred in at least one of the first AC power source and the first conversion device.

In one embodiment, the controlling the operations of the plurality of power panels may be configured to receive power from the battery power source while the first AC power source and the first conversion device are switched into the second AC power source and the second conversion device and convert the received power into the DC power through the second conversion device.

In one embodiment, the controlling the operations of the plurality of power panels may be configured to receive power from the battery power source until a power supply is restored, and convert the received power into the DC power through a second conversion device which receives power from the battery power source, when a fault has occurred in at least one of the first AC power source and the first conversion device while the second circuit breaker is closed.

In one embodiment, the determining the fault-occurred power panel of the plurality of power panels may include detecting a state of at least one of the plurality of power panels, comparing a result of the detection with a preset state criterion, and determining a power panel, corresponding to the state criterion among the plurality of power panels according to a result of the comparison, as the fault-occurred power panel.

In one embodiment, the detecting may be configured to detect a state of at least one of the plurality of power supply sources, a plurality of first conversion devices included in each of the plurality of power panels, and the DC power and the driving power of the plurality of power panels, and the comparing may be configured to compare the result of the detection with the state criterion including a fault criterion for the state of the at least one of the plurality of power supply sources, the plurality of first conversion devices, the DC power, and the driving power.

In one embodiment, the determining the fault-occurred power panel among the plurality of power panels may be configured to determine a power panel, in which a fault has occurred in power supply of the first and second AC power sources among the plurality of power panels, as the fault-occurred power panel.

In one embodiment, the fault-occurred power panel may be a power panel in which a fault has occurred in power supply of the first AC power source and the second AC power source and thus only the battery power source is allowed to supply power.

In one embodiment, the determining may include receiving fault occurrence information from the plurality of power panels, and determining a power panel which has transmitted the fault occurrence information as the fault-occurred power panel.

In one embodiment, the transmitting may include transmitting reception request information for receiving the DC power to the fault-occurred power panel, and transmitting supply request information for supplying the DC power to the supply target power panel.

In one embodiment, the supplying may be configured such that the fault-occurred power panel receives the DC power from the bus line to the power end and the supply target power panel supplies the DC power from a second output end to the bus line.

In one embodiment, the supply target power panel may convert power supplied from the second AC power source into the DC power to supply the DC power to the bus line.

In one embodiment, the supplying may be configured to switch the supply target power panel to another power panel and supply the DC power from the switched another power panel to the fault-occurred power panel when the power supply of the first AC power source to the supply target power panel is interrupted.

In one embodiment, the supply target power panel may receive power from the battery power source and convert the received power into the DC power while the supply target power panel is disconnected from the bus line and the power supply of the second AC power source is restored after the power supply of the first AC power source is interrupted.

In one embodiment, the another power panel may convert power supplied from the second AC power source into the DC power to supply the DC power to the bus line.

In one embodiment, the supplying may be configured to disconnect the supply target power panel from the bus line by opening the second circuit breaker of the supply target power panel and connect the another power panel to the bus line by closing the second circuit breaker of the another power panel when switching the supply target power panel into the another power panel.

In one embodiment, the supplying may be configured to disconnect the supply target power panel from the bus line by opening the second circuit breaker of the supply target power panel and connect the another power panel to the bus line by closing the second circuit breaker of the another power panel when switching the supply target power panel into the another power panel.

In one embodiment, the determining the fault-occurred power panel among the plurality of power panels may be configured, when the fault-occurred power panel exists in plurality, such that each of the plurality of fault-occurred power panels receives power from the battery power source and converts the received power into the DC power while the first AC power source or the second AC power source is restored.

In one embodiment, the determining the fault-occurred power panel among the plurality of power panels may be configured, when a fault has occurred in the battery power source of the fault-occurred power panel, such that the power panel in which the fault has occurred in the battery power source supplies power to the loads through an emergency power source supplying emergency power to the loads.

To achieve those technical features of the present disclosure according to another embodiment, there is provided a method for controlling a power supply system, which may include a plurality of power panels configured to convert power, which is supplied from each of a plurality of power supply sources including first and second Alternating-Current (AC) power sources supplying AC power, and a battery power source storing DC power, into Direct-Current (DC) power, convert the DC power into driving power for driving loads, and supply the driving power to the loads, a bus line connected to power ends through which the DC power is input and output to and from the plurality of power panels, respectively, and second output ends separately provided from the power ends to output the DC power, such that the DC power converted in the plurality of power panels flows therethrough, a plurality of first circuit breakers disposed between the power ends and the bus line, respectively, to control connection and disconnection between the power ends and the bus line, a plurality of second circuit breakers disposed between the second output ends and the bus line, respectively, to control connection and disconnection between the second output ends and the bus line, and a control device configured to monitor and control the plurality of power panels, the method including determining a fault-occurred power panel among the plurality of power panels, transmitting information related to reception and supply of the DC power to the determined fault-occurred power panel and a supply target power panel which is to supply the DC power to the fault-occurred power panel, closing the first circuit breaker of the fault-occurred power panel and the second circuit breaker of the supply target power panel, and supplying the DC power from the supply target power panel to the fault-occurred power panel through the bus line.

In one embodiment, the determining may further include detecting a state of at least one of the plurality of power panels, comparing a result of the detection with a preset state criterion, and determining a power panel, corresponding to the state criterion among the plurality of power panels according to a result of the comparison, as the fault-occurred power panel.

In one embodiment, the detecting may be configured to detect a state of at least one of the plurality of power supply sources, a plurality of first conversion devices included in each of the plurality of power panels, and the DC power and the driving power of the plurality of power panels, and the comparing may be configured to compare the result of the detection with the state criterion including a fault criterion for the state of the at least one of the plurality of power supply sources, the plurality of first conversion devices, the DC power, and the driving power.

In one embodiment, the determining may include receiving fault occurrence information from the plurality of power panels, and determining a power panel which has transmitted the fault occurrence information as the fault-occurred power panel.

In one embodiment, the transmitting may include transmitting reception request information for receiving the DC power to the fault-occurred power panel, and transmitting supply request information for supplying the DC power to the supply target power panel.

In one embodiment, the supplying may be configured such that the fault-occurred power panel receives the DC power from the bus line to the power end and the supply target power panel supplies the DC power from a second output end to the bus line.

The power supply system, and the method for controlling the power supply system according to the present disclosure may be applied to a power module that supplies and uses DC power, a power supply system, a method for controlling the power supply system, and a method of operating the power supply system, in particular, may be usefully applied to a DC UPS module and a power supply system having the same. However, the technology disclosed in this specification is not limited thereto, and may also be applied to all of a power source device, a power supply device, a power control device, a power supply system, a power system, a power control system, a plant system, a plant control system, a plant control method, an energy storage system, a method of controlling or operating an energy storage system, a motor control panel for controlling a plurality of motor loads, a motor control system, a motor operation system, and the like.

In a method for controlling a power supply system according to the present disclosure, power supply and power reception through a bus line can be controlled by controlling circuit breakers of a plurality of power supply devices connected to the bus line, which may result in performing a UPS function among the plurality of power supply devices.

Accordingly, even if various abnormal situations occur on the system, power supply to loads can be maintained without interruption.

That is, the method for controlling the power supply system according to the present disclosure have an effect of achieving appropriate and stable power supply, in response to various abnormal situations occurring on the system.

In the method for controlling the power supply system according to the present disclosure, the reception and supply of power through the bus line can be controlled by controlling the circuit breakers of the plurality of power supply devices connected to the bus line according to occurred situations, thereby allowing an efficient operation with the least elements.

The method for controlling the power supply system according to the present disclosure have an effect of increasing stability, reliability, and effectiveness of an operation of a large-capacity system.

Accordingly, the method for controlling the power supply system according to the present disclosure can achieve those aforementioned aspects and other advantages, thereby overcoming the limitations of the related art.

DETAILED DESCRIPTION

Figure 1A:
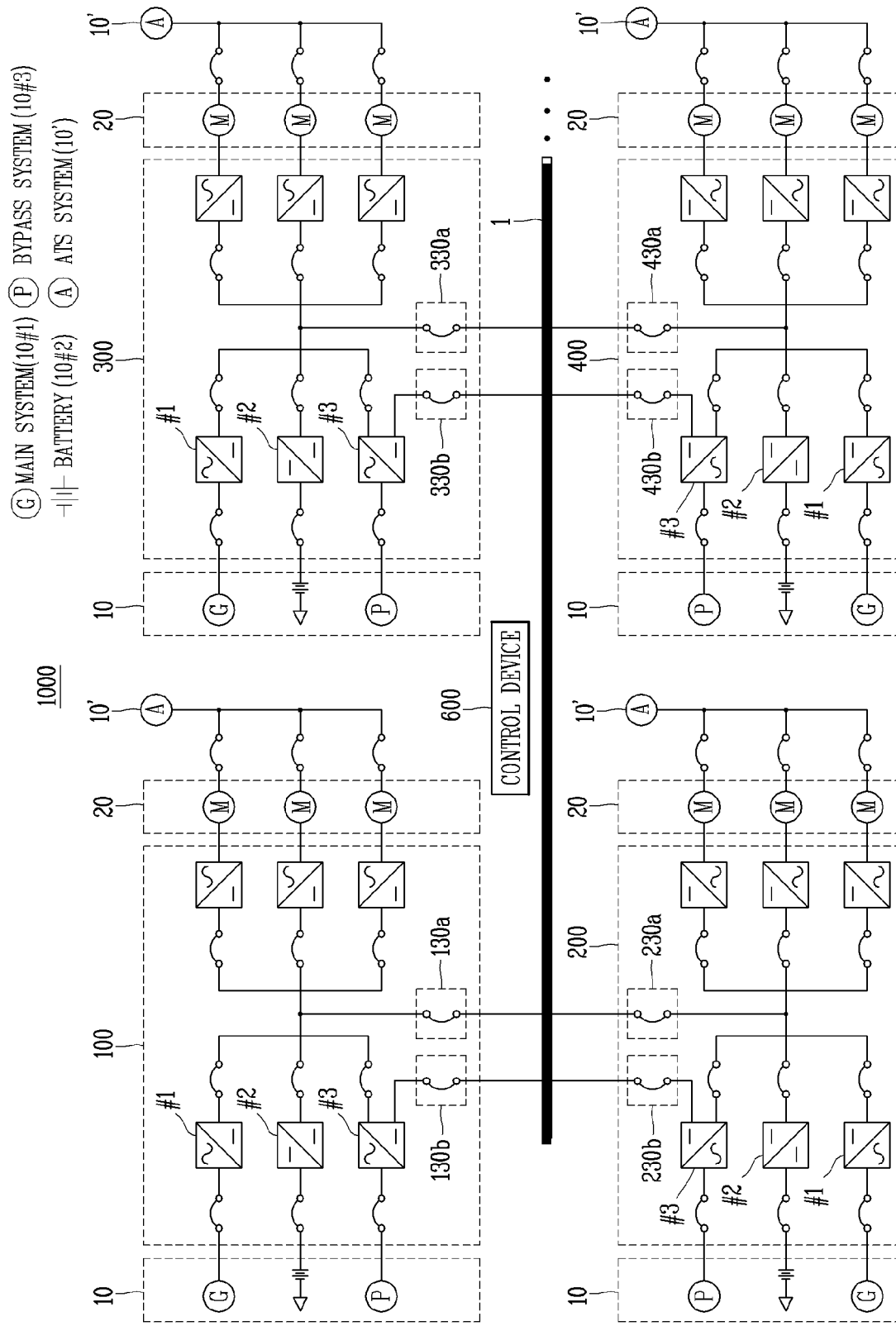
FIGS. 1A and 1B are diagrams illustrating a configuration of a power supply system in accordance with one embodiment of the present disclosure.

It is noted that the technical terms used herein are used only to describe specific embodiments and are not intended to limit the scope of the technology disclosed herein. Also, unless particularly defined otherwise, technological terms used herein should be construed as a meaning that is generally understood by those having ordinary skill in the art to which this specification pertains, and should not be construed too broadly or too narrowly. Furthermore, if technological terms used herein are wrong terms unable to correctly express the idea of the technology disclosed in this specification, then they should be replaced by technological terms that are properly understood by those skilled in the art. In addition, general terms used herein should be construed based on the definition of dictionary, or the context, and should not be construed too broadly or too narrowly.

A singular representation used herein may include a plural representation unless it represents a definitely different meaning from the context. In this specification, the terms "comprising" and "including" should not be construed to necessarily include all of the elements or steps disclosed herein, and should be construed not to include some of the elements or steps thereof, or should be construed to further include additional elements or steps.

Hereinafter, embodiments of the present disclosure will be described in detail with reference to the accompanying drawings, and the same reference numerals are used to designate the same/like components and redundant description thereof will be omitted.

In describing the technology disclosed in this specification, if a detailed explanation for a related known function or construction is considered to unnecessarily divert the gist of the present disclosure, such explanation has been omitted but would be understood by those skilled in the art. It should be noted that the attached drawings are provided to facilitate understanding of the embodiments disclosed in this specification, and should not be construed as limiting the technical idea disclosed in this specification by the attached drawings.

Hereinafter, one embodiment of a power supply system according to the present disclosure will be described.

The power supply system may be implemented in embodiments to be described below in combination or individually.

The power supply system may be a power supply system including a plurality of power modules.

The power supply system may be a system that includes a plurality of packaged power devices to supply power.

Here, the power device may be a power panel in which a plurality of power control devices is packaged.

The power supply system 1000, as illustrated in FIGS. A and 2A, may include a plurality of power panels 100, 200, 300, 400 each of which converts power supplied from a plurality of power supply sources 10, respectively, into DC power, converts the DC power into driving power for driving loads 20, and supplies the driving power to the loads 20, a bus line 1 connected to power ends of the plurality of power panels 100, 200, 300, 400, respectively, for input/output of the DC power, so that the DC power converted in the plurality of power panels 100, 200, 300, 400 flows therethrough, a plurality of circuit breakers 130, 230, 330, 430 disposed between the respective power ends and the bus line 1 to control connection and disconnection between the power ends and the bus line 1, and a control device 600 that monitors and controls the plurality of power panels 100, 200, 300, 400.

When the power supply system 1000 is configured as illustrated in FIG. 1A, the bus line 1 may be commonly connected to the power ends of the respective power panels 100, 200, 300, 400, through which the DC power is output, so as to receive the DC power converted in the plurality of power panels 100, 200, 300, 400. A plurality of first circuit breakers 130a, 230a, 330a, 430a may be provided on an electric circuit connected with the bus line 1 and power ends, to which outputs of the DC power are commonly connected among the output ends, so as to control connection and disconnection between the power ends and the bus line 1. A plurality of second circuit breakers 130b, 230b, 330, 430 may be provided on an electric circuit connected with the bus line 1 and second output ends, from which outputs of the DC power among the output ends are individually separated, so as to control connection and disconnection between the second output ends and the bus line 1.

Figure 1B:
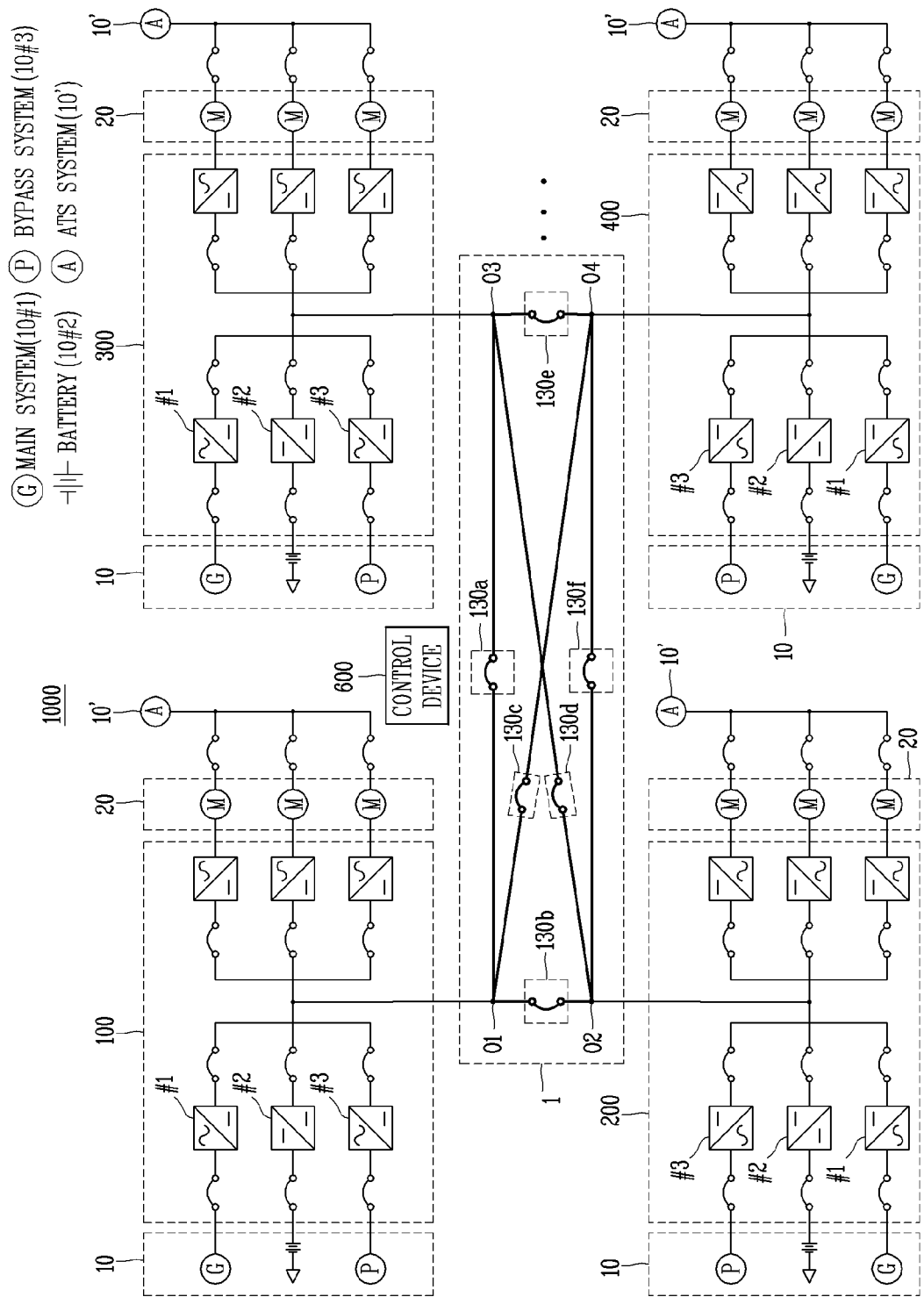

When the power supply system 1000 is configured as illustrated in FIG. 1B, the bus line 1 may be commonly connected to power ends 01 to 04, to which the DC power flows from the plurality of power panels 100, 200, 300, 400, so as to receive the DC power output from the respective power panels 100, 200, 300, 400. A plurality of circuit breakers 130 may be provided on electric circuits, to which the power ends among the plurality of power panels 100, 200, 300, 400 are connected on the bus line 1, so as to control connection and disconnection among the plurality of power panels 100, 200, 300, 400.

In the power supply system 1000 as illustrated in FIG. 1A or 1B, the control device 600 may determine a supply target power panel which is to supply the DC power to a fault-occurred power panel, in which a fault has occurred among the plurality of power panels 100, 200, 300, 400. The control device 600 may close at least one circuit breaker connected to the fault-occurred power panel and the supply target power panel, such that the DC power can be supplied from the supply target power panel to the fault-occurred power panel through the bus line 1.

That is, the power supply system 1000 may determine the supply target power panel that is to supply the DC power to a fault-occurred power panel, in which the fault has occurred among the plurality of power panels 100, 200, 300, 400, and close at least one circuit breaker connected to the fault-occurred power panel and the supply target power panel, thereby controlling the supply target power panel to supply the DC power to the fault-occurred power panel through the bus line 1.

Figure 2A:
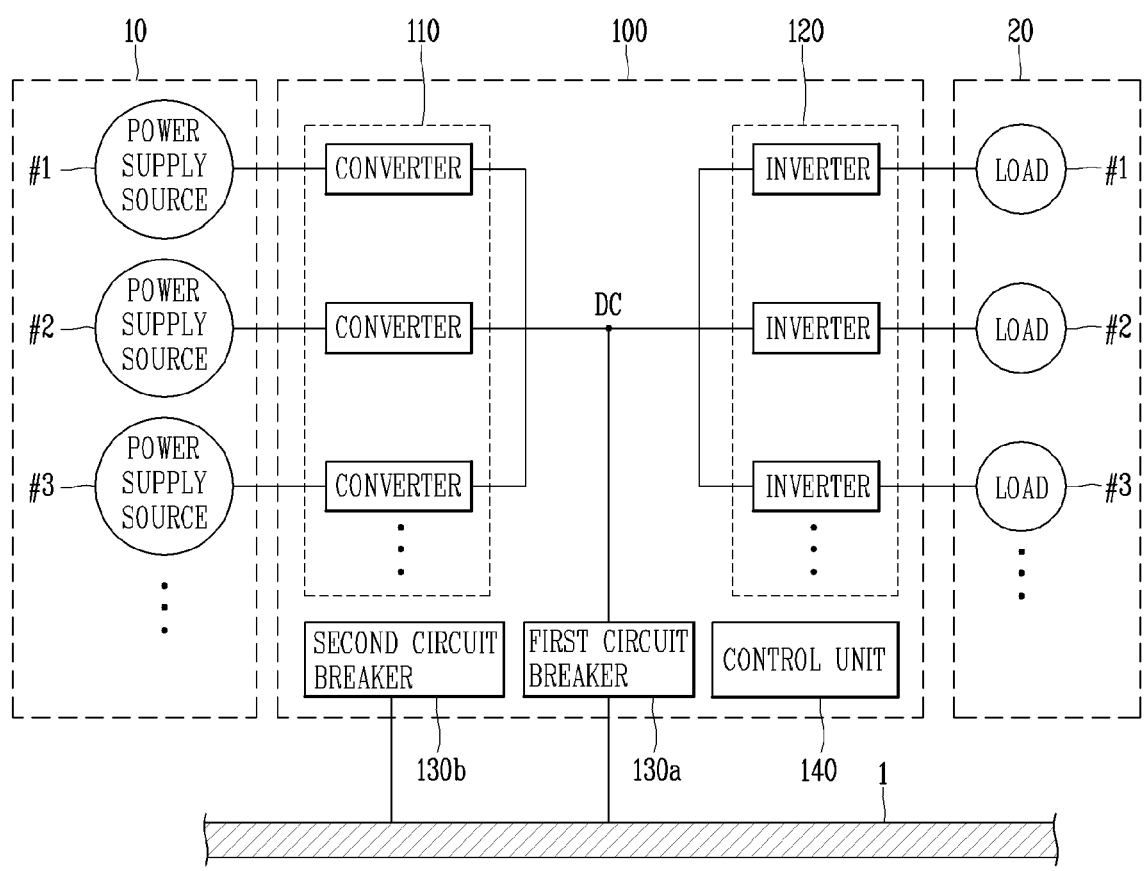
FIG. 2A is a diagram illustrating a configuration of a power module included in the power supply system as illustrated in FIG. 1A.
Figure 2B:
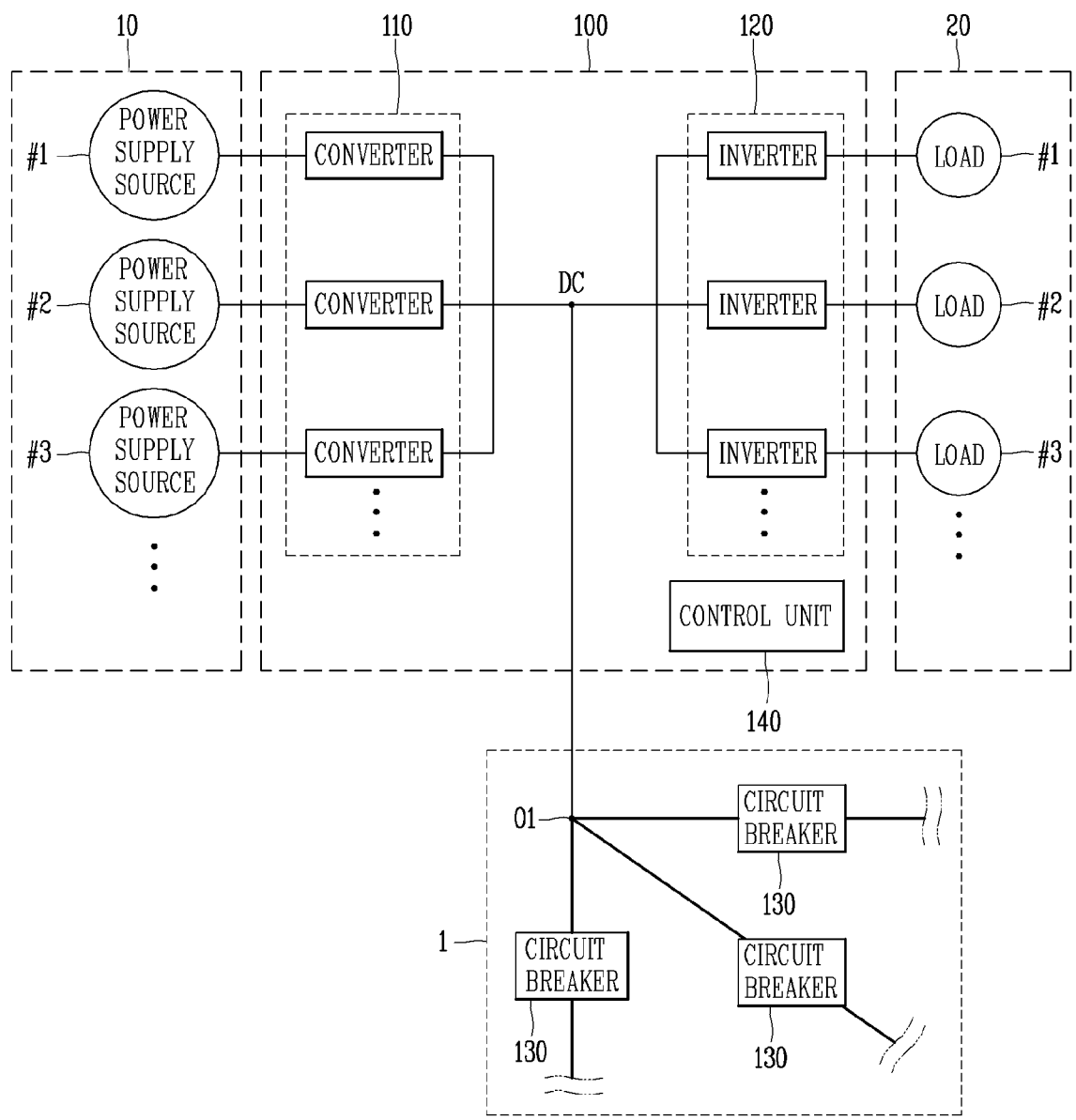
FIG. 2B is a diagram illustrating a configuration of a power module included in the power supply system as illustrated in FIG. 1B.

Here, each of the plurality of power panels 100, 200, 300, 400 may be a power module 100 as illustrated in FIGS. 2A and 2B.

FIG. 2A illustrates the detailed configuration of the plurality of power panels 100, 200, 300, 400 when the power supply system 1000 is configured as illustrated in FIG. 1A, and FIG. 2B illustrates the detailed configuration of the plurality of power panels 100, 200, 300, 400 when the power supply system 1000 is configured as illustrated in FIG. 1B. The plurality of power panels 100, 200, 300, 400 may be configured in the forms as illustrated in FIGS. 2A and 2B or in different forms.

Each of the plurality of power panels 100, 200, 300, 400 may be a module including a plurality of power control devices.

Each of the plurality of power panels 100, 200, 300, 400 may be a power device in which the plurality of power control devices is packaged.

For example, each of the plurality of power panels 100, 200, 300, 400 may be a power panel in which the plurality of power control devices is packaged.

Each of the plurality of power panels 100, 200, 300, 400 may be a package type power panel provided in buildings, such as power plants, plants, factories, apartments, etc., which requires high power.

Each of the plurality of power panels 100, 200, 300, 400 may also be a package type power panel configured in any one space.

Each of the plurality of power panels 100, 200, 300, 400 may be configured such that the plurality of power control devices is packaged to supply power to respective loads.

That is, each of the plurality of power panels 100, 200, 300, 400 may be configured such that the plurality of power control devices is packaged to supply driving power to the respective loads 20 that the plurality of power panels is in charge.

Each of the plurality of power panels 100, 200, 300, 400, as illustrated in FIGS. 1B and 2B, may include a plurality of first power conversion devices 110-210, 310, 410, at least one second power conversion device 120-220, 320, 420, and a control unit 140-240, 340, 440, configured to convert power supplied from each of the plurality of power supply sources 10 into the DC power, convert the DC power into the driving power for driving the loads 20, and supply the driving power to the loads 20.

The plurality of power supply sources 10 which supplies power to the plurality of power panels 100, 200, 300, 400, as illustrated in FIGS. 1A and 2A, may include a first AC power source 10 #1 and a second AC power source 10 #3 each supplying AC power.

The plurality of power supply sources 10 may further include a battery 10 #2 for storing DC power.

Here, the first AC power source 10 #1 may be a main system power source G for supplying AC power, the second AC power source 10 #3 may be a bypass system power source P supplying AC power, and the battery 10 #2 may be a battery power source B supplying DC power.

That is, the plurality of power supply sources 10, as illustrated in FIGS. 1A and 1B, may include the system power source G, the bypass power source P, and the battery power source B.

Accordingly, each of the plurality of power panels 100, 200, 300, 400 may receive power from each of the system power source G, the bypass power source P, and the battery power source B.

The battery 10 #2 may be an emergency battery for storing DC power to supply the stored DC power in an emergency.

The battery 10 #2 may supply the stored DC power to the supply device 100 when a fault has occurred in the first AC power source and the second AC power source.

Accordingly, when the supply of the DC power to the second power conversion device 120 is interrupted (stopped) in the plurality of power supply sources 10, the power stored in the battery 10 #2 may be supplied to the first power conversion devices 110 while the supply of the DC power is restored.

Here, the case where the supply of the DC power is interrupted may be at least one of a case where the power supply from the first AC power source 10 #1 and the second AC power source 10 #3 is interrupted, and a case where operations of the plurality of first power conversion devices 110 which receives power from the first AC power source 10 #1 and the second AC power source 10 #3 are stopped.

After the supply of the DC power is interrupted, the battery 10 #2 may uninterruptibly supply the stored power to the first power conversion devices 1100 until the supply of the DC power is restored in a switching manner.

The uninterruptible supply means that the stored power is supplied to the first power conversion devices 100 without interrupting power supply, namely, without a power failure.

Accordingly, the supply device 100 can supply power uninterruptibly to the loads 20 through the battery 10 #2.

The plurality of power supply sources 10 may further include an emergency power source A for supplying emergency power to the loads 20 when a fault has occurred in the first AC power source G, the second AC power source P, and the battery power source B.

The emergency power source A may be a power source for keeping the loads 20 operated for a predetermined period of time by supplying emergency power to each load 20 when power cannot be supplied due to an occurrence of faults in all of the first AC power source G, the second AC power source P, and the battery power source B each supplying power to the plurality of power panels 100, 200, 300, 400.

For example, the emergency power source A may be a power source including an emergency generator.

Each of the plurality of power panels 100, 200, 300, 400 may preferably receive power supplied from three power supply sources 10, namely, the system power source G, the bypass power source P, and the battery power source B, as illustrated in FIGS. 1A and 1B, and receive power from the emergency power source A only when power cannot be supplied from the system power source G, the bypass power source P, and the battery power source B.

Here, the plurality of power supply sources 10 supplying power to each of the plurality of power panels 100, 200, 300, 400 may supply power to each of the plurality of power panels 100, 200, 300, 400 in one system, or through individual switchboards.

Each of the plurality of power panels 100, 200, 300, 400 may receive power from the plurality of power supply sources 10, respectively, convert the received power into the DC power through the plurality of first power conversion devices 110, 210, 310, 410, and convert the DC power into the driving power through the at least one second power conversion device 120, 220, 320, 420, so that the driving power can be supplied to the loads 20.

Each of the plurality of power panels 100, 200, 300, 400 may include the plurality of first power conversion devices 110, 210, 310, 410 connected to the plurality of power supply sources 10, respectively, to convert the power supplied from the respective power supply sources 10 into the DC power.

Each of the plurality of power panels 100, 200, 300, 400 may preferably include three conversion devices connected to the plurality of power supply sources 10, respectively.

Each of the plurality of power panels 100, 200, 300, 400 may receive power from any one of the plurality of power supply sources 10 and convert the power into the DC power.

That is, each of the plurality of power panels 100, 200, 300, 400 may selectively receive power from any one of the plurality of power supply sources 10.

Each of the plurality of power panels 100, 200, 300, 400 may receive power from any one of the plurality of power supply sources 10 according to a preset supply criterion and convert the power into the DC power.

The supply criterion may be a criterion for priorities of the plurality of power supply sources 10 to supply power.

For example, the supply criterion may be set in the order of the first AC power source 10 #1, the second AC power source 10 #3, and the battery 10 #2.

According to the supply criterion, each of the plurality of power panels 100, 200, 300, 400 may receive power sequentially from the first AC power source 10 #1, the second AC power source 10 #3, and the battery 10 #2.

When power is supplied from the first AC power source 10 #1, each of the plurality of power panels 100, 200, 300, 400 may control an operation of a first conversion device 110 #1, 210 #1, 310 #1, 410 #1 which is connected to the first power source 10 #1.

In this case, each of the plurality of power panels 100, 200, 300, 400 may close an opening and closing mechanism of the first conversion device 110 #1, 210 #1, 310 #1, 410 #1, and open an opening and closing mechanism of the second conversion device 110 #2, 210 #2, 310 #2, 410 #2 connected to the battery 10 #2, and an opening and closing mechanism of the third conversion device 110 #3, 210 #3, 310 #3, 410 #3 connected to the second AC power source 10 #3, to connect the first conversion device 110 #1, 210 #1, 310 #1, 410 #1 and disconnect the second conversion device 110 #2, 210 #2, 310 #2, 410 #2 and the third conversion device 110 #3, 210 #3, 310 #3, 410 #3.

When power is supplied from the second AC power source 10 #3, each of the plurality of power panels 100, 200, 300, 400 may control the operation of the third conversion device 110 #3, 210 #3, 310 #3, 410 #3 connected to the second AC power source 10 #3.

In this case, each of the plurality of power panels 100, 200, 300, 400 may close the opening and closing mechanism of the third conversion device 110 #3, 210 #3, 310 #3, 410 #3, and open the opening and closing mechanism of the first conversion device 110 #1, 210 #1, 310 #1, 410 #1 and the opening and closing mechanism of the second conversion device 110 #2, 210 #2, 310 #2, 410 #2, to connect only the third conversion device 110 #3, 210 #3, 310 #3, 410 #3 and disconnect the first conversion device 110 #1, 210 #1, 310 #1, 410 #1 and the second conversion device 110 #2, 210 #2, 310 #2, 410 #2.

When power is supplied from the battery 10 #2, each of the plurality of power panels 100, 200, 300, 400 may control the operation of the second conversion device 110 #2, 210 #2, 310 #2, 410 #2 which is connected to the battery 10 #2.

In this case, each of the plurality of power panels 100, 200, 300, 400 may close the opening and closing mechanism of the second conversion device 110 #2, 210 #2, 310 #2, 410 #2, and open the opening and closing mechanism of the first conversion device 110 #2, 210 #1, 310 #1, 410 #1 and the opening and closing mechanism of the third conversion device 110 #3, 210 #3, 310 #3, 410 #3, to connect only the second conversion device 110 #2, 210 #2, 310 #2, 410 #2 and disconnect the first conversion device 110 #1, 210 #1, 310 #1, 410 #1 and the third conversion device 110 #3, 210 #3, 310 #3, 410 #3.

Each of the plurality of power panels 100, 200, 300, 400 may select any one of the plurality of first power conversion devices 110, 210, 310, 410 according to states of the plurality of power supply sources 10, such that the DC power is transferred to the at least one second power conversion device 120, 220, 320, 420 through the selected conversion device.

That is, each of the plurality of power panels 100, 200, 300, 400 may convert the DC power through one selected from the plurality of first power conversion devices 110 and transfer the converted DC power to the at least one second power conversion device 120, 220, 320, 420.

In each of the plurality of power panels 100, 200, 300, 400, when a fault has occurred in at least one of a conversion device which is transferring the DC power to the at least one second power conversion device 120, 220, 320, 420 and a power supply source corresponding to the conversion device, another conversion device may transfer the DC power to the at least one second power conversion device 120, 220, 320, 420.

When a fault has occurred in at least one of a conversion device which is transferring the DC power to the at least one second power conversion device 120, 220, 320, 420 and a power supply source corresponding to the conversion device, each of the plurality of power panels 100, 200, 300, 400 may switch the power supply source which is supplying power and the conversion device, such that another conversion device can transfer the DC power to the at least one second power conversion device 120, 220, 320, 420.

Each of the plurality of power panels 100, 200, 300, 400 may operate the first conversion device 110 #1, 210 #1, 310 #1, 410 #1, which receives power from the first AC power source 10 #1, at normal times, so as to transfer the DC power to the at least one second power conversion device 120, 220, 320, 420.

That is, among the plurality of power supply sources 10, the first AC power source 10 #1 may supply power to the plurality of power panels 100, 200, 300, 400 with the highest priority.

When a fault has occurred in at least one of the first AC power source 10 #1 and the first conversion device 110 #1, 210 #1, 310 #1, 410 #1, each of the plurality of power panels 100, 200, 300, 400 may stop the operation of the first conversion device 110 #1, 210 #1, 310 #1, 410 #1 and operate the third conversion device 110 #3, 210 #3, 310 #3, 410 #3 receiving power from the second AC power source 10 #3, so as to transfer the DC power to the at least one second power conversion device 120, 220, 320, 420.

That is, when a fault has occurred in the first AC power source 10 #1 that supplies power with the highest priority to the plurality of power panels 100, 200, 300, 400, the power supply source may be switched to the second AC power source 10 #3 to receive power.

Accordingly, the plurality of power supply sources 10 may supply power to the plurality of power panels 100, 200, 300, 400 sequentially from the first AC power source 10 #1, the second AC power source 10 #3, and the battery 10 #2.

When a fault has occurred in at least one of the second AC power source 10 #3 and the third conversion device 110 #3, 210 #3, 310 #3, 410 #3, each of the plurality of power panels 100, 200, 300, 400 may stop the operation of the third conversion device 110 #3, 210 #3, 310 #3, 410 #3 and receive the DC power from the supply target power panel to transfer to the at least one second power conversion device 120, 220, 320, 420, or stop the operation of the third conversion device 110 #3, 210 #3, 310 #3, 410 #3 and operate the second conversion device 110 #2, 210 #2, 310 #2, 410 #2 receiving power from the battery 10 #2, so as to transfer the DC power to the at least one second conversion device 120, 220, 320, 420.

That is, while the DC power is transferred to the at least one second power conversion device 120, 220, 320, 420 by operating the third conversion device 110 #3 210 #3, 310 #3, 410 #3 due to an occurrence of a fault in at least one of the first AC power source 10 #1 and the first conversion device 110 #1, 210 #1, 310 #1, 410 #1, when a fault has occurred in at least one of the second AC power source 10 #3 and the third conversion device 110 #3, 210 #3, 310 #3, 410 #3, each of the plurality of power panels 100, 200, 300, 400 may receive the DC power from the supply target power panel to transfer to the at least one second power conversion device 120, 220, 320, 420, or may operate the second conversion device 110 #2, 210 #2, 310 #2, 410 #2 to transfer the DC power to the at least one second power conversion device 120, 220, 320, 420.

When the DC power is being supplied from the supply target power panel to the fault-occurred power panel, the second conversion device 110 #2, 210 #2, 310 #2, 410 #2 may be operated to transfer the DC power to the at least one second power conversion device 120, 220, 320, 420.

That is, while the DC power is transferred to the at least one second power conversion device 120, 220, 320, 420 by operating the third conversion device 110 #3, 210 #3, 310 #3, 410 #3 due to an occurrence of a fault in at least one of the first AC power source 10 #1 and the first conversion device 110 #1, 210 #1, 310 #1, 410 #1, when a fault has occurred in at least one of the second AC power source 10 #3 and the third conversion device 110 #3, 210 #3, 310 #3, 410 #3 and the DC power is being supplied from the supply target power panel to the fault-occurred power panel through the bus line 1, the second conversion device 110 #2, 210 #2, 310 #2, 410 #2 may be operated to transfer the DC power to the at least one second power conversion device 120, 220, 320, 420.

Hereinafter, one embodiment of the power supply system 1000 having a configuration as illustrated in FIG. 1A will be described.

As illustrated in FIG. 1A, in the power supply system configured such that the bus line 1 is commonly connected to the power ends of the respective power panels 100, 200, 300, 400, through which the DC power is output, so as to receive the DC power converted in the plurality of power panels 100, 200, 300, 400, the plurality of first circuit breakers 130a, 230a, 330a, 430a is provided on electric circuits connected with the bus line 1 and the power ends, to which the outputs of the DC power are commonly connected among the output ends, so as to control connection and disconnection between the power ends and the bus line 1, and the plurality of second circuit breakers 130b, 230b, 330b, 430b is provided on electric circuits connected with the bus line 1 and the second output ends, from which the outputs of the DC power are individually separated among the output ends, so as to control connection and disconnection between the second output ends and the bus line 1, each of the plurality of power panels 100, 200, 300, 400 may include, as illustrated in FIG. 1B, a plurality of first power conversion devices 110 that converts power supplied from each of the plurality of power supply sources 10 into DC power, at least one second power conversion device 120 that converts the DC power into driving power for driving the loads 20 and supplies the driving power to the loads 20, a first circuit breaker 130a, 230a, 330a, 430a disposed between the power end commonly connected with outputs of the plurality of first power conversion devices 110 and the bus line 1 connected to the power end, so as to control connection and disconnection between the power end and the bus line 1, a second circuit breaker 130b, 230b, 330b, 430b disposed between the second output end as one of the outputs of the plurality of first power conversion devices 110 and the bus line, so as to control connection and disconnection between the second output end and the bus line 1, and a control unit 140, 240, 340, 440 that controls operations of the plurality of first power conversion devices 110 and the at least one second power conversion device 120 and opening and closing of the first and second circuit breakers 130a and 130b according to a state of the DC power or the driving power.

The control units 140, 240, 340, 440 of the plurality of power panels 100, 200, 300, 400 may close the first circuit breakers 130a, 230a, 330a, 440a, respectively, when the DC power is received from the bus line 1, while closing the second circuit breakers 130b, 230b, 330b, 440b, respectively, when the DC power is supplied to the bus line 1.

Each of the plurality of power panels 100, 200, 300, 400 may also have a configuration different from that of the power module 100 as illustrated in FIG. 1B.

The power supply system 1000 as illustrated in FIG. 1A may include the plurality of power panels 100, 200, 300, 400, and the plurality of power panels 100, 200, 300, 400 may be connected commonly to the single bus line 1.

The power panel 100, 200, 300, 400 may be provided in plurality, for example, by four or more as illustrated in FIG. 1A.

Each of the plurality of power panels 100, 200, 300, 400 may communicate with the control device 600 and operate according to a result of the communication with the control device 600.

For example, each of the plurality of power panels 100, 200, 300, 400 may receive a control command from the control device 600, so as to operate according to the control command or transfer state information to the control device 600.

Each of the plurality of first power conversion devices 110, 210, 310, 410 included in each of the plurality of power panels 100, 200, 300, 400 may output the DC power through the power ends and the second output end which are separately provided.

The plurality of first power conversion devices 110, 210, 310, 410 may include at least one of an AC/DC conversion device for converting AC power into DC power and a DC/DC conversion device for converting a level of DC power.

Each of the plurality of first power conversion devices 110, 210, 310, 410 may include three conversion devices 110 #1 to 110 #3, 210 #1 to 210 #3, 310 #1 to 310 #3, 410 #1 to 410 #3 to correspond to the plurality of power supply sources 10.

Accordingly, the first AC power source 10 #1 may be connected to the first conversion device 110 #1 to supply AC power to the first conversion device 110 #1, and the battery power source 10 #2 may be connected to the second conversion device 110 #2 to supply DC power to the second conversion device 110 #2, and the second AC power source 10 #3 may be connected to the third conversion device 110 #3 to supply AC power to the third conversion device 110 #3.

The first conversion device 110 #1 may be an AC/DC conversion device for converting AC power into DC power, and the second conversion device 110 #2 may be a DC/DC conversion device for converting a level of DC power, and the third conversion device 110 #3 may be an AC/DC conversion device for converting AC power into DC power.

The plurality of first power conversion devices 110, 210, 310, 410 may include opening and closing mechanisms provided on front and rear ends for opening or closing the front and rear ends.

The opening and closing mechanisms may be switches which is provided on an input end and an output end of each of the plurality of first power conversion devices 110, 210, 310, and 410, to control input and output of power to and from the plurality of first power conversion devices 110, 210, 310, 410.

Here, the opening and closing mechanism provided on the input end may be a circuit breaker that breaks a circuit when detecting an overcurrent.

More specifically, Air Circuit Breakers (ACBs) may be provided on the input ends of the first conversion device 110 #1 and the third conversion device 110 #3, to which AC power is supplied from the first AC power source 10 #1 and the second AC power source 10 #3. A Molded Circuit Breaker (MCCB) may be provided on the input end of the second conversion device 110 #2, to which DC power is supplied from the battery 10 #2.

The opening and closing mechanisms may be controlled to connect or disconnect the plurality of first power conversion devices 110, 210, 310, 410 according to the operations of the plurality of first power conversion devices 110, 210, 310, 410.

For example, when power is not supplied from the plurality of power supply sources 10, the opening and closing mechanisms provided on the input ends and output ends may be open so as to disconnect the power conversion devices.

The output ends may be divided into the power end and the second output end.

That is, the plurality of first power conversion devices 110, 210, 310, 410 may output the DC power through the power end and the second output end which are separately provided.

The plurality of first power conversion devices 110, 210, 310, 410 may be controlled by the control units 140, 240, 340, 440.

The power end may be an electric circuit, to which the output ends of the plurality of first power conversion devices 110, 210, 310, 410 are connected, respectively.

Accordingly, the power end may be an electric circuit, to which the output ends of the plurality of first power conversion devices 110, 210, 310, 410 are commonly connected, so that the DC power output from the plurality of first power conversion devices 110, 210, 310, 410 can flow.

The DC power which is output from one of the plurality of first power conversion devices 110, 210, 310, 410 may flow along the power end.

The power end may be connected to the bus line 1 and each input end of the at least two second power conversion device 120, 220, 320, 420, such that the DC power can be transferred to the bus line 1 or the at least one second power conversion device 120, 220, 320, 420.

The second output end may be an output end of any one of the plurality of first power conversion devices 110, 210, 310, 410, without being connected to the power end.

Accordingly, the second output end may be an electric circuit which is separately provided from the power end and along which the DC power output from any one of the plurality of first power conversion devices 110, 210, 310, 410 flows.

The second output end may be connected to the bus line 1 to transmit the DC power to the bus line 1.

The second output end may preferably be an output end of the third conversion device 110 #3, 210 #3, 310 #3, 410 #3 corresponding to the third power source 10 #3.

The second output end may also be an output end of the battery corresponding to the second power source 10 #2.

According to this, the second output end may be an output end of the third conversion device 110 #3, 210 #3, 310 #3, 410 #3, to which power is supplied from the bypass power source P as the third power source 10 #3.

That is, the third conversion devices 110 #3, 210 #3, 310 #3, 410 #3 included in the plurality of power panels 100, 200, 300, 400, respectively, may output the DC power to two separate paths, namely, the power end and the second output end. The power end may be commonly connected to the output ends of the first and second conversion devices 110 #1 and 110 #2, 210 #1 and 210 #2, 310 #1 and 310 #2, 410 #1 and 410 #2, and the second output end may be provided as an independent output end, separate from the power end.

As such, the power end and the second output end to which the DC power is output from the plurality of first power conversion devices 110, 210, 310, 410 may be connected to the bus line 1.

That is, the power end may be connected to the bus line 1 and the input end of the at least one second power conversion device 120, 220, 310, 410, to transfer the DC power to the bus line 1 and the at least one second power conversion device 120, 220, 320, 420, respectively, and the second output end may be connected to the bus line 1 to transfer the DC power to the bus line 1.

The DC power converted in each of the plurality of first power conversion devices 110, 210, 310, 410 may be transferred to the at least one second power conversion device 120, 220, 320, 420 through the power end.

The plurality of first power conversion devices 110, 210, 310, 410 may be controlled by the control units 140, 240, 340, 440.

The at least one second power conversion device 120, 220, 320, 420 may convert the DC power received from the plurality of first power conversion devices 110, 210, 310, 410 into the driving power of the AC power source.

The at least one second power conversion device 120, 220, 320, 420 may include three inverters 120 #1 to 120 #3, 220 #1 to 220 #3, 320 #1 to 320 #3, 420 #1 to 420 #3 to correspond to the loads 20.

The at least one second power conversion device 120, 220, 320, 420 may be connected to the loads 20 to supply the driving power to the connected loads.

Each of the at least one second power conversion device 120, 220, 320, 420 may include an opening and closing mechanism provided on a front end for opening and closing its connection.

The opening and closing mechanism may be a switch which is provided on an input end of each of the at least one second conversion device 120, 220, 320, 420 for controlling power input to the at least one second power conversion device 120, 220, 320, 420.

Here, the opening and closing mechanism provided on the input end may be a circuit breaker that breaks a circuit when detecting an overcurrent.

The driving power converted and output by the at least one second power conversion device 120, 220, 320, 420 may be delivered to each of the loads 20.

Here, the load 20 may be a load of an electric motor M.

The at last one second power conversion device 120, 220, 320, 420 may be controlled by the control units 140, 240, 340, 440.

In the power supply system 1000, the bus line 1 to which the output ends of the plurality of power panels 100, 200, 300, 400 are connected commonly may be a DC bus line through which DC power flows. That is, the DC power transferred through the first or second output ends of each of the plurality of power panels 100, 200, 300, 400 may flow along the bus line 1.

The bus line 1 may have a rating of a magnitude of DC power supplied from at least one conversion device 110 to a magnitude of DC power supplied from two conversion devices.

That is, the rating of the bus line 1 may be a rating at which DC power supplied from at least two conversion devices 110 can be transferred.

The bus line 1 may have a rating at which the transfer of DC power among power panels connected to the bus line 1 can be allowed.

The bus line 1 may configure one DC electric circuit through which the DC power flows.

That is, in the power supply system 1000, the first or second output ends of the plurality of power panels 100, 200, 300, 400 may be commonly connected to the bus line 1 configured as the single electric circuit, so as to enable the transfer of the DC power through the bus line 1.

The plurality of circuit breakers 130, 230, 330, 430 may include a plurality of first circuit breakers 130a, 230a, 330a, 430a provided on the electric circuits connected with the bus line 1 and the power ends, to which the outputs of the DC power among the output ends of the plurality of power panels 100, 200, 300, 400 are commonly connected, so as to control connection and disconnection between the power ends and the bus line 1, and a plurality of second circuit breakers 130b, 230b, 330b, 430b provided on the electric circuits connected with the bus line 1 and the second output ends, from which the outputs of the DC power are separated among the output ends of the plurality of power panels 100, 200, 300, 400, so as to control connection and disconnection between the second output ends and the bus line 1.

That is, in the power supply system 1000, the first or second output ends of each of the plurality of power panels 100, 200, 300, 400 may commonly be connected to the bus line 1 configured as one electric circuit, and the first and second circuit breakers 130, 230, 330, 430 may control the connection and disconnection between the plurality of the power panels 100, 200, 300, 400 and the bus line 1.

In each of the plurality of power panels 100, 200, 300, 400, the first circuit breaker 130a, 230a, 330a, 430a may be provided on the electric circuit connected with the bus line 1 and the power end commonly connected to the output ends of the plurality of first power conversion devices 110, 210, 310, 410.

Accordingly, the power ends of the respective power panels 100, 200, 300, 400 may be commonly connected to the bus line 1.

In each of the plurality of power panels 100, 200, 300, 400, the second circuit breaker 130b, 230b, 330b, 430b may be provided on the electric circuit connected with the bus line 1 and the second output end of each of the plurality of first power conversion devices 110, 210, 310, 410, is connected to the bus line 1.

Accordingly, the second output ends of the respective power panels 100, 200, 300, 400 may be commonly connected to the bus line 1.

The first and second circuit breakers 130, 230, 330, 430 may be DC circuit breakers that cut off DC power, and may be provided on the electric circuits between the first and second output ends and the bus line 1.

The first and second circuit breakers 130, 230, 330, 430 may be normally opened and closed during operation, thereby controlling the connection and disconnection between the first and second output ends and the bus line 1.

Accordingly, the plurality of power panels 100, 200, 300, 400 may be connected to or disconnected from the bus line 1 by opening or closing the plurality of circuit breakers 130, 230, 330, 430.

Of the first and second circuit breakers 130, 230, 330, 430, the first circuit breaker 130a, 230a, 330a, 430a may be provided between the power end connected with the output ends of the plurality of power conversion devices 110, 210, 310, 410 and the bus line 1.

That is, the first circuit breakers 130a, 230a, 330a, 430a may be provided between the power ends of the power module 100 and the bus line 1, respectively, to control connection and disconnection between the plurality of power panels 100, 200, 300, 400 and the bus line 1.

According to this, the plurality of power panels 100, 200, 300, 400 may be connected to the bus line 1 through the power ends, and controlled to be connected to or disconnected from the bus line 1 by opening or closing of the first circuit breakers 130a, 230a, 330a, 430a.

Of the first and second circuit breakers 130, 230, 330, 430, the second circuit breaker 130b, 230b, 330b, 430b may be provided between the second output end as one of the plurality of first power conversion devices 110, 210, 310, 410 and the bus line 1 connected to the second output end.

That is, the second circuit breaker 130b, 230b, 330b, 430b may be provided between the second output end as one output end of each of the plurality of power panels 100, 200, 300, 400 and the bus line 1, to control connection and disconnection between the power module 100 and the bus line 1.

According to this, the plurality of power panels 100, 200, 300, 400 may be connected to the bus line 1 through the second output ends, and controlled to be connected to or disconnected from the bus line 1 by opening or closing of the second circuit breakers 130*b*, 230*b*, 330, 430.

Each of the plurality of power panels 100, 200, 300, 400 may control and monitor the operations of the plurality of first power conversion devices 110, 210, 310, 410 and the at least one second power conversion device 120, 220, 320, 420.

Each of the plurality of power panels 100, 200, 300, 400 may control the plurality of circuit breakers 130, 230, 330, 430, according to the control and monitoring results of the operations of the plurality of first power conversion devices 110, 210, 310, 410 and the at least one second power conversion device 120, 220, 320, 420.

Each of the plurality of power panels 100, 200, 300, 400 may transmit the control and monitoring results of the plurality of first power conversion devices 110, 210, 310, 410 and the at least one second power conversion device 120, 220, 320, 420 to the control device 600.

Each of the plurality of power panels 100, 200, 300, 400 may control and monitor the operations of the plurality of first power conversion devices 110, 210, 310, 410 and the at least one second power conversion device 120, 220, 320, 420, so as to detect states of the DC power and the driving power.

Each of the plurality of power panels 100, 200, 300, 400 may detect the states of the DC power and the driving power and transmit a result of the detection to the control device 600.

In this way, the control device 600 for controlling the plurality of power panels 100, 200, 300, 400 may determine the supply target power panel to supply the DC power to the fault-occurred power panel, and close the first circuit breaker 130*a*, 230*a*, 330*a*, 430*a* of the fault-occurred power panel and the second circuit breaker 130*b*, 230*b*, 330*b*, 430*b* of the supply target power panel, such that the DC power can be supplied from the supply target power panel to the fault-occurred power panel through the bus line 1.

The control device 600 may open the plurality of first and second circuit breakers 130, 230, 330, 430 at normal times, and close the first circuit breaker 130*a*, 230*a*, 330*a*, 430*a* of the fault-occurred power panel and the second circuit breaker 130*b*, 230*b*, 330*b*, 430*b* of the supply target power panel when the DC power is supplied from the supply target power panel to the fault-occurred power panel.

That is, the control device 600 may open the plurality of first and second circuit breakers 130, 230, 330, 430 at normal times. When the fault-occurred power panel exists among the plurality of power panels 100, 200, 300, 400 and the supply target power panel is determined, the control device 600 may close the first circuit breaker 130*a*, 230*a*, 330*a*, 430*a* of the fault-occurred power panel and the second circuit breaker 130*b*, 230*b*, 330*b*, 430*b* of the supply target power panel.

Hereinafter, another embodiment of the power supply system 1000 having the configuration as illustrated in FIG. 1B will be described.

As illustrated in FIG. 1B, in the power supply system 1000 configured such that the bus line 1 is commonly connected to the output ends 01 to 04, through which the DC power flows from the plurality of power panels 100, 200, 300, 400, so as to receive the DC power, and the plurality of circuit breakers is provided on the electric circuits, to which the output ends among the plurality of power panels 100, 200, 300, 400 are connected on the bus line 1, so as to control the connection and disconnection among the plurality of power panels 100, 200, 300, 400, each of the plurality of power panels 100, 200, 300, 400 may include, as illustrated in FIG. 2B, the plurality of first power conversion devices 110, 210, 310, 410, the at least one second power conversion device 120, 220, 320, 420, and the control unit 140, 240, 340, 440.

Each of the plurality of power panels 100, 200, 300, 400 may also have a configuration different from that of the power module 100 as illustrated in FIG. 2B.

The power supply system 1000 as illustrated in FIG. 1B may include the plurality of power panels 100, 200, 300, 400, and the plurality of power panels 100, 200, 300, 400 may be connected commonly to the bus line 1 configured as the plurality of electric circuits.

The power panel 100, 200, 300, 400 may be provided in plurality, for example, may be provided by four or more as illustrated in FIG. 1B.

Each of the plurality of power panels 100, 200, 300, 400 may communicate with the control device 600 and operate according to a result of the communication with the control device 600.

For example, each of the plurality of power panels 100, 200, 300, 400 may receive a control command from the control device 600, so as to operate according to the control command or transfer state information to the control device 600.

The plurality of first power conversion devices 110, 210, 310, 410 included in each of the plurality of power panels 100, 200, 300, 400 may be provided with the output ends connected into one for outputting the DC power.

Accordingly, the output ends of the plurality of first power conversion devices 110, 210, 310, 410 may configure a DC electric circuit through which the DC power flows.

The DC power converted in each of the plurality of first power conversion devices 110, 210, 310, 410 may be transferred to the at least one second power conversion device 120, 220, 320, 420 through the output ends of the plurality of first power conversion devices 110, 210, 310, 410.

Each of the plurality of power panels 100, 200, 300, 400 may include three inverters 120, 220, 320, 420, to supply the driving power to three loads 20 through the three inverters 120, 220, 320, 420.

The plurality of power panels 100, 200, 300, 400 may be configured such that the output ends 01 to 04 of the plurality of first power conversion devices 110, 210, 310, 410 are commonly connected to the bus line 1 and the DC power output from the output ends 01 to 04 can be transferred to the bus line 1.

Accordingly, the output ends 01 to 04 of the respective power panels 100, 200, 300, 400 may be commonly connected to the single bus line 1.

The output ends 01 to 04 of the plurality of power panels 100, 200, 300, 400 may be connected to the plurality of circuit breakers 130-130*a* to 130*f* provided on the bus line 1.

Each of the plurality of power panels 100, 200, 300, 400 may be configured such that the output end for outputting the DC power is connected to three of the plurality of circuit breakers 130.

That is, each output end 01 to 04 of each of the plurality of power panels 100, 200, 300, 400 may be connected to three circuit breakers.

For example, when the number of the plurality of power panels 100, 200, 300, 400 is four as illustrated in FIG. 1B, the first power panel 100 may be connected to the first circuit breaker 130a, the second circuit breaker 130b, and the third circuit breaker 130c, the second power panel 200 may be connected to the second circuit breaker 130b, the fourth circuit breaker 130d and the sixth circuit breaker 130f, the third power panel 300 may be connected to the first circuit breaker 130a, the fourth circuit breaker 130d, and the fifth circuit breaker 130e, and the fourth power panel 400 may be connected to the fourth circuit breaker 130d, the fifth circuit breaker 130e, and the sixth circuit breaker 130f.

Accordingly, each of the plurality of circuit breakers 130 may be connected to two power panels.

For example, the first circuit breaker 130a may be connected to the first power panel 100 and the third power panel 300, the second circuit breaker 130b may be connected to the first power panel 100 and the second power panel 200, the third circuit breaker 130c may be connected to the first power panel 100 and the fourth power panel 400, the fourth circuit breaker 130d may be connected to the second power panel 200 and the third power panel 300, the fifth circuit breaker 130e may be connected to the third power panel 300 and the fourth power panel 400, and the sixth circuit breaker 130f may be connected to the second power panel 200 and the fourth power panel 400.

The output end of one of the plurality of power panels 100, 200, 300, 400 may be connected to the output end of another power panel.

That is, the plurality of power panels 100, 200, 300, 400 may be connected to one another.

For example, the first power panel 100 may be connected to the second to fourth power panels 200, 300, 400 by being connected to the third power panel 300 through the first circuit breaker 130a, the second power panel 200 through the second circuit breaker 130b, and the fourth power panel 400 through the third circuit breaker 130c, respectively.

The second power panel 200 may be connected to the first, third, and fourth power panels 100, 300, 400 by being connected to the first power panel 100 through the second circuit breaker 130b, the third power panel 300 through the fourth circuit breaker 130d, and the fourth power panel 400 through the sixth circuit breaker 130f.

The third power panel 300 may be connected to the first, second and fourth power panels 100, 200, and 400 by being connected to the first power panel 100 through the first circuit breaker 130a, the second power panel 200 through the fourth circuit breaker 130d, and the fourth power panel 400 through the fifth circuit breaker 130e.

In addition, the fourth power panel 400 may be connected to the first to third power panels 100, 200, and 300 by being connected to the first power panel 100 through the second circuit breaker 130b, the third power panel 300 through the fifth circuit breaker 130e, and the second power panel 200 through the sixth circuit breaker 130f.

The bus line 1 may be configured such that a plurality of DC electric circuits through which the DC power flow is connected in a mesh structure.

That is, in the power supply system 1000, the output ends of the plurality of power panels 100, 200, 300, 400 may be commonly connected to the bus line 1 configured in the mesh form, such that the DC power can be delivered through the bus line 1.

The plurality of circuit breakers 130 may be provided respectively on the electric circuits, to which the output ends O1 to O4 among the plurality of power panels 100, 200, 300, 400 are connected on the bus line 1, so as to control the connection and disconnection among the plurality of power panels 100, 200, 300, 400.

Each of the plurality of circuit breakers 130 may be a DC circuit breaker that cuts off DC power, and may be connected between the neighboring power panels 100, 200, 300, 400 connected to the bus line 1.

The plurality of circuit breakers 130 may be connected between the neighboring power panels 100, 200, 300, 400, respectively, to control the connection and disconnection between the plurality of power panels 100, 200, 300, 400 and the bus line 1.

That is, the plurality of circuit breakers 130 may control the connection and disconnection between the plurality of power panels 100, 200, 300, 400 and the bus line 1. Accordingly, the connection and disconnection among the plurality of circuit breakers 130 may be controlled.

The plurality of circuit breakers 130 may be provided respectively on the electric circuits where the output ends of the plurality of power panels 100, 200, 300, 400 are connected to the bus line 1. Accordingly, the connection and disconnection among the plurality of circuit breakers 130 may be controlled.

The plurality of circuit breakers 130 may be provided as many as the number that an output end of one of the power panels 100, 200, 300, 400 is connected to output ends of other power panels.

That is, the output end of one power panel may be connected to the output ends of other power panels.

When the number of the power panels 100, 200, 300, 400 is N, the plurality of circuit breakers 130 may be provided by the number of N(N−1)/2.

For example, when the plurality of power panels 100, 200, 300, 400 is four, that is, when N is 4, six of 4(4−1)/2 may be provided.

The plurality of circuit breakers 130 may be opened normally and closed during operation, to control the connection and disconnection among the plurality of power panels 100, 200, 300, 400.

Accordingly, each of the plurality of power panels 100, 200, 300, 400 may be connected to or disconnected from other power panels through opening or closing of the plurality of circuit breakers 130, 230, 330, 430.

The structure in which the plurality of power panels 100, 200, 300, 400 are connected to one another through the plurality of circuit breakers 130 may be as illustrated in FIG. 1B.

The plurality of power panels 100, 200, 300, 400, as illustrated in FIG. 1B, may be configured such that the output ends of the first power panel 100, the second power panel 200, the third power panel 300, and the fourth power panel 400 are connected to the bus line 1, and the first to sixth circuit breakers 130a to 130f are provided between neighboring output ends of the plurality of power panels 100, 200, 300, 400, respectively.

Hereinafter, the connection will be described in more detail with reference to FIG. 1B.

The first output end O1 of the first power panel 100 may be connected to the bus line 1 so as to be connected to the second output end O2 of the second power panel 200, the third output end O3 of the third power panel 300, and the fourth output end O4 of the fourth power panel 400. Here, the second circuit breaker 130b may be provided between the first and second output ends O1 and O2, the first circuit breaker 130a may be provided between the first and third output ends O1 and O3, and the third circuit breaker 130c may be provided between the first and fourth output ends O1 and O4, such that the connection between the first and second power panels 100 and 200 may be controlled by the second circuit breaker 130b, the connection between the first and third power panels 100 and 300 may be controlled by the first circuit breaker 130a, and the connection between the first and fourth power panels 100 and 400 may be controlled by the third circuit breaker 130c.

The second output end O2 of the second power panel 200 may be connected to the bus line 1 so as to be connected to the first output end O1 of the first power panel 100, the third output end O3 of the third power panel 300, and the fourth output end O4 of the fourth power panel 400. Here, the second circuit breaker 130b may be provided between the first and second output ends O1 and O2, the fourth circuit breaker 130d may be provided between the second and third output ends O2 and O3, and the sixth circuit breaker 130f may be provided between the second and fourth output ends O2 and O4, such that the connection between the first and second power panels 100 and 200 may be controlled by the second circuit breaker 130b, the connection between the second and third power panels 200 and 300 may be controlled by the fourth circuit breaker 130d, and the connection between the second and fourth power panels 200 and 400 may be controlled by the sixth circuit breaker 130f.

The third output end O3 of the third power panel 300 may be connected to the bus line 1 so as to be connected to the first output end O2 of the first power panel 100, the second output end O2 of the second power panel 200, and the fourth output end O4 of the fourth power panel 400. Here, the first circuit breaker 130a may be provided between the first and third output ends O1 and O3, the fourth circuit breaker 130d may be provided between the second and third output ends O2 and O3, and the fifth circuit breaker 130e may be provided between the third and fourth output ends O3 and O4, such that the connection between the first and third power panels 100 and 300 may be controlled by the first circuit breaker 130a, the connection between the second and third power panels 200 and 300 may be controlled by the fourth circuit breaker 130d, and the connection between the third and fourth power panels 300, 400 may be controlled by the fifth circuit breaker 130e.

The fourth output end O4 of the fourth power panel 400 may be connected to the bus line 1 so as to be connected to the first output end O2 of the first power panel 100, the second output end O2 of the second power panel 200, and the third output end O3 of the third power panel 300. Here, the third circuit breaker 130c may be provided between the first and fourth output ends O1 and O4, the sixth circuit breaker 130f may be provided between the second and fourth output ends O2 and O4, and the fifth circuit breaker 130e may be provided between the third and fourth output ends O3 and O4, such that the connection between the first and fourth power panels 100 and 400 may be controlled by the third circuit breaker 130c, the connection between the second and fourth power panels 200 and 400 may be controlled by the sixth circuit breaker 130f, and the connection between the third and fourth power panels 300, 400 may be controlled by the fifth circuit breaker 130e.

As the first to fourth power panels 100, 200, 300, 400 are connected in this way, the output ends O1 to O4 of the plurality of power panels 100, 200, 300, 400 may be connected in a mesh form.

In this way, by virtue of the interconnection among the plurality of power panels 100, 200, 300, 400, the DC power can flow along the plurality of power panels 100, 200, 300, 400.

That is, as the plurality of power panels 100, 200, 300, 400 is connected to one another, the output ends of the plurality of power panels 100, 200, 300, 400 may be connected in the mesh form through the bus line 1. Accordingly, the first power panel 100 may be connected to the second power panel 200, the third power panel 300, and the fourth power panel 400, so as to receive or supply the DC power together with the second power panel 200, the third power panel 300 or the fourth power panel 400, the second power panel 200 may be connected to the first power panel 100, the third power panel 300, and the fourth power panel 400, so as to receive or supply the DC power together with the first power panel 100, the third power panel 300 or the fourth power panel 400, and the third power panel 300 may be connected to the first power panel 100, the second power panel 200, and the fourth power panel 400, so as to receive or supply the DC power together with the first power panel 100, the second power panel 200 or the fourth power panel 400, and the fourth power panel 400 may be connected to the first power panel 100, the second power panel 200, and the third power panel 300, so as to receive or supply the DC power together with the first power panel 100, the second power panel 200 or the third power panel 300.

In this way, the plurality of power panels 100, 200, 300, 400 connected in the mesh form through the bus line 1 may receive or supply the DC power among one another by way of opening or closing of the plurality of circuit breakers 130.

For example, when the first circuit breaker 130a connected to the electric circuit between the first power panel 100 and the third power panel 300 is closed, the reception and supply of the DC power between the first power panel 100 and the third power panel 300 may be allowed. When the second circuit breaker 130b connected to the electric circuit between the first power panel 100 and the second power panel 200 is closed, the reception and supply of the DC power between the first power panel 100 and the second power panel 300 may be allowed. When the third circuit breaker 130c connected to the electric circuit between the first power panel 100 and the fourth power panel 400 is closed, the reception and supply of the DC power between the first power panel 100 and the fourth power panel 400 may be allowed. When the fourth circuit breaker 130d connected to the electric circuit between the second power panel 200 and the third power panel 300 is closed, the reception and supply of the DC power between the second power panel 200 and the third power panel 300 may be allowed. When the fifth circuit breaker 130e connected to the electric circuit between the third power panel 300 and the fourth power panel 400 is closed, the reception and supply of the DC power between the third power panel 300 and the fourth power panel 400 may be allowed. When the sixth circuit breaker 130f connected to the electric circuit between the second power panel 200 and the fourth power panel 400 is closed, the reception and supply of the DC power between the second power panel 200 and the fourth power panel 400 may be allowed.

Each of the plurality of power panels 100, 200, 300, 400 may control and monitor the operations of the plurality of first power conversion devices 110, 210, 310, 410 and the at least one second power conversion device 120, 220, 320, 420.

Each of the plurality of power panels 100, 200, 300, 400 may request the control device 600 to control opening and closing of each of the first to fourth circuit breakers 130a to 130d according to the control and monitoring results of the operations of the plurality of first power conversion devices 110, 210, 310, 410 and the at least one second power conversion device 120, 220, 320, 420.

Each of the plurality of power panels 100, 200, 300, 400 may transmit the control and monitoring results of the plurality of first power conversion devices 110, 210, 310, 410 and the at least one second power conversion device 120, 220, 320, 420 to the control device 600.

Each of the plurality of power panels 100, 200, 300, 400 may control and monitor the operations of the plurality of first power conversion devices 110, 210, 310, 410 and the at least one second power conversion device 120, 220, 320, 420, so as to detect states of the DC power and the driving power.

Each of the plurality of power panels 100, 200, 300, 400 may detect the states of the DC power and the driving power and transmit a result of the detection to the control device 600.

In this way, the control device 600 for controlling the plurality of power panels 100, 200, 300, 400 may determine the supply target power panel to supply the DC power to the fault-occurred power panel, and close the circuit breaker, to which the fault-occurred power panel and the supply target power panel are connected, of the plurality of circuit breakers 130a to 130f such that the DC power can be supplied from the supply target power panel to the fault-occurred power panel through the bus line 1.

The control device 600 may open the plurality of circuit breakers 130 at normal times, and close the circuit breaker, to which the fault-occurred power panel and the supply target power panel are connected, of the plurality of circuit breakers 130a to 130f, when the supply target power panel supplies the DC power to the fault-occurred power panel.

That is, the control device 600 may open the plurality of circuit breakers 130 at normal times, while closing the circuit breaker, to which the fault-occurred power panel and the supply target power panel are connected, of the plurality of circuit breakers 130a to 130f, when the fault-occurred power panel exists in the plurality of power panels 100, 200, 300, 400 and the supply target power panel is determined.

The power supply system 1000, which controls the DC power to be supplied through the bus line 1 by determining the supply target power panel, will be implemented in different forms from those illustrated in FIG. 1A or 1B.

Hereinafter, a detailed embodiment of a method for controlling the power supply system 1000 will be described. For convenience of description, the following description will be given based on the power supply system 1000 having the configuration illustrated in FIG. 1A.

The operation of the power supply system 1000 including the plurality of power panels 100, 200, 300, 400 will be described with reference to FIGS. 3 to 6.

FIGS. 3 to 6 illustrates an example in which the power supply system 1000 includes five power panels 100, 200, 300, 400, 500. The number of the plurality of power panels 100, 200, 300, 400, 500 included in the power supply system 1000 may be fewer or greater than 5 or may be 5.

Figure 3:
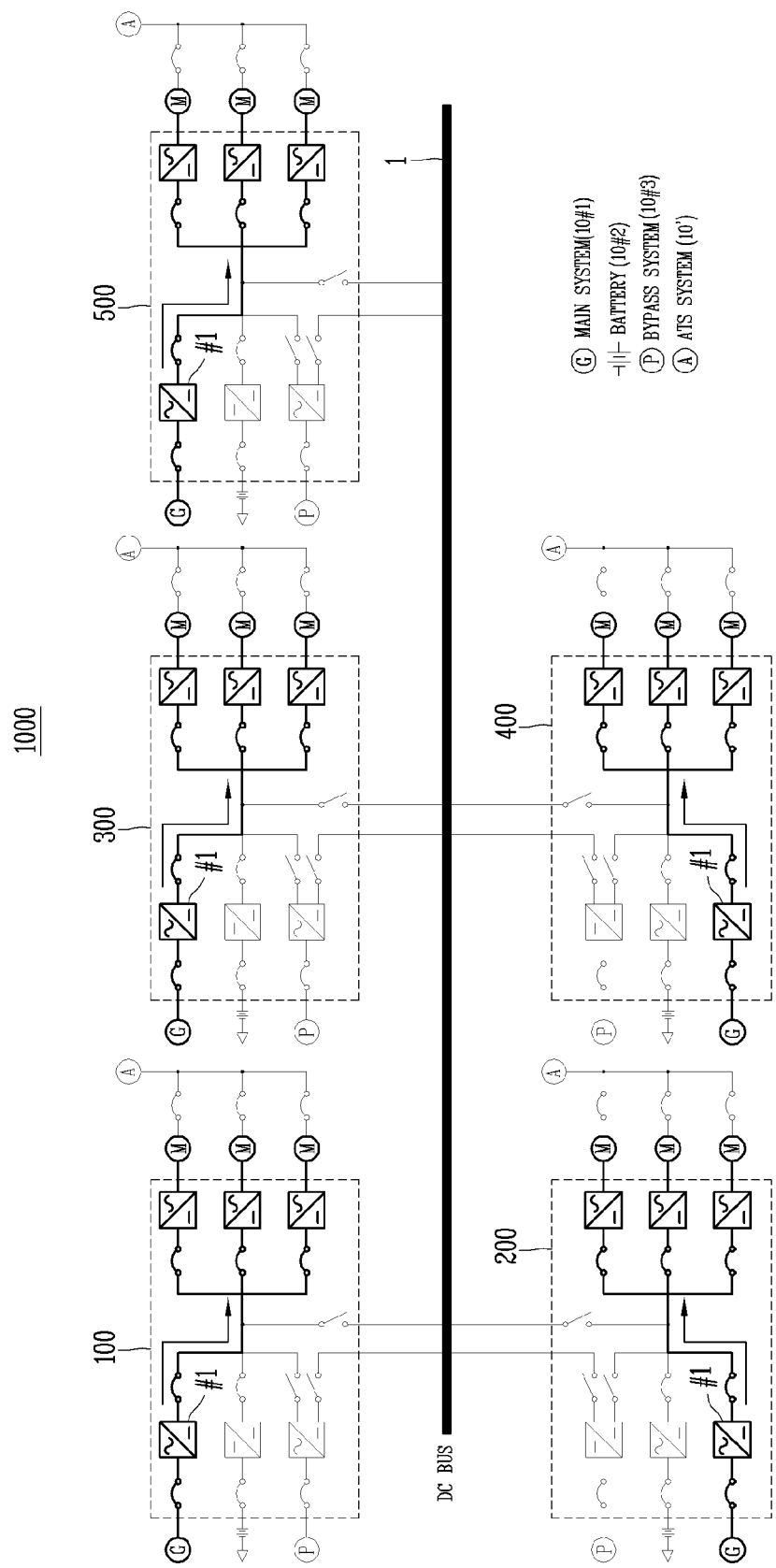
FIG. 3 is an exemplary view 1 illustrating a detailed example of a power supply system in accordance with one embodiment of the present disclosure.

FIG. 3 illustrates a case where each of the plurality of power panels 100, 200, 300, 400, 500 receives power from the system power source G among the plurality of power supply sources 10. In this case, power may be received from the system power source G, with shutting down the power supply from the bypass power source P and the battery power source B. The supplied power may be converted sequentially into the DC power and the driving power so as to be supplied to each of the loads 20.

The example illustrated in FIG. 3 is a general case where the power supply system 1000 is operated by receiving power from the system power source G. The normal operation of the power supply system 1000 may be carried out in this manner.

Figure 4:
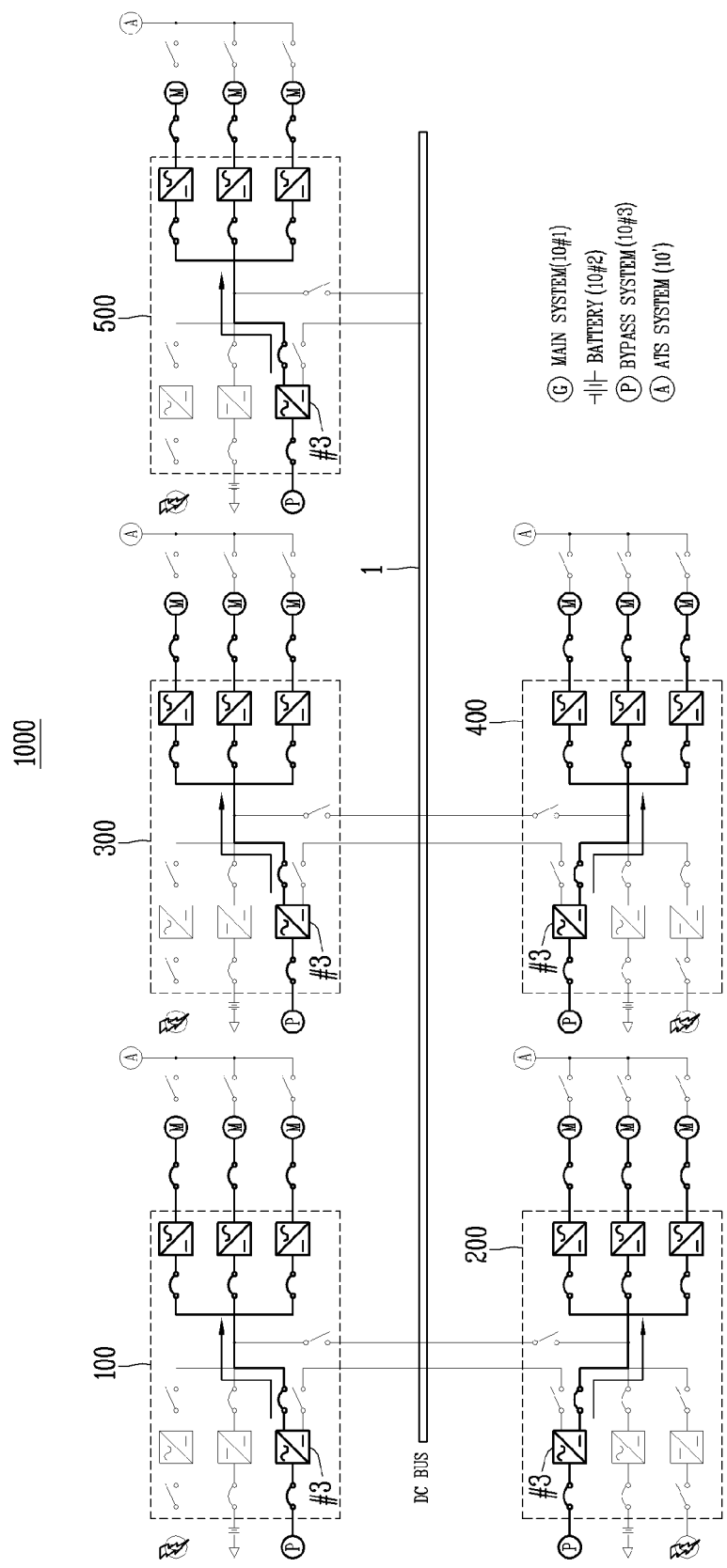
FIG. 4 is an exemplary view 2 illustrating a detailed example of a power supply system in accordance with one embodiment of the present disclosure.

FIG. 4 illustrates a case where each of the plurality of power panels 100, 200, 300, 400, 500 receives power from the bypass power supply P among the plurality of power supply sources 10, which corresponds to a case in which a fault has occurred in the system power source G. In this case, power may be received from the bypass power source P, with shutting down the power supply from the system power source G and the battery power source B. The supplied power may be converted sequentially into the DC power and the driving power so as to be supplied to each of the loads 20.

The example illustrated in FIG. 4 is a specific case where the power supply system 1000 is operated by receiving power from the bypass power source G. The specific operation of the power supply system 1000 may be carried out in this manner.

Figure 5:
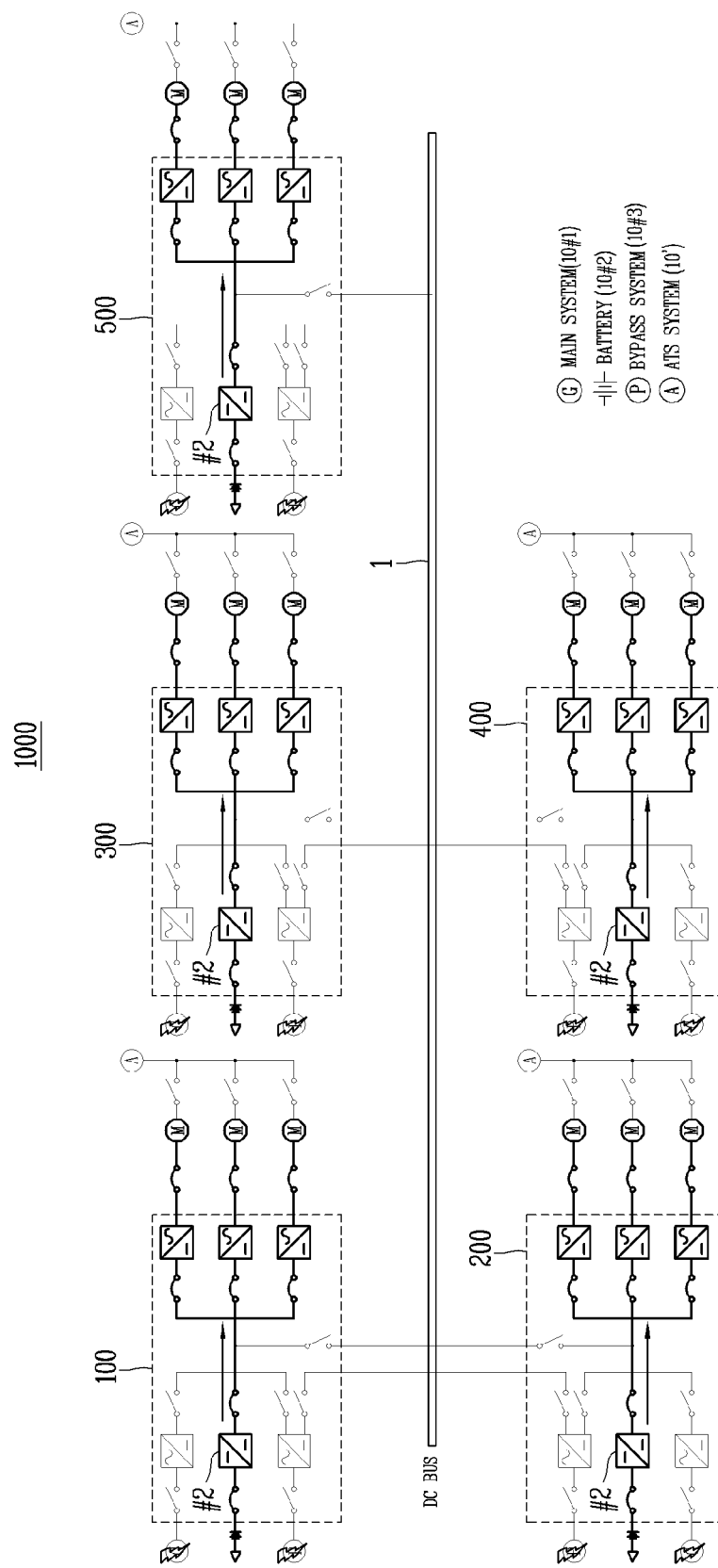
FIG. 5 is an exemplary view 3 illustrating a detailed example of a power supply system in accordance with an embodiment of the present disclosure.

FIG. 5 illustrates a case where each of the plurality of power panels 100, 200, 300, 400, 500 receives power from the battery power source B among the plurality of power supply sources 10, which corresponds to a case in which a fault has occurred in the system power source G and the bypass power source P. In this case, power may be received from the battery power source G, with shutting down the power supply from the system power source G and the bypass power source P. The supplied power may be converted sequentially into the DC power and the driving power so as to be supplied to each of the loads 20.

The example illustrated in FIG. 5 is an interruption case where the power supply system 1000 is operated by receiving power from the battery power source G. Such interruption operation of the power supply system 1000 may be carried out in this manner.

Figure 6:
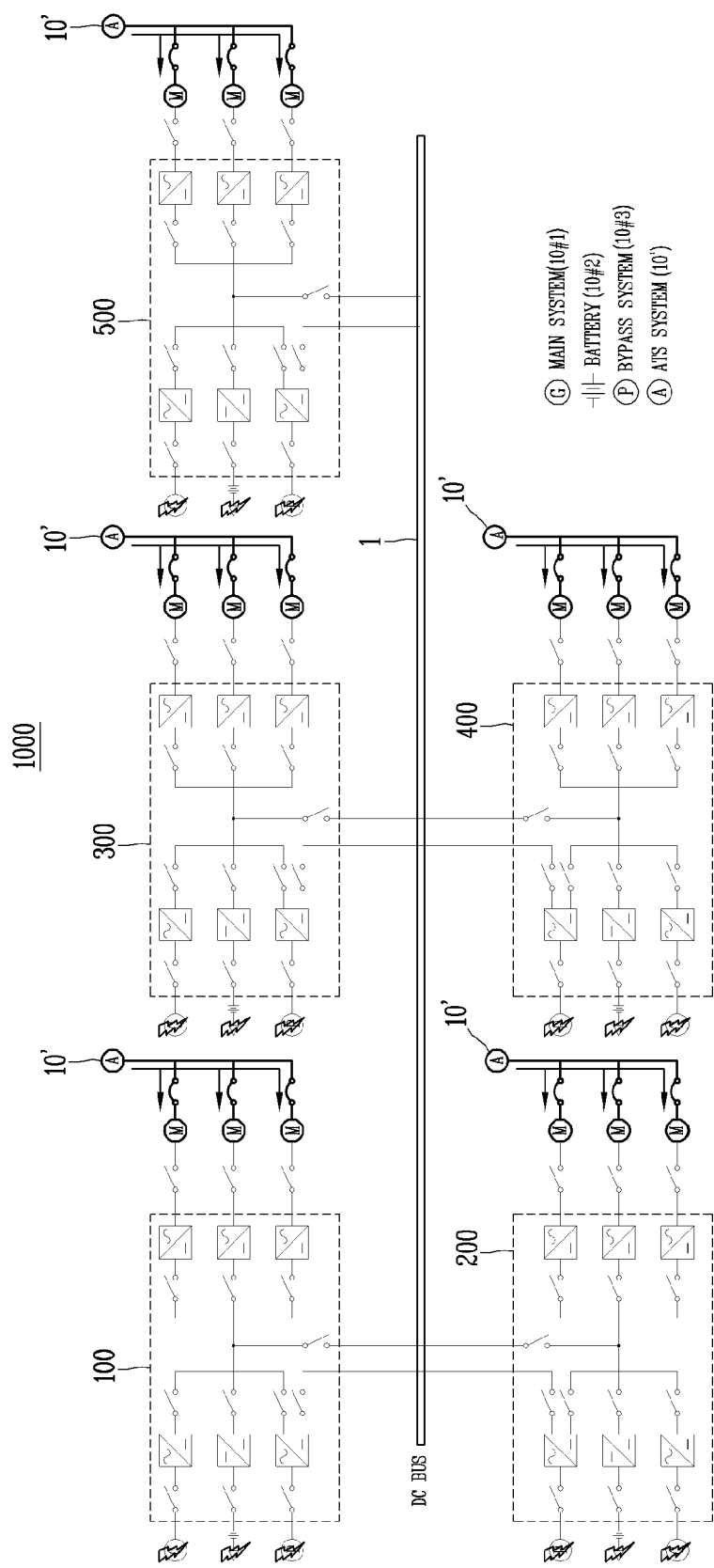
FIG. 6 is an exemplary view 4 illustrating a detailed example of a power supply system in accordance with an embodiment of the present disclosure.

FIG. 6 illustrates a case where each of the plurality of power panels 100, 200, 300, 400, 500 receives power from the emergency power supply A among the plurality of power supply sources 10, which corresponds to a case in which a fault has occurred in the system power source G, the bypass power source P, and the battery power source B. In this case, the emergency power source A may supply the driving power directly to each of the loads while the power supply from the system power source G, the bypass power source P, and the battery power source B is shut down.

The example illustrated in FIG. 6 is an emergency case where the power supply system 1000 is operated by receiving power from the emergency power source A. Such emergency operation of the power supply system 1000 may be carried out in this manner.

In this way, the power supply system 1000 may be configured such that each of the plurality of power panels 100, 200, 300, 400, 500 is operated by receiving power from the same power supply source or selectively from one of the plurality of power supply sources 10.

For example, the first and second power panels 100 and 200 may be operated by receiving power from the system power source G, the third and fourth power panels 300, 400 may be operated by receiving power from the bypass power source P, and the fifth power panel 500 may be operated by receiving power from the battery power source B.

In addition, each of the plurality of power panels 100, 200, 300, 400, 500 may be operated by receiving power from at least one of the power supply sources 10.

For example, when the DC power is supplied from the second power panel 200 to the first power panel 100 due to a fault occurred in the first power panel 100, the second power panel 200 may convert power supplied from the system power source G into the DC power through a 2-1th conversion device 210 #1 and transfer the DC power to each of the at least one second conversion device 200. The second power panel 200 may further receive power from the bypass power source P, convert the further-received power into the DC power through a 2-3th conversion device 210 #3, and transfer the DC power converted in the 2-3th conversion device 210 #3 to each of the at least one second conversion device 200 of the first power panel 100 through the bus line 1.

In the example, by closing the first circuit breaker 130*a* of the first power panel 100 and the second circuit breaker 230*b* of the second power panel 200, the first power panel 100 and the second power panel 200 may be connected to the bus line 1, such that the DC power can be supplied from the second power panel 200 to the first power panel 100 through the bus line 1.

In this way, each of the plurality of power panels 100, 200, 300, 400, 500 can be operated by receiving power from at least one of the power supply sources 10, which may allow the power supply among the plurality of power panels 100, 200, 300, 400, 500, namely, a UPS function to be performed among the plurality of power panels 100, 200, 300, 400, 500.

The plurality of power panels 100, 200, 300, 400, 500 that converts and supplies the DC power may be controlled by the control device 600.

The control device 600 may perform communication with the plurality of power panels 100, 200, 300, 400, 500, so as to control the plurality of power panels 100, 200, 300, 400, 500 based on state information received from the plurality of power panels 100, 200, 300, 400, 500.

For example, the control device 600 may control the conversion and supply of the DC power and the conversion and supply of the driving power in the plurality of power panels 100, 200, 300, 400, 500 based on state information related to the DC power and the driving power received from the plurality of power panels 100, 200, 300, 400, 500.

The control device 600 may perform communication with the plurality of power panels 100, 200, 300, 400, 500, so as to control the conversion and supply of the driving power of the plurality of power panels 100, 200, 300, 400, 500 or control the first and second circuit breakers 130, 230, 330, 430, 530 included in the plurality of power panels 100, 200, 300, 400, 500, based on state information received from the plurality of power panels 100, 200, 300, 400, 500.

The control device 600 may also detect states of the plurality of power supply sources 10 and the loads 20 or receive information related to the states of the plurality of power supply sources 10 and the loads 20 from an external communication device, so as to control the conversion and supply of the driving power of the plurality of power panels 100, 200, 300, 400, 500 or control the first and second circuit breakers 130, 230, 330, 430, 530 included in the plurality of power panels 100, 200, 300, 400, 500, based on the states of the plurality of power supply sources 10 and the loads 20.

In this case, the control device 600 may transmit a control command to the plurality of power panels 100, 200, 300, 400, 500 to control the conversion and supply of the driving power of the plurality of power panels 100, 200, 300, 400, 500 or control the first and second circuit breakers 130, 230, 330, 430, 530 included in the plurality of power panels 100, 200, 300, 400, 500. Then, the control units 140, 240, 340, 440, 540 included in the plurality of power panels 100, 200, 300, 400, 500 can perform such control according to the control command.

For example, in order to shut down the power supply from the system power source G, which is supplying power to the plurality of power panels 100, 200, 300, 400, and switch the system power source G to another power supply source when a fault has occurred in the entire system power source G, the control device 600 may transmit a control command to the control units 140, 240, 340, 440, included in the plurality of power panels 100, 200, 300, 400, to open the first and second circuit breakers 130, 230, 330, 430, receive power from a power source excluding the system power source G, and convert the received power to the DC power for supply. Then, the control device 600 may open the first and second circuit breakers 130, 230, 330, 430 to receive power from the bypass power source P or the battery power source B and convert the received power into the DC power converted into the DC power for supply.

Figure 7:
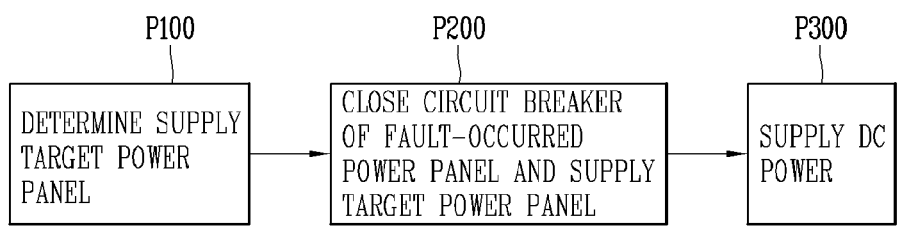
FIG. 7 is a block diagram 1 illustrating a detailed control process of a power supply system in accordance with one embodiment the present disclosure.

In this way, the control device 600 for controlling the reception and supply of the DC power by opening and closing of the plurality of circuit breakers 130 may control the DC power to be supplied to the fault-occurred power panel through the process illustrated in FIG. 7.

As illustrated in FIG. 7, the control device 600 may determine a supply target power panel which is to supply the DC power to a fault-occurred power panel among the plurality of power panels 100, 200, 300, 400 (P100). The control device 600 may close at least one circuit breaker connected to the fault-occurred power panel and the supply target power panel, among the plurality of circuit breakers 130 (P200), such that the DC power can be supplied from the supply target power panel to the fault-occurred power panel through the bus line 1 (P300).

The control device 600 may determine the supply target power panel, among the remaining power panels excluding the fault-occurred power panel.

That is, when the control device 600 determines the supply target power panel (P100), the control device 600 may determine the supply target power panel among the remaining power panels excluding the fault-occurred power panel from the plurality of power panels 100, 200, 300, 400.

For example, when a fault has occurred in the first power panel 100, the control device 600 may determine the supply target power panel among the second to fourth power panels 200, 300, 400 (P100).

The control device 600 may determine supply priorities of the remaining power panels according to a preset determination criterion, and determine the supply target power panel according to the supply priorities.

That is, when determining the supply target power panel (P100), the control device 600 may determine the supply priorities of the remaining power panels according to the determination criterion, and determine the supply target power panel according to the supply priorities.

The supply priorities may be priorities of supplying the DC power to the fault-occurred power panel.

For example, the supply priorities may be priorities that are advantageous in supplying the DC power to the fault-occurred power panel.

The determination criterion may be a criterion for determining the supply priorities according to at least one of a state of each of the remaining power panels and an arranged position of each of the remaining power panels.

That is, the supply priorities may be determined according to at least one of the state of each of the remaining power panels and the arranged position of each of the remaining power panels.

According to this, the control device 600 may determine the supply priorities of the remaining power panels according to at least one of the state of each of the remaining power panels and the arranged position of each of the remaining power panels, and determine the supply target power panel according to the determined supply priorities (P100).

Here, the supply target power panel may be a power panel having the highest priority among the supply priorities.

Accordingly, the control device 600 may determine a power panel having the highest priority among the supply priorities as the supply target power panel.

That is, the control device 600 may evaluate the supply priorities of the remaining power panels according to the determination criterion, and determine a power panel with the highest supply priority corresponding to the evaluation result as the supply target power panel (P100), and control the supply target power panel to supply the DC power to the fault-occurred power panel through the bus line 1 (P300).

The control device 600 may determine the supply priorities according to states of the plurality of power supply sources 10 of each of the remaining power panels.

For example, the control device 600 may determine the supply priorities according to a power storage state of the battery power source 10 #2 and a rating of the second AC power source 10 #3 in each of the remaining power panels.

The control device 600 may determine the power storage state of the battery power source 10 #2 of the plurality of power supply sources 10 of each of the remaining power panels, and determine the supply priorities according to the determined power storage state.

The power storage state may be a state of an available capacity of the battery power source 10 #2.

The control device 600 may determine the supply priorities according to the order of the available capacity of each of the remaining power panels.

As a more detailed example, in case where the first power panel 100 is the fault-occurred power panel, when the battery power source 10 #2 of the second power panel 200 is charged to 100%, the battery power source 10 #2 of the third power panel 300 is charged to 80%, and the battery power source 10 #2 of the fourth power panel 400 is charged to 90%, the supply priorities may be determined in the order of the second power panel 200, the fourth power panel 400, and the third power panel 300.

The control device 600 may determine the supply priorities according to a degree to which the position of each of the remaining power panels is adjacent to the fault-occurred power panel.

The control device 600 may determine the supply priorities in the order of the degree to which the position of each of the remaining power panels is adjacent to the fault-occurred power panel.

That is, the control device 600 may determine the supply priorities according to the order adjacent to the fault-occurred power panel.

As a more detailed example, in case where the first power panel 100 is the fault-occurred power panel, when the second power panel 200 and the third power panel 300 are closest to the first power panel 100 and the fourth power panel 300 is disposed at an opposite position of the first power panel 100 from the third power panel 300, the supply priorities may be determined in the order of the second power panel 200 and the third power panel 300 with the same priority and the fourth power panel 400 according to the adjacent degrees.

The control device 600 may determine the order priorities based on at least one of the states of the plurality of power supply sources of each of the remaining power panels, and the degree to which each of the remaining power panels is adjacent to the fault-occurred power panel, and determine a power panel having the highest supply priority as the supply target power panel (P100).

After determining the supply target power panel (P100), the control device 600 may close circuit breakers connected to the fault-occurred power panel and the determined supply target power panel (P200).

For example, when the fault-occurred power panel is the first power panel 100 and the second power panel 200 is determined as the supply target power panel 200 (P100), the control device 600 may close the first circuit breaker 130a of the first power panel 100 and the second circuit breaker 130b of the second power panel 200.

Accordingly, the first power panel 100 and the second power panel 200 may be connected to the bus line 1. The second power panel 200 may transmit the DC power to the bus line 1 through the second output end. The first power panel 100 may receive the DC power from the bus line 1 through the power end. Therefore, the DC power may be supplied from the second power panel 200 to the first power panel 100 (P300).

That is, in case where the power supply system 1000 is configured as illustrated in FIG. 1A, the first circuit breaker 130a, 230a, 330a, 430a of the fault-occurred power panel and the second circuit breaker 130b, 230b, 330b, 430b of the supply target power panel may be closed.

In this case, the connection between the fault-occurred power panel and the supply target power panel may be made through the first circuit breaker of the fault-occurred power panel and the second circuit breaker of the supply target power panel, and the opening and closing of the circuit breakers corresponding to the fault-occurred power panel and the supply target power panel can be carried out easily. This may result in facilitating the connection and disconnection between the bus line 1 and the plurality of power panels 100, 200, 300, 400, and the supply of the DC power.

Alternatively, in case where the power supply system 1000 is configured as illustrated in FIG. 1B, when the fault-occurred power panel is the first power panel 100 and the fourth power panel 400 is determined as the supply target power panel (P100), the third circuit breaker 130c to which the first power panel 100 and the fourth power panel 400 are connected may be closed (P200).

Accordingly, the first power panel 100 and the fourth power panel 400 may be connected to the bus line 1. The fourth power panel 400 may transmit the DC power to the first power panel 100 through the bus line 1. The first power panel 100 may receive the DC power through the bus line 1. Therefore, the DC power may be supplied from the fourth power panel 400 to the first power panel 100 (P300).

That is, when the power supply system 1000 is configured as illustrated in FIG. 1B, any one circuit breaker 130a, 130b, 130c, 130d, 130e, 130f to which the fault-occurred power panel and the supply target power panel are connected may be closed (P200).

In this case, the connection between the fault-occurred power panel and the supply target power panel may be made through any one circuit breaker, and the opening and closing of the circuit breakers corresponding to the fault-occurred power panel and the supply target power panel can be carried out easily. This may result in facilitating the determination of the supply target power panel according to the determination of the supply priorities and the supply of the DC power.

When a fault has occurred in the supply target power panel while supplying the DC power to the fault-occurred power panel, the control device 600 may determine a supply replacement power panel to replace the supply target power panel according to the supply priorities, and control the DC power to be supplied from the supply replacement power panel to the fault-occurred power panel.

That is, when a fault has occurred in the supply target power panel, the control device 600 may determine a power panel, which has the next highest supply priority of the determined supply priorities, as the supply replacement power panel and replace the supply target power panel with the supply replacement power panel.

For example, in case where the first power panel 100 is the fault-occurred power panel, and the supply priorities have been determined in the order of the third power panel 300, the fourth power panel 400, and the second power panel 200 so that the third power panel 300 as the supply target power panel is supplying the DC power to the first power panel, when a fault has occurred in the second AC power source 10 #2 supplying the DC power to the first power panel 100, the control device 600 may determine the fourth power panel 400 corresponding to the higher supply priority next to the third power panel 300 as the supply replacement power panel according to the supply priorities. Then, the control device 600 may switch the third power panel 300 to the fourth power panel 400 such that the fourth power panel 400 supplies the DC power to the first power panel 100.

In this way, the control device 600 that determines the supply target power panel to supply the DC power to the fault-occurred power panel may determine a plurality of supply target power panels corresponding to a plurality of fault-occurred power panels when the fault-occurred power panel is in plurality, and close a plurality of circuit breakers connected to the plurality of fault-occurred power panels and the plurality of supply target power panels, such that the DC power can be supplied from the plurality of supply target power panels to the plurality of fault-occurred power panels, respectively, through the bus line 1.

For example, when the first power panel 100 and the third power panel 300 are the fault-occurred power panels, the control device 600 may determine a supply target power panel corresponding to the first power panel 100 and a supply target power panel corresponding to the third power panel 300, and close a circuit breaker connected to the first power panel 100 and the supply target power panel corresponding to the first power panel 100 and a circuit breaker connected to the third power panel 300 and the supply target power panel corresponding to the third power panel 300, such that the DC power can be supplied from the supply target power panels to the first power panel 100 and the third power panel 300, respectively.

Hereinafter, a detailed example of the operation of the power supply system 1000 will be described with reference to FIGS. 8 to 15.

FIGS. 8 to 15 are exemplary diagrams sequentially illustrating the operation of the power supply system according to occurrence of a fault when five power panels 100, 200, 300, 400, 500 are provided. Detailed embodiments of the power supply system 1000 may not be limited to those illustrated in FIGS. 8 to 15.

Figure 8:
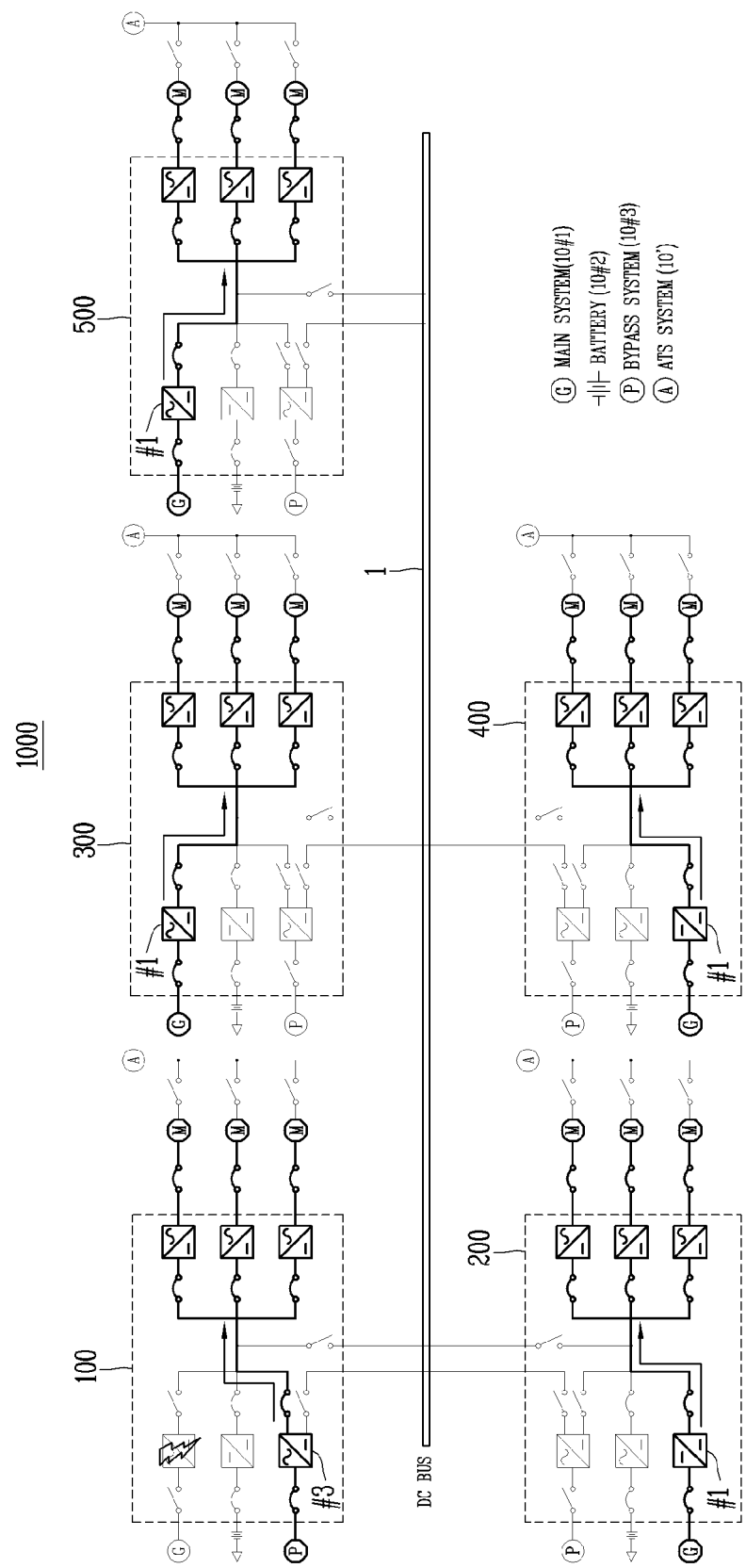
FIG. 8 is an exemplary view 1 sequentially illustrating a detailed example of a power supply system in accordance with one embodiment of the present disclosure.
Figure 9:
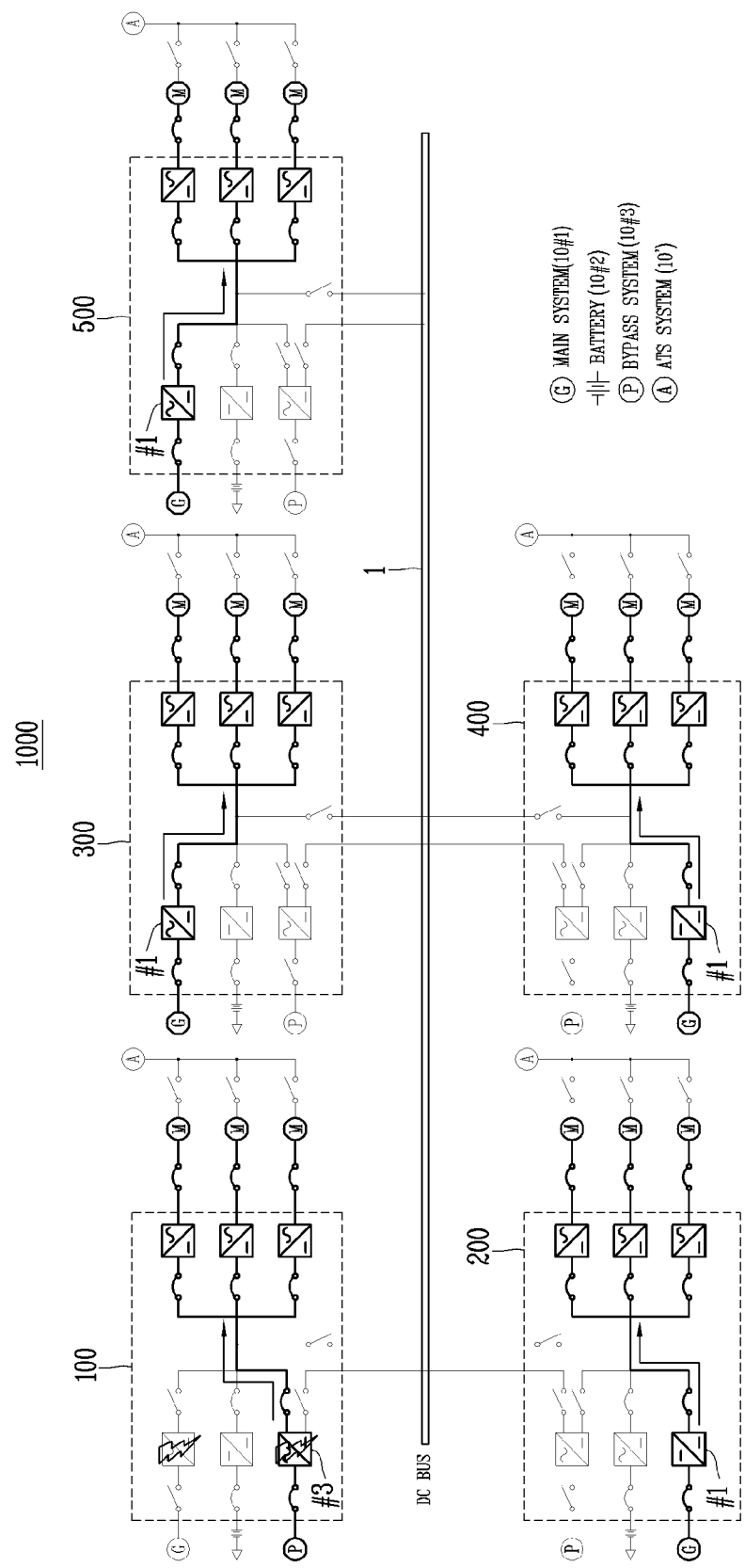
FIG. 9 is an exemplary view 2 sequentially illustrating a detailed example of a power supply system in accordance with one embodiment of the present disclosure.
Figure 10:
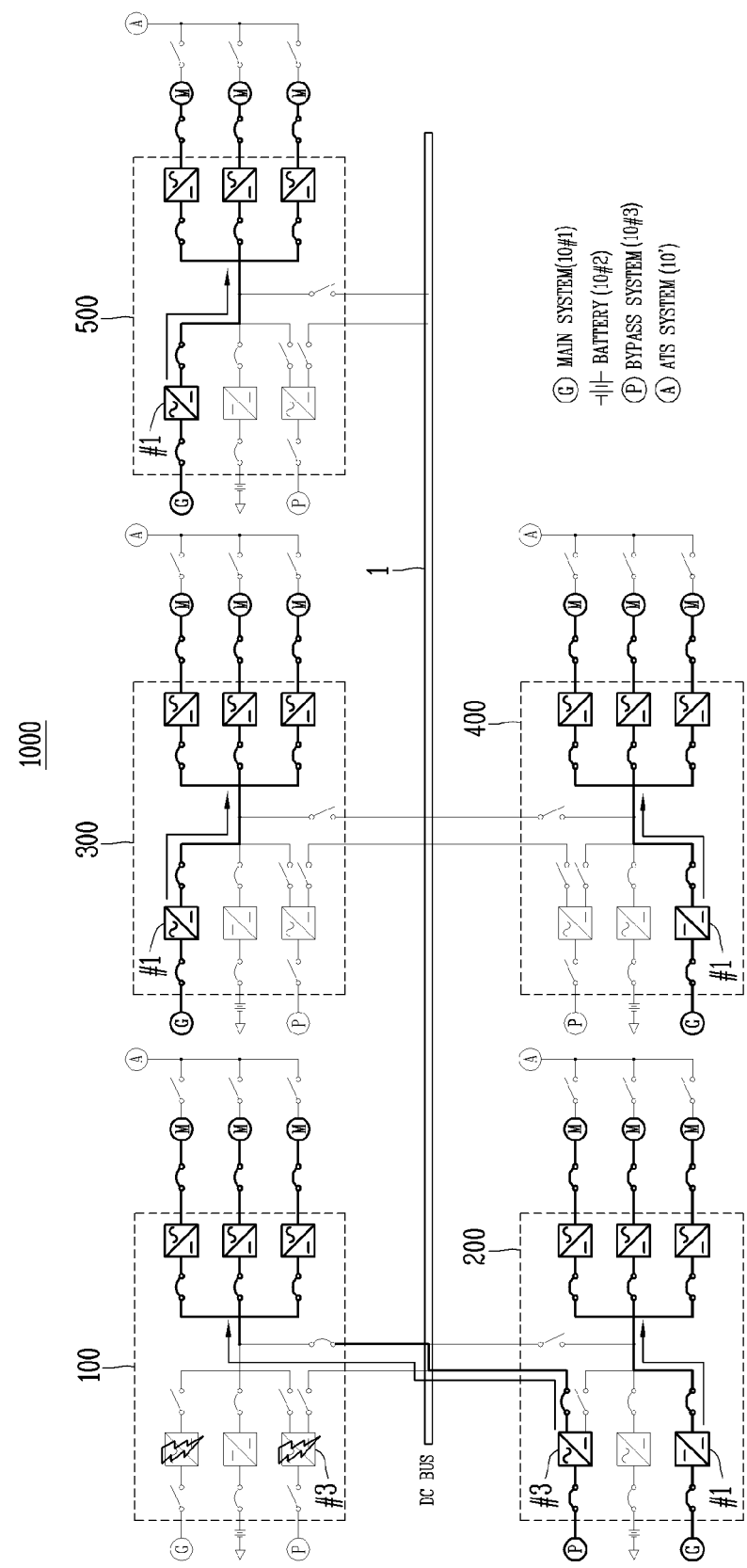
FIG. 10 is an exemplary view 3 sequentially illustrating a detailed example of a power supply system in accordance with one embodiment of the present disclosure.

FIG. 8 illustrates an example in which a fault has occurred in the first AC power source 10 #1 of the first power panel 100 of the plurality of power panels 100, 200, 300, 400, 500, and thus the DC power is supplied to the at least one second power conversion device 220 by switching the first AC power source 10 #1 to the second AC power source 10 #3. As illustrated in FIG. 9, when the DC power is not supplied to the at least one second power conversion device 220 due to occurrence of a fault in the second AC power source 10 #3, the first circuit breaker 130*a* of the first power panel 100 may be closed, as illustrated in FIG. 10, and the second circuit breaker 230*b* of the second power panel 200 adjacent to the first power panel 100 may be closed, such that the DC power can be supplied to the at least one second power conversion device 220 through the conversion device 210 #3 corresponding to the second output end of the second power panel 200.

Figure 11:
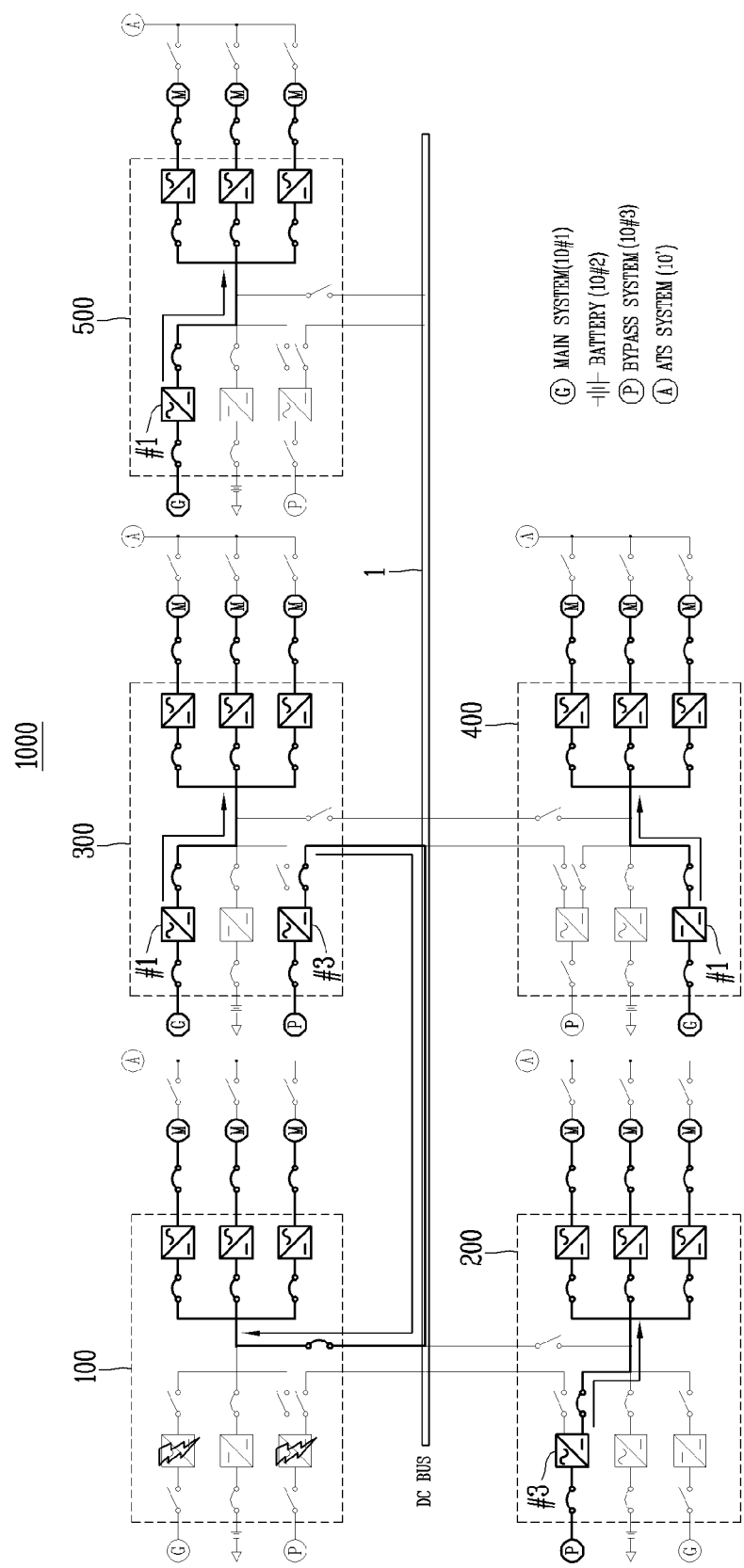
FIG. 11 is an exemplary view 4 sequentially illustrating a detailed example of a power supply system in accordance with one embodiment of the present disclosure.

As illustrated in FIG. 11, when the second power panel 200 receives power from the second AC power panel 10 #3 and the conversion device 210 #3 which is connected to the second AC power source 10 #3 and corresponds to the second output end is supplying the DC power to the at least one second power conversion device 220, since the DC power cannot be supplied from the second power panel 200, the second power panel 200 may be excluded and the second circuit breaker 330*b* of the third power panel 300 adjacent to the first power panel 100 may be closed. Therefore, the DC power can be supplied to the at least one second power conversion device 220 through the conversion device 310 #3 corresponding to the second output end of the third power panel 300.

Figure 12:
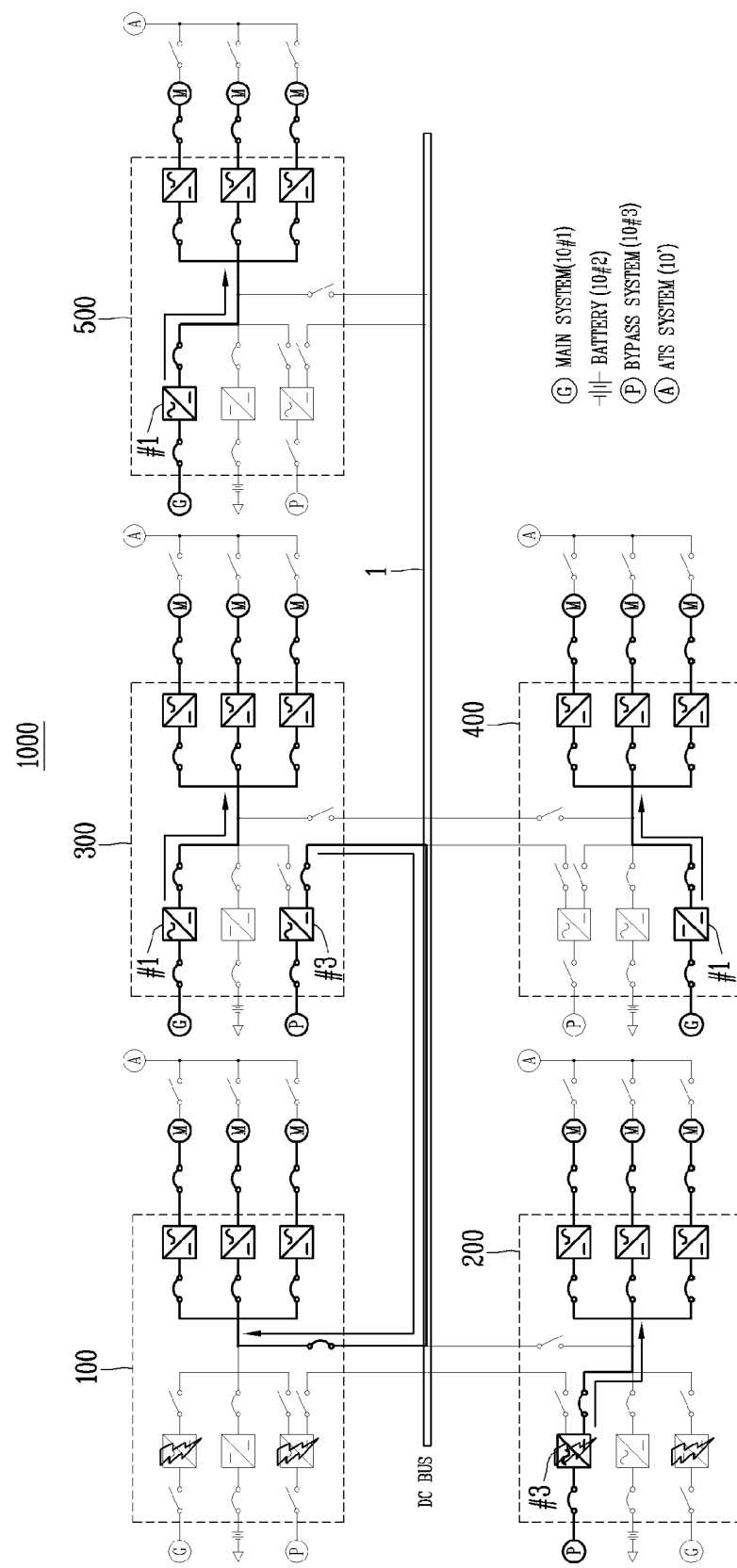
FIG. 12 is an exemplary view 5 illustrating a detailed example of a power supply system in accordance with one embodiment of the present disclosure.

In the state as illustrated in FIG. 11, when fault conditions occur in the first AC power source 10 #1 and the conversion device 210 #3 connected to the second AC power source 10 #3 in the second power panel 200 as illustrated in FIG. 12, since the DC power is being supplied from the third power panel 300 to the first power panel 100 through the bus line 1, the second power panel 200 cannot receive the DC power from other power panels. Accordingly, as illustrated in FIG. 13, the second power panel 200 may switch the second AC power source 10 #3 into the battery power source 10 #2 such that the DC power can be supplied to the at least one second power conversion device 210 through the conversion device 210 #2 connected to the battery power source 10 #2.

Figure 13:
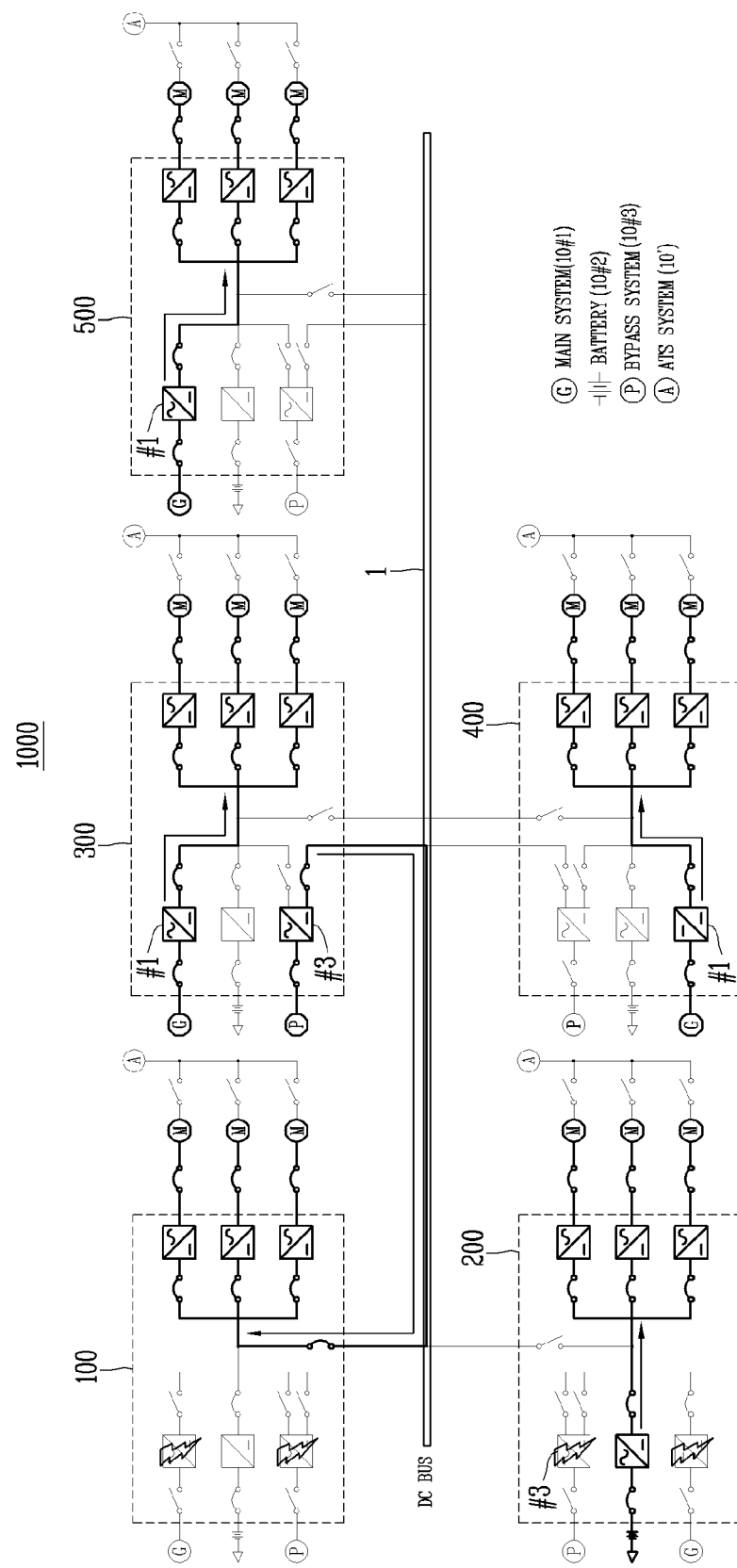
FIG. 13 is an exemplary view 6 sequentially illustrating a detailed example of a power supply system in accordance with one embodiment of the present disclosure.
Figure 15:
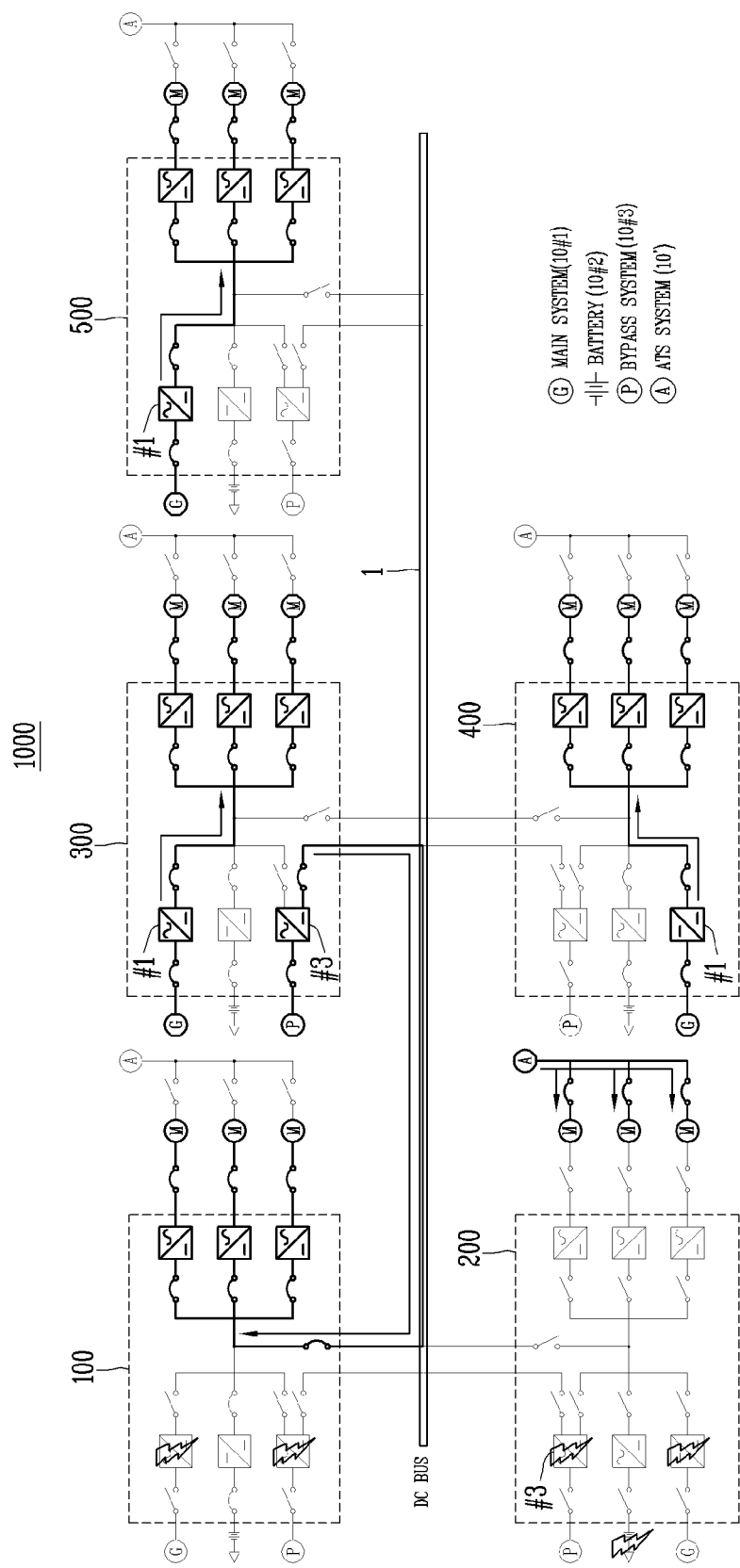
FIG. 15 is an exemplary view 8 sequentially illustrating a detailed example of a power supply system in accordance with one embodiment of the present disclosure.

In the state as illustrated in FIG. 13, when a fault has occurred in the battery power source 10 #2 of the second power panel 200, all of the plurality of power supply sources 10 supplying power to the second power panel 200 cannot supply power. Accordingly, as illustrated in FIG. 15, the second power panel 200 may switch the battery power source 10 #2 into an emergency power source 10' such that the driving power can be supplied from the emergency power source 10' directly to the loads 20.

As described above, when a fault has occurred in at least one of the plurality of power panels 100, 200, 300, 400, 500 in the power supply system 1000, the first and second circuit breakers 130, 230, 330, 430, 530 may be controlled or the power supply of the plurality of power supply sources 10 may be switched according to the state of each of the plurality of power panels 100, 200, 300, 400, 500. In this manner, the power supply, namely, a UPS function among the plurality of power panels 100, 200, 300, 400, 500 can be performed, such that the plurality of power panels 100, 200, 300, 400, 500 can operate without interruption of the power supply.

Accordingly, the power supply system 1000 can maintain the power supply to the loads without interruption even when various abnormal situations occur on the system, and perform the power supply adequately and stably for such various abnormal situations occurring on the system.

Hereinafter, a method for controlling a power supply system according to the present disclosure will be described, but duplicate description with the aforementioned description will be omitted as much as possible.

In addition, the following description will be given further with reference to FIGS. 16 and 17 in addition to FIGS. 1 to 15 referenced in the foregoing description of the power supply system 1000, and reference numerals which are not specified in FIGS. 16 and 17 will be understood by those reference numerals specified in FIGS. 1 to 15.

An embodiment of a method for controlling a power supply system to be described below may be implemented independently or in combination with the foregoing embodiment of the power supply system 1000.

The method for controlling the power supply system (hereinafter, referred to as a control method) may be implemented in combination of the foregoing embodiments and embodiments to be described below or separately.

The control method may be a method of controlling a power supply system including a plurality of power modules, a control method of the power supply system, a method of operating the power supply system, and an operating method of the power supply system.

That is, the control method may be a method applied to the power supply system.

The control method may be a control method of a power supply system that includes a plurality of packaged power devices to supply power.

Here, the power device may be a power panel in which a plurality of power control devices is packaged.

The control method may be a method of controlling the power supply system 1000 described above.

The control method may also be a method of controlling a power supply system other than the power supply system 1000 described above.

Hereinafter, for convenience of explanation, the control method will be described based on an example of controlling the aforementioned power supply system 1000.

The control method, as illustrated in FIG. 1A or 1B, is a method for controlling the power supply system 1000, which includes loads, a plurality of power panels 100, 200, 300, 400 that converts power received from a plurality of power supply sources 10 into DC power, converts the DC power into driving power for driving the loads 20, and supplies the driving power to the loads 20, a bus line 1 that is commonly connected to output ends, to which the DC power is output from the plurality of power panels 100, 200, 300, 400, to receive the DC power output from the plurality of power panels 100, 200, 300, 400, a plurality of circuit breakers 130, 230, 330, 430 that is connected to the output ends to control connection and disconnection among the plurality of power panels 100, 200, 300, 400 through the bus line 1, and a control device 600 that monitors and controls the plurality of power panels 100, 200, 300, 400. As illustrated in FIG. 16, the control method may include determining a supply target power panel for supplying the DC power when a fault has occurred in at least one of the plurality of power panels 100, 200, 300, 400 (S10), closing at least one circuit breaker connected to the fault-occurred power panel and the supply target power panel, among the plurality of circuit breakers (S30), and supplying the DC power from the supply target power panel to the fault-occurred power panel through the bus line 1 (S40).

Here, the control method may further include transmitting information related to reception and supply of the DC power to each of the fault-occurred power panel and the supply target power panel (S20).

The control method may be performed by the control device 600.

That is, the control method may be a method in which the control device 600 included in the power supply system 1000 controls the power supply system 1000.

The control method may be a method in which the control device 600 controls the power supply and operation of each of the plurality of power panels 100, 200, 300, 400 in the power supply system 1000.

The overall operation of the power supply system 1000 for which the control method is performed may be performed as in the embodiment of the power supply system 1000 described above.

The control method may control the operation of each of the plurality of power panels 100, 200, 300, 400 according to a power supply state of each of the plurality of power panels 100, 200, 300, 400.

The control method may include the determining step (S10), the transmitting step (S20), the closing step (S30), and the supplying step (S40). Accordingly, the power supply and operation of each of the plurality of power panels 100, 200, 300, 400 may be controlled.

Figure 16:
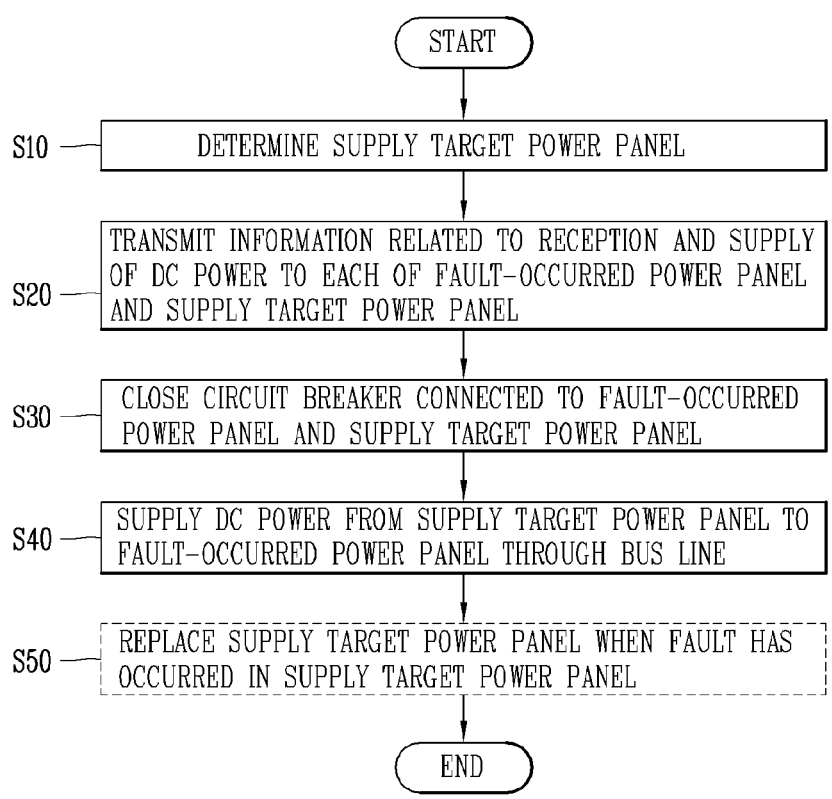
FIG. 16 is a flowchart illustrating a method for controlling a power supply system in accordance with one embodiment of the present disclosure.

That is, the power supply system 1000, as illustrated in FIG. 16, may perform the reception and supply of the DC power sequentially by the determining step (S10), the transmitting step (S20), the closing step (S30), and the supplying step (S40).

Alternatively, the control device 600, as illustrated in FIG. 16, may control the power supply system 1000 sequentially by performing the determining step (S10), the transmitting step (S20), the closing step (S30) and the supplying step (S40).

In the control method, upon controlling the operation of each of the plurality of power panels 100, 200, 300, 400, the control device 600 may convert power supplied from each of the plurality of power supply sources 10 into the DC power, and control each of the plurality of power panels 100, 200, 300, 400 to supply the DC power to the loads 20.

In the control method, upon controlling the operation of each of the plurality of power panels 100, 200, 300, 400, the control device 600 may control the plurality of power panels 100, 200, 300, 400 to receive power sequentially from the first AC power source 10 #1 and the second AC power source 10 #3. Here, while the power supply of the first AC power source 10 #1 or the second AC power source 10 #3 is switched, the control device 600 may maintain the power supply using the battery power source 10 #2.

The plurality of power supply sources 10 may further include an emergency power source 10 #4 for supplying emergency power to the loads 20 when the power supply of the first AC power source 10 #1, the second AC power source 10 #3, and the battery power source 10 #2 is interrupted.

Accordingly, when the power supply of the battery power source 10 #2 is interrupted in each of the plurality of power panels 100, 200, 300, 400, the loads 20 may receive power from the emergency power source 10 #4, so as to maintain the power supply.

In the control method, upon controlling the operation of each of the plurality of power panels 100, 200, 300, 400, when states of the first AC power source 10 #1 and the first conversion device 110 #1, 210 #1, 310 #1, 410 #1 which receives power from the first AC power source 10 #1 correspond to a normal state, the control device 600 may receive power from the first AC power source 10 #1 and convert the received power into the DC power through the first conversion device 110 #1, 210 #1, 310 #1, 410 #1.

In the control method, upon controlling the operation of each of the plurality of power panels 100, 200, 300, 400, when a fault has occurred in at least one of the first AC power source 10 #1 and the first conversion device 110 #1, 210 #1, 310 #1, 410 #1 and thereby the power supply is interrupted, the control device 600 may switch the first AC power source 10 #1 and the first conversion device 110 #1, 210 #1, 310 #1, 410 #1 into the second AC power source 10 #3 and the second conversion devices 110 #3, 210 #3, 310 #3, 410 #3 which received power from the second AC power source 10 #3.

In the control method, upon controlling the operation of each of the plurality of power panels 100, 200, 300, 400, when the first AC power source 10 #1 and the first conversion device 110 #1, 210 #1, 310 #1, 410 #1 are switched to the second AC power source 10 #3 and the second conversion device 110 #2, 210 #2, 310 #2, 410 #2 due to occurrence of a fault in the first AC power source 10 #1 and the first conversion device 110 #1, 210 #1, 310 #1, 410 #1, the control device 600 may receive power from the battery power source 10 #2 while the power supply is switched to the second AC power source 10 #3 and the second conversion device 110 #3, 210 #3, 310 #3, 410 #3, and then convert the received power into the DC power through the second conversion device 110 #2, 210 #2, 310 #2, 410 #2 which receives power from the battery power source 10 #2.

In the control method, upon controlling the operation of each of the plurality of power panels 100, 200, 300, 400, when a fault has occurred in at least one of the first AC power 10 #1 and the first conversion device 110 #1, 210 #1, 310 #1, 410 #1 in a state where the second circuit breaker 130*b*, 230*b*, 330*b*, 430*b* is closed, the control device 600 may receive power from the battery power source 10 #2 and convert the power into the DC power through the battery power source 10 #2 and the second conversion device 110 #1, 210 #1, 310 #1, 410 #1 until the power supply is restored.

The control method may include determining a fault-occurred power panel among the plurality of power panels 100, 200, 300, 400 when controlling the operation of each of the plurality of power panels 100, 200, 300, 400.

The determining the fault-occurred power panel among the plurality of power panels 100, 200, 300, 400 may be configured to determine a power panel, in which a fault condition has occurred in power supply of the first and second AC power sources among the plurality of power panels, as the fault-occurred power panel.

The determining step (S10) may be configured to determine the supply target power panel, which is to supply the DC power to the fault-occurred power panel, among the plurality of power panels 100, 200, 300, 400 while controlling the operation of each of the plurality of power panels 100, 200, 300, 400.

The determining step (S10) may be configured to determine supply priorities of remaining power panels except for the fault-occurred power panel, and determine the supply target power panel according to the supply priorities.

That is, the determining step (S10) may be configured to determine the supply target power panel among the remaining power panels except for the fault-occurred power panel by determining the supply priorities of the remaining power panels.

The determining step (S10) may be configured to determine the supply priorities according to at least one of states of the remaining power panels and arranged positions of the remaining power panels.

That is, the determining step (S10) may be configured to determine the supply priorities according to at least one of the states of the remaining power panels and the arranged positions of the remaining power panels, and determine the supply target power panel according to the determined supply priorities.

The determining step (S10) may be configured to determine the supply priorities according to states of the plurality of power supply sources of each of the remaining power panels.

The determining step (S10) may be configured to determine an available capacity of the battery power source among the plurality of power supply sources of each of the remaining power panels, and determine the supply priorities according to the determined available capacities.

The determining step (S10) may be configured to determine the supply priorities according to the order of the available capacities of the remaining power panels.

For example, in case where the first power panel 100 is the fault-occurred power panel, when the battery power source 10 #2 of the second power panel 200 is charged to 100%, the battery power source 10 #2 of the third power panel 300 is charged to 80%, and the battery power source 10 #2 of the fourth power panel 400 is charged to 90%, the supply priorities may be determined in the order of the second power panel 200, the fourth power panel 400, and the third power panel 300.

The determining step (S10) may be configured to determine the supply priorities according to the degree to which the position of each of the remaining power panels is adjacent to the fault-occurred power panel.

The determining step (S10) may be configured to determine the supply priorities in the order of the degree to which the position of each of the remaining power panels is adjacent to the fault-occurred power panel.

For example, in case where the first power panel 100 is the fault-occurred power panel, when the second power panel 200 and the third power panel 300 are closest to the first power panel 100 and the fourth power panel 300 is disposed at an opposite position of the first power panel 100 from the third power panel 300, the supply priorities may be determined in the order of the second power panel 200 and the third power panel 300 with the same priority and the fourth power panel 400 according to the adjacent degrees.

The determining step (S10) may be configured to determine the supply priorities of the remaining power panels according to the states of the plurality of power supply sources of each of the remaining power panels and the degree to which the position of each of the remaining power panels is adjacent to the fault-occurred power panel.

The determining step (S10) may be configured to determine a power panel having the highest priority among the supply priorities as the supply target power panel.

As described above, in the control method, the determining step (S10) may be configured to determine the supply target power panel, and control the supply target power panel to supply the DC power to the fault-occurred power panel.

In this way, the control method of determining the supply target power panel may be performed in the following sequence when the power supply system 1000 is configured as illustrated in FIG. 1A.

The transmitting step (S20) may be configured to transmit information related to the reception and supply of the DC power to each of the fault-occurred power panel and the supply target power panel determined in the determining step (S10).

The transmitting step (S20) may be configured to transmit reception request information for receiving the DC power to the fault-occurred power panel, and transmit supply request information for supplying the DC power to the supply target power panel.

The transmitting step (S20) may be configured to transmit the reception request information to the fault-occurred power panel such that the fault-occurred power panel receives the DC power from the bus line 1 to the power end by closing the first circuit breaker 130*a*, 230*a*, 330*a*, 430*a*.

The transmitting step (S20) may be configured to transmit the supply request information to the supply target power panel such that the supply target power panel supplies the DC power from the second output end to the bus line 1 by closing the second circuit breaker 130*a*, 230*a*, 330*a*, 430*a*.

In the closing step (S30), the first circuit breaker 130*a*, 230*a*, 330*a*, 430*a* of the fault-occurred power panel and the second circuit breaker 130*b*, 230*b*, 330*b*, 430*b* of the supply target power panel may be closed according to the reception request information and the supply request information transmitted to the fault-occurred power panel and the supply target power panel, respectively, in the transmitting step (S20).

The supplying step (S40) may be configured to supply the DC power from the supply target power panel to the fault-occurred power panel through the bus line 1 by closing the first circuit breaker 130*a*, 230*a*, 330*a*, 430*a* of the fault-occurred power panel and the second circuit breaker 130*b*, 230*b*, 330*b*, 430*b* of the supply target power panel in the closing step (S30).

*The supplying step (S40) may be configured such that the fault-occurred power panel receives the DC power from the bus line 1 to the power end, and the supply target power panel supplies the DC power from the second output end to the bus line 1.

That is, the supplying step (S40) may be configured such that the supply target power panel supplies the DC power from the second output end to the bus line 1, and the fault-occurred power panel receives the DC power from the bus line 1 to the power end.

In this way, as the supply target power panel supplies the DC power from the second output end to the bus line 1 and the fault-occurred power panel receives the DC power from the bus line 1 to the power end in the supplying step (S40), the DC power can be transferred to the at least one second conversion device 120, 220, 320, 420 of the fault-occurred power panel, such that the driving power can be uninterruptibly supplied to the loads 20 of the fault-occurred power panel.

According to the control method, the power supply, namely, the UPS function among the plurality of power panels 100, 200, 300, 400, 500 can be performed. Therefore, the power supply system 1000 can maintain the power supply to the loads without interruption even when various abnormal situations occur on the system, and perform the power supply adequately and stably for such various abnormal situations occurring on the system.

Hereinafter, the control method in case where the power supply system 1000 is configured as illustrated in FIG. 1B will be described.

The transmitting step (S20) may be configured to transmit information related to the reception and supply of the DC power to each of the fault-occurred power panel and the supply target power panel determined in the determining step (S10).

The transmitting step (S20) may be configured to transmit reception request information for receiving the DC power to the fault-occurred power panel, and transmit supply request information for supplying the DC power to the supply target power panel.

The transmitting step (S20) may be configured to transmit the reception request information to the fault-occurred power panel such that the fault-occurred power panel receives the DC power from the bus line 1.

The transmitting step (S20) may be configured to transmit the supply request information to the supply target power panel such that the supply target power panel supplies the DC power to the bus line 1.

The closing step (S30) may be configured to close the circuit breaker 130*a* to 130*f* connected to the fault-occurred power panel and the supply target power panel according to the reception request information and the supply request information transmitted to the fault-occurred power panel and the supply target power panel, respectively, in the transmitting step (S20).

The supplying step (S40) may be configured to supply the DC power from the supply target power panel to the fault-occurred power panel through the bus line 1 by closing the circuit breaker 130*a* to 130*f* connected to the fault-occurred power panel and the supply target power panel in the closing step (S30).

The supplying step (S40) may be configured such that the fault-occurred power panel receives the DC power from the bus line 1 and the supply target power panel supplies the DC power to the bus line 1.

That is, the supplying step (S40) may be configured such that the supply target power panel supplies the DC power to the bus line 1 and the fault-occurred power panel receives the DC power from the bus line 1.

In this way, as the supply target power panel supplies the DC power to the bus line 1 and the fault-occurred power panel receives the DC power from the bus line 1 in the supplying step (S40), the DC power can be transferred to the at least one second conversion device 120, 220, 320, 420 of the fault-occurred power panel, such that the driving power can be uninterruptibly supplied to the loads 20 of the fault-occurred power panel.

According to the control method, the power supply, namely, the UPS function among the plurality of power panels 100, 200, 300, 400, 500 can be performed. Therefore, the power supply system 1000 can maintain the power supply to the loads without interruption even when various abnormal situations occur on the system, and perform the power supply adequately and stably for such various abnormal situations occurring on the system.

In this way, the control method of controlling the supply target power panel to supply the DC power to the fault-occurred power panel, as illustrated in FIG. 16, may further include replacing the supply target power panel when a fault has occurred in the supply target power panel which is supplying the DC power to the fault-occurred power panel (S50).

Figure 17:
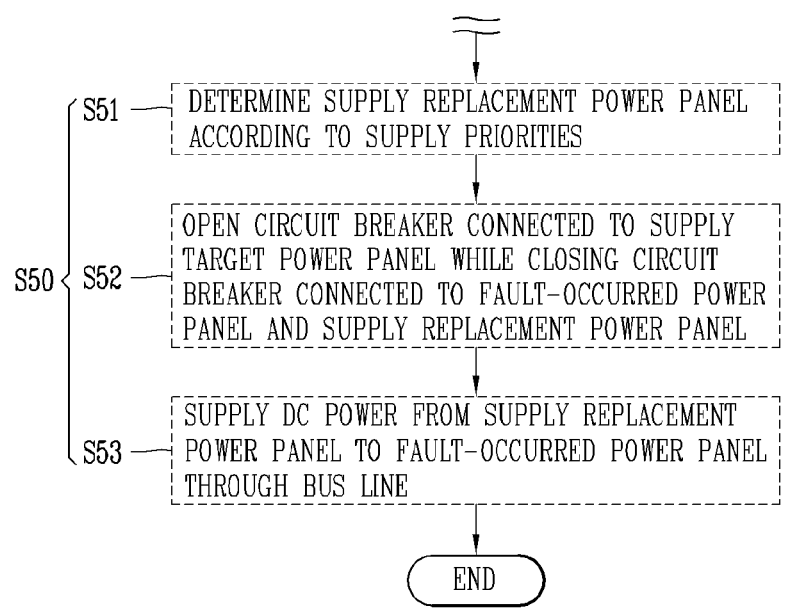
FIG. 17 is a flowchart illustrating a detailed sequence of a method for controlling a power supply system in accordance with according one embodiment of to the present disclosure.

The replacing step (S50), as illustrated in FIG. 17, may include determining a supply replacement power panel to replace the supply target power panel according to the supply priorities (S51), opening a circuit breaker connected to the supply target power panel and closing a circuit breaker connected to the fault-occurred power panel and the supply replacement power panel (S52), and supplying the DC power from the supply replacement power panel to the fault-occurred power panel through the bus line 1 (S53).

That is, the replacing step (S50) may be configured to determine a power panel having the higher supply priority next to the supply target power panel as the supply replacement power panel according to the determined supply priorities, and replace the supply target power panel with the supply replacement power panel when a fault has occurred in the supply target power panel.

The determining the supply replacement power panel (S51) may be configured to determine a power panel having the higher supply priority next to the supply target power panel as the supply replacement power panel according to the determined supply priorities.

The closing the circuit breaker connected to the supply replacement power panel (S52) may be configured to replace the supply target power panel with the supply replacement power panel by opening the circuit breaker connected to the supply target power panel and closing a circuit breaker connected to the fault-occurred power panel and the supply replacement power panel.

For example, in case where the first power panel 100 is the fault-occurred power panel, and the supply priorities have been determined in the order of the third power panel 300, the fourth power panel 400, and the second power panel 200 so that the third power panel 300 as the supply target power panel is supplying the DC power to the first power panel, when a fault has occurred in the second AC power source 10 #3 supplying the DC power to the first power panel 100, the fourth power panel 400 having the higher supply priority next to the third power panel 300 may be determined as the supply replacement power panel according to the supply priorities. Then, the third power panel 300 may be switched to the fourth power panel 400 by opening the circuit breaker connected to the third power panel 300 and the fault-occurred power panel and closing the circuit breaker connected to the fault-occurred power panel and the fourth power panel 400, such that the fourth power panel supplies the DC power to the third power panel 300.

An embodiment of the power supply device to be described below may be implemented independently or in combination with the foregoing embodiment of the power supply system 1000 or an embodiment of the control system to be described below.

The power supply device may be implemented independently in embodiments to be described below or in combination of those embodiments.

The power supply device may be a module including a plurality of power control devices.

The power supply device may be a power device in which the plurality of power control devices is packaged.

For example, the plurality of power control devices may be a packaged power panel.

The power supply device may be a package type power panel provided in buildings, such as power plants, plants, factories, apartments, etc., which require high power.

The power supply device may also be a package type power panel configured in any one space.

The power supply device may include the plurality of power control devices that are packaged to supply power to loads.

The power supply device 100, as illustrated in FIG. 2A, may include a plurality of first power conversion devices 110 that converts power supplied from each of the plurality of power supply sources 10 into DC power, at least one second power conversion device 120 that converts the DC power into driving power to supply to the loads 20, a first circuit breaker disposed between a power end, which is connected to output ends of the plurality of first power conversion devices 110 connected to opening and closing mechanisms for controlling output of the DC power and an input end of the second power conversion device 120, and a bus line 1 connected to the power end such that the DC power passes therethrough, a second circuit breaker 130*b* disposed between a second output end of one of the plurality of first power conversion devices 110 and the bus line 1 to control the supply of the DC power between the second output end and the bus line 1, and a control unit 140 that controls operations of the plurality of first power conversion devices 110 and the second power conversion device 120 and opening and closing of each of the first and second circuit breakers 130 according to a state of at least one of the DC power, the driving power, the plurality of first power conversion devices 110, and the second power conversion device 120.

As such, the supply device 100 which includes the plurality of first power conversion devices 110, the at least one second power conversion device 120, the first and second circuit breakers 130*a* and 130*b*, and the control unit 140, can convert the power supplied from the plurality of power supply sources 10 into the driving power to supply the driving power to the loads 20.

In the power supply device 100, the control unit 140 may close the first circuit breaker 130*a* to connect the power end and the bus line 1 when receiving the DC power from the bus line 1, while closing the second circuit breaker 130*b* to connect the second output end and the bus line 1 when supplying the DC power to the bus line 1.

That is, the first circuit breaker 130*a* may be closed when receiving the DC power from the bus line 1 to the power end and the second circuit breaker 130*b* may be closed when supplying the DC power from the second output end to the bus line 1.

As such, the power supply device 100 can perform the reception and supply of the DC power through opening and closing of the first and second circuit breakers 130*a* and 130*b*, in the manner of closing the first circuit breaker 130*a* when receiving the DC power and closing the second circuit breaker 130*b* when supplying the DC power.

Figure 18:
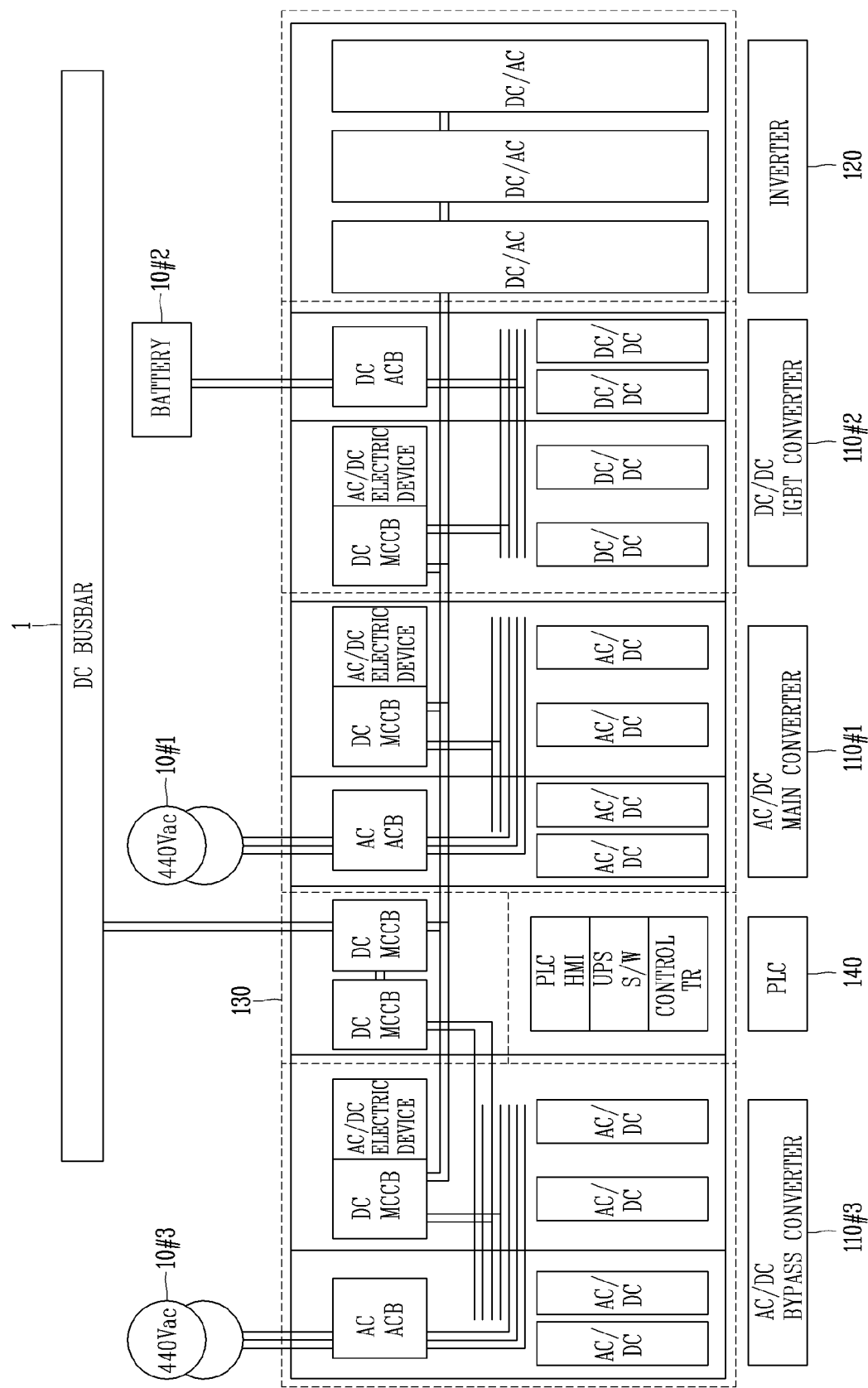
FIG. 18 is a diagram illustrating a detailed configuration of a power supply device in accordance with one embodiment the present disclosure.

A detailed configuration of the supply device 100 including the plurality of first power conversion devices 110, the at least one second power conversion device 120, the first and second circuit breakers 130*a* and 130*b*, and the control unit 140 will be as illustrated in FIGS. 2 and 18.

The plurality of power supply sources 10 supplying power to the power supply device 100 may be externally connected to the plurality of first power conversion devices 110, respectively, to supply power to the respective first power conversion devices 110.

The plurality of power supply sources 10 may be connected to the plurality of first power conversion devices 110, respectively, to supply DC or AC power to the respective first power conversion devices 110.

The plurality of power supply sources 10 may include different power sources.

The plurality of power supply sources 10 may include a first AC power source 10 #1 and a second AC power source 10 #3 each supplying AC power, as illustrated in FIGS. 2A and 18.

The plurality of power supply sources 10 may further include a battery 10 #2 storing DC power.

The plurality of power supply sources 10, as illustrated in FIGS. 2A and 18, may preferably include three different power sources 10 #1 to 10 #3. The three different power sources 10 #1 to 10 #3 may be the first AC power source 10 #1 for supplying AC power, the battery 10 #2 for storing DC power, and the second AC power source 10 #3 for supplying AC power.

Accordingly, the power supply device 100 may receive two AC power and one DC power.

The first AC power source 10 #1 may be a system power source G.

The first AC power source 10 #1 may be a system power source G for supplying AC power of 440 [V].

The second AC power source 10 #3 may be a bypass power source P.

The second AC power source 10 #3 may be a bypass power source P for supplying AC power of 440 [V].

The battery 10 #2 may be an emergency battery for storing DC power to supply the stored DC power in an emergency.

The battery 10 #2 may supply the stored DC power to the supply device 100 when fault conditions have occurred in the first AC power source and the second AC power source.

Accordingly, when the supply of the DC power to the second power conversion device 120 is interrupted (stopped) in the plurality of power supply sources 10, the power stored in the battery 10 #2 may be supplied to the first power conversion device 110 while the supply of the DC power is restored.

Here, the case where the supply of the DC power is interrupted may be at least one of a case where the power supply from the first AC power source 10 #1 and the second AC power source 10 #3 is interrupted, and a case where operations of the plurality of first power conversion devices 110 which receives power from the first AC power source 10 #1 and the second AC power source 10 #3 are stopped.

After the supply of the DC power is interrupted, the battery 10 #2 may uninterruptibly supply the stored power to the first power conversion device 110 until the supply of the DC power is restored in a switching manner.

The uninterruptible supply means that the stored power is supplied to the first power conversion device 110 without interrupting power supply, namely, without a power failure.

Accordingly, the supply device 100 can supply power uninterruptibly to the loads 20 through the battery 10 #2 and allow the uninterruptible power supply to the loads 20.

The first power conversion device 110 may be provided in plurality.

The first power conversion device 110, which is a device that converts supplied power into DC power, may be a converter, for example.

The plurality of first power conversion devices 110 may include at least one of an AC/DC converter for converting AC power to DC power and a DC/DC converter for converting a level of DC power.

The plurality of first power conversion devices 110 may include three conversion devices 110 #1 to 110 #3 corresponding to the plurality of power supply sources 10, respectively.

Accordingly, the first AC power source 10 #1 may be connected to the first conversion device 110 #1 to supply AC power to the first conversion device 110 #1, the battery 10 #2 may be connected to the second conversion device 110 #2 to supply DC power to the second conversion device 110 #2, and the second AC power source 10 #3 may be connected to the third conversion device 110 #3 to supply AC power to the third conversion device 110 #3.

The first conversion device 110 #1 may be an AC/DC conversion device for converting AC power into DC power, the second conversion device 110 #2 may be a DC/DC conversion device for converting a level of DC power, and the third conversion device 110 #3 may be an AC/DC conversion device for converting AC power into DC power.

The plurality of first power conversion devices 110 may include opening and closing mechanisms provided on front and rear ends for opening or closing the front and rear ends.

The opening and closing mechanisms may be switches which is be provided on an input end and an output end of each of the plurality of first power conversion devices 110, to control input and output of power to and from the plurality of first power conversion devices 110.

Here, the opening and closing mechanism provided on the input end may be a circuit breaker that breaks a circuit when detecting an overcurrent.

More specifically, Air Circuit Breakers (ACBs) may be provided on the input ends of the first conversion device 110 #1 and the third conversion device 110 #, to which AC power is supplied from the first AC power source 10 #1 and the second AC power source 10 #3. A Molded Circuit Breaker (MCCB) may be provided on the input end of the second conversion device 110 #2, to which DC power is supplied from the battery 10 #2.

The opening and closing mechanisms may be controlled to connect or disconnect the plurality of first power conversion devices 110 according to the operations of the plurality of first power conversion devices 110, 210, 310, 410.

For example, when power is not supplied from the plurality of power supply sources 10, the opening and closing mechanisms provided on the input ends and output ends may be open so as to disconnect the power conversion devices.

The output ends may be divided into the power end and the second output end.

That is, each of the plurality of first power conversion devices 110 may be provided with the power end and the second output end separately, so as to output the DC power through each of the ends.

The power end may be an electric circuit, to which the output ends of the plurality of first power conversion devices 110 are connected, respectively.

Accordingly, the power end may an electric circuit, to which the output ends of the plurality of first power conversion devices 110 are commonly connected so that the DC power output from the plurality of first power conversion devices 110 can flow.

The power end may be an electric circuit, to which the output ends of the plurality of first power conversion devices 110 are connected, respectively.

Accordingly, the power end may an electric circuit, to which the output ends of the plurality of first power conversion devices 110 are commonly connected so that the DC power output from the plurality of first power conversion devices 110 can flow.

The DC power which is output from one of the plurality of first power conversion devices 110 may flow along the power end.

The power end may be connected to the bus line 1 and an input end of the second power conversion device 120, such that the DC power can be transferred to the bus line 1 or the second power conversion device 120.

The second output end may be an output end of any one of the plurality of first power conversion devices 110, without being connected to the power end.

Accordingly, the second output end may be an electric circuit which is separated from the power end and along which the DC power output from one of the plurality of first power conversion devices 110 flows.

The second output end may be connected to the bus line 1 to output the DC power to the bus line 1.

The second output end may preferably be an output end of the third conversion device 110 #3 corresponding to the third power supply source 10 #3.

According to this, the second output end may be an output end of the third conversion device 110 #3, to which power is supplied from the bypass power source P as the third power supply source 10 #3.

That is, the third conversion device 110 #3 may be configured such that the output of the DC power is divided into two paths, namely, the power end and the second output end. The power end may be commonly connected to the output ends of the first and second conversion devices 110 #1 and 110 #2 and the second output end may be separated from the power end so as to output the DC power independently.

As such, the power end and the second output end to which the DC power is output from the plurality of first power conversion devices 110 may be connected to the bus line 1.

That is, the power end may be connected to the bus line 1 and the input end of the second power conversion device 120, to output the DC power to the bus line 1 and the second power conversion device 120, and the second output end may be connected to the bus line 1 to output the DC power to the bus line 1.

The DC power that has been converted by the plurality of first power conversion devices 110 and output from the power end may be transferred to each of the at least one second power conversion device 120.

The plurality of first power conversion devices 110 may be controlled by the control unit 140.

The at least one second power conversion device 120 may convert the DC power transferred from the plurality of first power conversion devices 110 into the driving power of AC power.

The at least one second power conversion device 120 may include three second conversion devices 120 #1 to 210 #3 corresponding to the loads 20, respectively.

The at least one second power conversion device 120 may be connected to the loads 20, respectively, to supply the driving power to the connected loads.

Each of the at least one second power conversion device 120 may include an opening and closing mechanism provided on a front end for opening and closing the front end.

The opening and closing mechanism may be a switch which is provided on an input end of each of the at least one second conversion device 120 for controlling power input to the at least one second power conversion device 120.

Here, the opening and closing mechanism provided on the input end may be a circuit breaker that breaks a circuit when detecting an overcurrent.

The driving power converted and output by the at least one second power conversion device 120 may be transferred to each of the loads 20.

Here, the load 20 may be a load of an electric motor M.

The at least one second power conversion device 120 may be controlled by the control unit 140.

The first and second circuit breakers 130a and 130b may be DC circuit breakers that cut off DC power.

Of the first and second circuit breakers 130a and 130b, the first circuit breaker 130a may be provided between the power end connected to the output ends of the plurality of power conversion devices 110 and the bus line 1 connected to the power end.

That is, the first circuit breaker 130a may be provided between the power end of the power supply device 100 and the bus line 1, to control connection and disconnection between the power supply device 100 and the bus line 1.

According to this, the power supply device 100 may be connected to the bus line 1 through the power end, and controlled to be connected to or disconnected from the bus line 1 by opening or closing of the first circuit breaker 130a.

Of the first and second circuit breakers 130a and 130b, the second circuit breaker 130b may be provided between the second output end as an output end of one of the plurality of first power conversion devices 110 and the bus line 1 connected to the second output end.

That is, the second circuit breaker 130b may be provided between the second output end of the power supply device 100 and the bus line 1, to control connection and disconnection between the power supply device 100 and the bus line 1.

According to this, the power supply device 100 may be connected to the bus line 1 through the second output end, and controlled to be connected to or disconnected from the bus line 1 by opening or closing of the second circuit breaker 130b.

The bus line 1 may be a DC bus line through which DC power flows.

The bus line 1 may indicate a DC-only electric circuit to which a plurality of power supply sources is commonly connected to output power.

The bus line 1 may be connected to a plurality of DC power supply sources, to output DC power supplied from the plurality of DC power supply sources.

For example, the bus line 1 may be connected to another power supply device other than the power supply device 100 to output DC power between the power supply device 100 and the another power supply device.

The bus line 1 may have a rating of a magnitude of DC power supplied from at least one conversion device 110 to a magnitude of DC power supplied from two conversion devices.

That is, the rating of the bus line 1 may be a rating at which DC power supplied from at least two conversion devices 110 can be transferred.

The bus line 1 may have a rating of a magnitude which allows the transfer of DC power among power panels connected to the bus line 1.

DC power may flow through the bus line 1 as the first and second circuit breakers 130a and 130b are opened or closed.

The first and second circuit breakers 130a and 130b may be provided between the first and second output ends and the bus line 1 to control the connection and disconnection between the first and second output ends and the bus line 1.

That is, the first and second circuit breakers 130a and 130b may be open at normal times to disconnect the first and second output ends from the bus line 1, while being closed during operation to connect the first and second output ends to the bus line 1.

The first and second circuit breakers 130a and 130b may be controlled by the control unit 140.

The control unit 140 may be a central control system of the power supply device 100.

The control unit 140 may include a plurality of control elements for controlling the power supply device 100.

The control unit 140 may further include a plurality of electronic devices for performing functions of the power supply device 100.

For example, the control unit 140 may include at least one of a storage element for storing software/applications/programs for performing and controlling functions of the power supply device 100, a dedicated control element including the storage element, a communication element, a display, and an input element.

The control unit 140 may control the plurality of first power conversion devices 110, the at least one second power conversion device 120, and the first and second circuit breakers 130a and 130b.

The control unit 140 may include a Programmable Logic Control unit (PLC) for controlling the plurality of first power conversion devices 110, the at least one second power conversion device 120, and the first and second circuit breakers 130a and 130b.

The control unit 140 may monitor the states of the plurality of first power conversion devices 110, the at least one second power conversion device 120, and the first and second circuit breakers 130a and 130b, and control the operations of the plurality of first power conversion devices 110, the at least one second power conversion device 120, and the first and second circuit breakers 130a and 130b based on a result of the monitoring.

The control unit 140 may also control operations of the plurality of first power conversion devices 110, the at least one second power conversion device 120, and the first and second circuit breakers 130a and 130b based on the states of the plurality of power supply sources 10 and the loads 20.

The control unit 140 may control the operations of the plurality of first power conversion devices 110 to control conversion and supply of the DC power.

For example, the control unit 140 may control an operation of a control target conversion device of the plurality of power conversion devices 110, such that the control target conversion device controls conversion and supply of the DC power with respect to the at least one second power conversion device 120.

The control unit 140 may also control opening and closing of the opening and closing mechanisms included in the plurality of first power conversion devices 110, respectively.

The control unit 140 may control the operation of the at least one second power conversion devices 120 to control conversion and supply of the driving power.

For example, the control unit 140 may control an operation of a control target inverter of the at least one power conversion device 120, such that the control target inverter controls the conversion and supply of the driving power with respect to the loads 20.

The control unit 140 may also control opening and closing of the opening and closing mechanism included in the at least one second power conversion device 120.

The control unit 140 may control the operations of the first and second circuit breakers 130a and 130b to control reception and supply of the DC power.

For example, the control unit 140 may close the first circuit breaker 130a to receive the DC power from the bus line 1, or close the second circuit breaker 130b to supply the DC power to the bus line 1.

In this case, the control unit 140 may control the first and second circuit breakers 130a and 130b in an interlock manner.

For example, the control unit 140 may open the second circuit breaker 130b when closing the first circuit breaker 130a to receive the DC power from the bus line 1, while opening the first circuit breaker 130a when closing the second circuit breaker 130b to supply the DC power to the bus line 1.

The control unit 140 may also control the operations of the plurality of first power conversion devices 110, the at least one second power conversion device 120, and the first and second circuit breakers 130a and 130b based on a communication result performed with at least one of an external communication device and a control device.

For example, the control unit 140 may receive from the control device a control command for controlling the operation of at least one of the plurality of first power conversion devices 110, the at least one second power conversion device 120, and the first and second circuit breakers 130a and 130b, and control the operation of the at least one of the plurality of first power conversion devices 110, the at least one second power conversion device 120, and the first and second circuit breakers 130a and 130b according to the control command.

The control unit 140 may receive power from one of the plurality of power supply sources 10 and convert the power into the DC power.

That is, the control unit 140 may selectively receive power from one of the plurality of power supply sources 10.

The control unit 140 may receive power from any one of the plurality of power supply sources 10 according to a preset supply criterion and convert the power into the DC power.

The supply criterion may be a criterion for priorities of the plurality of power supply sources 10 to supply power.

For example, the supply criterion may be set in the order of the first AC power source 10 #1, the second AC power source 10 #3, and the battery 10 #2.

According to the supply criterion, the control unit 140 may receive power sequentially from the first AC power source 10 #1, the second AC power source 10 #3, and the battery 10 #2.

When power is supplied from the first AC power source 10 #1, the control unit 140 may control the operation of the first conversion device 110 #1 connected to the first AC power source 10 #1.

In this case, the control unit 140 may close the opening and closing mechanism of the first conversion device 110 #1 and open the opening and closing mechanisms of the second conversion device 110 #2 and the third conversion device 110 #3, so as to connect the first conversion device 110 #1 and disconnect the second conversion device 110 #2 and the third conversion device 110 #3.

When power is supplied from the second AC power source 10 #3, the control unit 140 may control the operation of the third conversion device 110 #3 connected to the second AC power source 10 #3.

In this case, the control unit 140 may close the opening and closing mechanism of the third conversion device 110 #3 and open the opening and closing mechanisms of the first conversion device 110 #1 and the second conversion device 110 #2, so as to connect only the third conversion device 110 #3 and disconnect the first conversion device 110 #1 and the second conversion device 110 #2.

When power is supplied from the battery 10 #2, the control unit 140 may control the operation of the second conversion device 110 #2 connected to the battery 10 #2.

In this case, the control unit 140 may close the opening and closing mechanism of the second conversion device 110 #2 and open the opening and closing mechanisms of the first conversion device 110 #1 and the third conversion device 110 #3, so as to connect only the second conversion device 110 #2 and disconnect the first conversion device 110 #1 and the third conversion device 110 #3.

The control unit 140 may select any one of the plurality of first power conversion devices 110 according to states of the plurality of power supply sources 10, such that the DC power is output to the at least one second power conversion device 120 through the selected conversion device.

That is, the control unit 140 may convert the DC power through one selected from the plurality of first power conversion devices 110 and output the converted DC power to the at least one second power conversion device 120.

For example, when fault conditions have occurred in the first AC power source 10 #1 and the second AC power source 10 #3 among the plurality of power supply sources 10, the control unit 140 may select the second conversion device 110 #2 connected to the battery 10 #2. The control unit 140 may control the selected second conversion device 110 #2 to receive power from the battery 10 #2, convert the received power into the DC power, and output the DC power to each of the at least one second power conversion device 120.

When fault conditions have occurred in at least one of a conversion device 110, which is transferring the DC power to the at least one second power conversion device 120, and a power supply source 10 corresponding to the conversion device 110, the control unit 140 may control another conversion device other than the conversion device to transfer the DC power to the at least one second power conversion device 120.

When fault conditions have occurred in at least one of a conversion device, which is transferring the DC power to the at least one second power conversion device 120, and a power supply source corresponding to the conversion device, the control unit 140 may switch the power supply source which is supplying power and the conversion device, such that another conversion device other than the conversion device can transfer the DC power to the at least one second power conversion device 120.

For example, while receiving power from the first AC power source 10 #1 and converting the power into the DC power through the first conversion device 110 #1, when the first conversion device 110 #1 is failed or the first AC power source 10 #1 is shut down, the control unit 140 may switch the first AC power source 10 #1 into the second AC power source 10 #3 and the first conversion device 110 #1 into the third conversion device 110 #3, so as to receive power from the second AC power source 10 #3, convert the received power into the DC power through the third conversion device 110 #3, and transfer the DC power to the second power conversion device 120.

The control unit 140 may operate the first conversion device 110 #1, which receives power from the first AC power source 10 #1 at normal times, to transfer the DC power to the at least one second conversion device 120.

That is, among the plurality of power supply sources 10, the first AC power source 10 #1 with the highest priority may supply power to the power supply device 100.

When a fault has occurred in at least one of the first AC power source 10 #1 and the first conversion device 110 #1, the control unit 140 may stop the operation of the first conversion device 110 #1. The control unit 140 may then operate one of the second conversion device 110 #2 receiving power from the battery 10 #3 and the third conversion device 110 #3 receiving power from the second AC power source 10 #3, to transfer the DC power to the at least one second power conversion device 120.

That is, when a fault has occurred in the first AC power source 10 #1 that supplies power with the highest priority to the power supply device 100, the control unit 140 may switch the power supply source to the battery 10 #2 or the second AC power source 10 #3 to receive power.

For example, when a rating of the first AC power source 10 #1 which is supplying power to the first conversion device 110 #1 is significantly lowered, the control unit 140 may stop the operation of the first conversion device 110 #1. And, the control unit 140 may operate the second conversion device 110 #2 or the second AC power source 10 #3 to receive power from the battery 10 #2 or the second AC power source 10 #3. The control unit 140 may convert the power received by the second conversion device 110 #2 or the second AC power source 10 #3 into the DC power and transfer the DC power to the at least one second power conversion device 120.

When fault conditions have occurred in at least one of the first AC power source 10 #1 and the first conversion device 110 #1, the control unit 140 may select one of the second conversion device 110 #2 and the third conversion device 110 #3 according to the states of the second conversion device 110 #2 and the third conversion device 110 #3, and operate the selected conversion device to transfer the DC power to the at least one second power conversion device 120.

While the second circuit breaker 130b is closed, the control unit 140 may operate conversion devices other than a conversion device corresponding to the second output end, to transfer the DC power to the at least one second power conversion device 120.

For example, upon an occurrence of fault conditions in at least one of the first AC power source 10 #1 and the first conversion device 110 #1, when the second circuit breaker 130b is in a closed state, the control unit 140 may operate the second conversion device 110 #2 other than the third conversion device 110 #3 corresponding to the second output end, to transfer the DC power to the at least one second power conversion device 120.

In this way, the control unit 140, which controls the plurality of first power conversion devices 110, the at least one second power conversion device 120, and the first and second circuit breakers 130a and 130b, may control opening and closing of the first and second circuit breakers 130a and 130b according to the state of the power supply device 100, so as to control the reception and supply of the DC power through the bus line 1.

For example, when the magnitude of the driving power is less than a required magnitude of the loads 20 or when the DC power is insufficient, the control unit 140 may close the first circuit breaker 130a and open the second circuit breaker 130b, such that the DC power is received from the bus line 1.

Or, when the magnitude of the driving power is larger than the required magnitude of the loads 20 or when the DC power is sufficient, the control unit 140 may close the first circuit breaker 130a or the second circuit breaker 130b to supply the DC power to the bus line 1.

In an opposite case, when a fault current flows on the output end due to a failure occurred in the plurality of first power conversion devices 110 or the at least one second power conversion device 120 or due to abnormality occurred in the plurality of power supply sources 10 or the loads 20, the control unit 140 may open the first and second circuit breakers 130a and 130b to suppress the fault current from being supplied to the bus line 1.

Figure 19A:
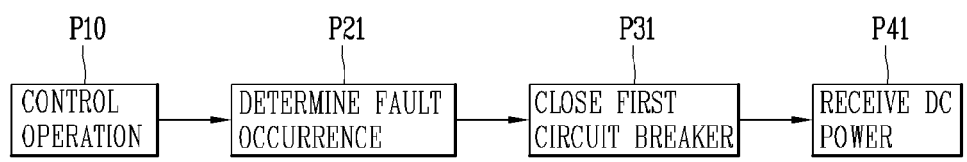
FIGS. 19A to 19C are block diagrams 1 to 3 illustrating a control process of a power supply device in accordance with one embodiment of the present disclosure.
Figure 19B:
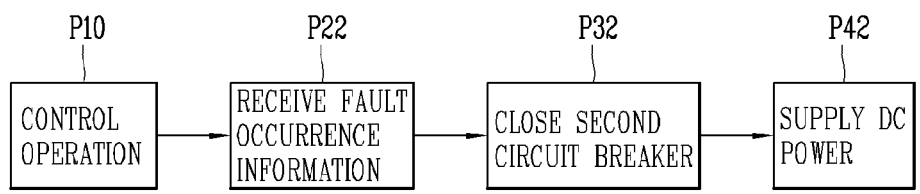
Figure 19C:
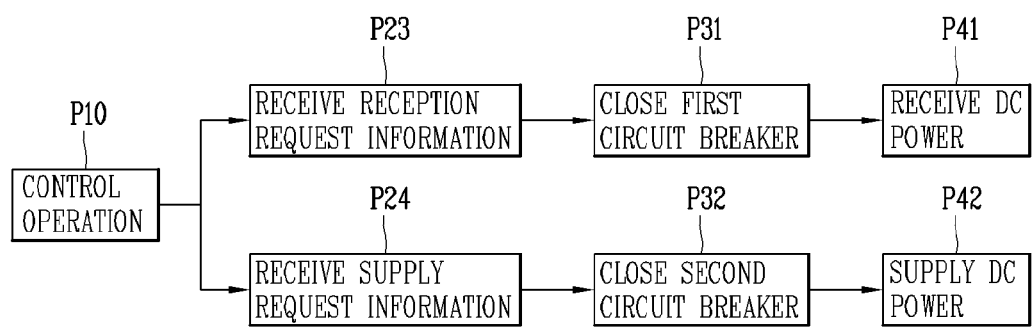

In this way, the control unit 140 may control the reception and supply of the DC power through processes illustrated in FIGS. 19A to 19C.

The control unit 140 may open the first circuit breaker 130a at normal times, and close the first circuit breaker 130a according to the state of at least one of the plurality of power supply sources 10, the plurality of first power conversion devices 110, the DC power and the driving power.

The process of controlling the closing of the first circuit breaker 130a may be achieved sequentially by an operation control (P10), a fault occurrence determination (P21), closing of the first circuit breaker (P31), and reception of DC power (P41), as illustrated in FIG. 19A.

While controlling the operation of the power supply device 100 (P10), the control unit 140 may close the first circuit breaker 130*a* according to the state of at least one of the plurality of power supply sources 10, the plurality of first power conversion devices 110, the DC power, and the driving power (P21 and P31).

When fault conditions have occurred in at least one of the plurality of power supply sources 10, the plurality of first power conversion devices 110, the DC power, and the driving power (P21), the control unit 140 may close the first circuit breaker 130*a*, such that the DC power is supplied from the bus line 1 to the power end and transferred to the at least one second power conversion device 120.

The control unit 140 may detect the states of the plurality of power supply sources 10, the plurality of first power conversion devices 110, the DC power, and the driving power, and compares the detection result with a preset fault criterion. When at least one of the plurality of power supply sources 10, the plurality of first power conversion devices 110, the DC power, and the driving power corresponds to the fault criterion according to the comparison result, the control unit 140 may determine that a fault has occurred in the at least one of the plurality of power supply sources 10, the plurality of first power conversion devices 110, the DC power, and the driving power (P21).

When the at least one of the plurality of power supply sources 10, the plurality of first power conversion devices 110, the DC power, and the driving power corresponds to the fault criterion, the control unit 140 may determine that a fault has occurred in the at least one of the plurality of power supply sources 10, the plurality of first power conversion devices 110, the DC power, and the driving power (P21), and accordingly close the first circuit breaker (P31) to receive the DC power (P41).

In this way, when the DC power cannot be supplied to the at least one second power conversion device 120 due to the occurrence of the fault in the at least one of the plurality of power supply sources 10, the plurality of first power conversion devices 110, the DC power, and the driving power (P21), the control unit 140 may close the first circuit breaker 130*a* (P31). Accordingly, the DC power may be supplied from the bus line 1 to the power end (P41) and transferred to the at least one second power conversion device 120.

Here, the fault criterion may be a criterion for fault (abnormal) states of the plurality of power supply sources 10, the plurality of first power conversion devices 110, the DC power, and the driving power.

The control unit 140 may also open the second circuit breaker 130*b* at normal times, and close the second circuit breaker 130*b* according to a state of a conversion device corresponding to the second output end of the plurality of first power conversion devices 110 and a state of another power supply device connected to the bus line 1.

The process of controlling the closing of the second circuit breaker 130*b* may be achieved sequentially by an operation control (P10), a fault occurrence determination (P22), closing of the second circuit breaker (P32), and supply of DC power (P42), as illustrated in FIG. 19B.

While controlling the operation of the power supply device 100 (P10), the control unit 140 may close the second circuit breaker 130*a* according to the state of the conversion device corresponding to the second output end and the state of the another power supply device connected to the bus line 1 (P22 and P32).

When the conversion device corresponding to the second output end is normal and a fault has occurred in the another power supply device (P22), the control unit 140 may close the second circuit breaker 130*b*, such that the DC power is supplied from the second output end to the bus line 1 to be transferred to the another power supply device (P32).

When fault occurrence information is received from the another power supply device, the control unit 140 may determine that a fault has occurred in the another power supply device (P22).

That is, when the control unit 140 receives fault occurrence information from the another power supply device, the control unit 140 may determine that a fault has occurred in the another power supply device (P22), and close the second circuit breaker 130*b* (P32), so as to supply the DC power (P42).

As such, when the another supply power device cannot supply the DC power to the at least one second power conversion device 120 due to the fault occurred in the another power supply device while the conversion device corresponding to the second output end is normal (P22), the control unit 140 may close the second circuit breaker 130*b* (P32), such that the DC power is supplied from the second output end to the bus line 1 (P42) to be transferred to the another power supply device.

Here, the another power supply device may be a power supply device other than the power supply device 100 connected to the bus line 1.

The control unit 140 may also open the first and second circuit breakers 130*a* and 130*b* at normal times, and perform communication with an external control device so as to close the first or second circuit breaker 130*a* or 130*b* according to the communication result with the control device.

In this way, the process of closing the first or second circuit breaker 130*a* or 130*b*, as illustrated in FIG. 19C, may be carried out by reception of reception request information or supply request information (P23 or P24), closing of the first or second circuit breaker 130*a* or 130*b* (P31 and P32), and reception of the DC power or supply of the DC power (P41 or P42).

While controlling the operation of the power supply device 100 (P10), the control unit 140 may close the first or second circuit breaker 130*a* or 130*b* according to the result of the communication with the control device (P23 or P24, P31 or P32).

When the control unit 140 receives the reception request information for reception of the DC power from the control device (P23), the control unit 140 may close the first circuit breaker 130*a*, such that the DC power is supplied from the bus line 1 to the power end (P41) to be transferred to the at least one second power conversion device 120.

When the control unit 140 receives the supply request information for the supply of the DC power from the control device (P24), the control unit 140 may close the second circuit breaker 130*b* (P32), such that the DC power is supplied from the second output end to the bus line 1 (P42) to be transferred to the another power supply device.

That is, when the control unit 140 receives the reception request information from the control device (P23), the control unit 140 may close the first circuit breaker 130*a* (P31) to receive the DC power (P41). When the control unit 140 receives the supply request information from the control device (P24), the control unit 140 may close the second circuit breaker 130*b* (P32) to supply the DC power (P42).

As described above, when the control unit 140 receives the reception request information from the control device (P23), the control unit 140 may close the first circuit breaker 130*a* (P31), such that the DC power is supplied from the bus line 1 to the power end (P41) to be transferred to the at least one second power conversion device 120. When the control unit 120 receives the supply request information from the control device (P32), the control unit 140 may close the second circuit breaker 130b, such that the DC power is supplied from the second output end to the bus line 1 (P42) to be transferred to the another power supply device connected to the bus line 1.

Here, the reception request information may be information related to a control command for controlling the control unit 140 to receive the DC power from the bus line 1, and the supply request information may be information related to a control command for controlling the control unit 140 to supply the DC power to the bus line 1.

In this way, in the power supply device 100, the power end may receive the DC power through the bus line 1, and the first circuit breaker 130a may control the connection and disconnection between the power end and the bus line 1 for receiving the DC power, so as to control the reception of the DC power from the another power supply device to the power supply device 100. Also, the second output end may supply the DC power through the bus line 1, and the second circuit breaker 130b may control the connection and disconnection between the second output end and the bus line 1 for supplying the DC power, so as to control the supply of the DC power from the power supply device 100 to the another power supply device.

The power supply device 100 as described above may be provided in plurality in the power supply system as illustrated in FIG. 1A to receive and supply the DC power in connection with the bus line 1.

Hereinafter, a method for controlling a power supply system according to the present disclosure will be described, but duplicate description with the aforementioned description will be omitted as much as possible.

An embodiment of the method for controlling the power supply system to be described below may be implemented independently or in combination with the embodiment of the power supply device 100 described above.

The power supply system may be implemented in combination of the foregoing embodiments and embodiments to be described below or separately.

The power supply system may be a power supply system including a plurality of power supply devices.

The power supply system may be a system that includes a plurality of packaged power devices to supply power.

Here, the power device may be a power panel in which a plurality of power control devices is packaged.

The power supply system may include the plurality of power supply devices 100 described above.

That is, the power supply device 100 may be implemented by being applied to the power supply system, and the power supply system may include the plurality of power supply devices 100.

The power supply system 1000, as illustrated in FIG. 1A, may include the plurality of power panels 100, 200, 300, 400 that converts power supplied from the plurality of power supply sources 10, respectively, into DC power, converts the DC power into driving power for driving loads 20, and supplies the driving power to the loads 20, the bus line 1 connected to power ends to which the DC power is input from the plurality of power panels 100, 200, 300, 400, respectively, and second output ends separated from the power ends to output the DC power, so that the DC power converted in the plurality of power panels 100, 200, 300, 400 flows therethrough, the plurality of first circuit breakers 130a, 230a, 330a, 430a disposed between the respective power ends and the bus line 1 to control the connection and disconnection between the power ends and the bus line 1, and the plurality of second circuit breakers 130b, 230b, 330, 430 disposed between the second output ends and the bus line 1 to control the connection and disconnection between the second output ends and the bus line 1.

Here, the power supply system 1000 may further include the control device 600 for monitoring and controlling the plurality of power panels 100, 200, 300, 400.

In the power supply system 1000, the control device 600 may determine a fault-occurred power panel of the plurality of power panels 100, 100, 200, 300, 400, and close the first circuit breaker 130a, 130a, 230a, 330a, 430a of the determined fault-occurred power panel and the second circuit breaker 130b, 130b, 230b, 330b, 430b of a supply target power panel to supply the DC power to the fault-occurred power panel, such that the DC power can be supplied from the supply target power panel to the fault-occurred power panel through the bus line 1.

Figure 21:
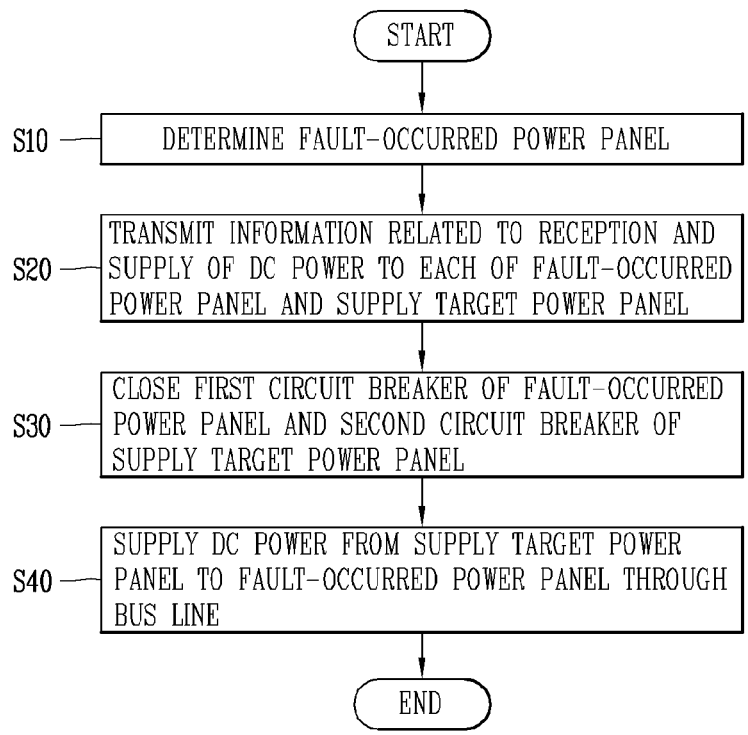
FIG. 21 is a flowchart illustrating a sequence of a method for controlling a power supply system in accordance with another embodiment of the present disclosure.

Here, each of the plurality of power panels 100, 200, 300, 400 may be the power supply device 100 as illustrated in FIGS. 2A and 21.

Each of the plurality of power panels 100, 200, 300, 400, as illustrated in FIGS. 2A and 21, may include the plurality of first power conversion devices 110-210, 310, and 410, the at least one second power conversion device 120-220, 320, 420, the first and second circuit breakers 130-230, 330, 430, and the control unit 140-240, 340, 440.

Each of the plurality of power panels 100, 200, 300, 400 may include the plurality of first power conversion devices 110 that converts power supplied from each of the plurality of power supply sources 10 into DC power, the at least one second power conversion device 120 that converts the DC power into the driving power for driving the loads 20 to transfer to the loads 20, the first circuit breaker 130a, 230a, 330a, 430a disposed between the power end commonly connected to the output ends of the plurality of first power conversion devices 110 and the bus line 1 connected to the power end to control the connection and disconnection between the power end and the bus line 1, the second circuit breaker 130b, 230b, 330b, 430b disposed between the second output end as an output end of one of the plurality of first power conversion device 110 and the bus line 1 connected to the second output end to control the connection and disconnection between the second output end and the bus line 1, and the control unit 140, 240, 340, 440 that controls the operations of the plurality of first power conversion devices 110 and opening and closing of the first and second circuit breakers according to the state of the DC power or the driving power.

The control units 140, 240, 340, 440 of the plurality of power panels 100, 200, 300, 400 may close the first circuit breakers 130a, 230a, 330a, 430a, respectively, when the DC power is received from the bus line 1, while closing the second circuit breakers 130b, 230b, 330b, and 440b, respectively, when the DC power is supplied to the bus line 1.

Here, each of the plurality of power panels 100, 200, 300, 400 may be configured in different forms from the power supply device 100 as illustrated in FIGS. 2A and 21.

The power supply system 1000 may include the power panel 100, 200, 300, 400 provided in plurality, and the plurality of power panels 100, 200, 300, 400 may be connected commonly to the single bus line 1.

The power panel 100, 200, 300, 400 may be provided in plurality, for example, may be provided by four or more as illustrated in FIG. 1A.

The plurality of power panels 100, 200, 300, 400 may preferably be provided by 5 or more in number.

Each of the plurality of power panels 100, 200, 300, 400 may convert power received from each of the plurality of power supply sources 10 into the DC power, convert the DC power into the driving power, and output the driving power to each of the loads 20.

Each of the plurality of power panels 100, 200, 300, 400 may communicate with the control device 600 and operate according to a result of the communication with the control device 600.

For example, each of the plurality of power panels 100, 200, 300, 400 may receive a control command from the control device 600, so as to operate according to the control command or transfer state information to the control device 600.

The plurality of power supply sources 10, as illustrated in FIG. 1A, may include the first AC power source 10 #1 and the second AC power source 10 #3 each supplying AC power, and the battery 10 #2 storing DC power.

Here, the first AC power source 10 #1 may be a main system power source G for supplying AC power, the second AC power source 10 #3 may be a bypass power source P supplying AC power, and the battery 10 #2 may be a battery power source B supplying DC power.

That is, the plurality of power supply sources 10, as illustrated in FIG. 1A, may include the system power source G, the bypass power source P, and the battery power source B.

Accordingly, each of the plurality of power panels 100, 200, 300, 400 may receive power from each of the system power source G, the bypass power source P, and the battery power source B.

The battery power source B may store the DC power. When the power supply of the first AC power source 10 #1 and the second AC power source 10 #3 is interrupted, the battery power source B may supply the stored power to the plurality of power panels 100, 200, 300, 400 while the interrupted power supply is restored in a switching manner.

The battery power source B may uninterruptibly supply the stored power to the plurality of power panels 100, 200, 300, 400 until the interrupted power supply is restored in a switching manner.

The plurality of power supply sources 10 may further include an emergency power source A for supplying emergency power to the loads 20 when fault conditions have occurred in the first AC power source G, the second AC power source P, and the battery power source B.

The emergency power source A may be a power source for keeping the loads 20 operated for a predetermined period of time by supplying emergency power to each load 20 when power cannot be supplied due to an occurrence of fault conditions in all of the first AC power source G, the second AC power source P, and the battery power source B each supplying power to the plurality of power panels 100, 200, 300, 400.

For example, the emergency power source A may be a power source including an emergency generator.

Each of the plurality of power panels 100, 200, 300, 400 may preferably receive power supplied from three power supply sources 10, namely, the system power source G, the bypass power source P, and the battery power source B, as illustrated in FIG. 1A, and receive power from the emergency power source A only when the power supply from the system power source G, the bypass power source P, and the battery power source B is interrupted.

Here, each of the plurality of power supply sources 10 supplying power to each of the plurality of power panels 100, 200, 300, 400 may supply power to each of the plurality of power panels 100, 200, 300, 400 in one system, or through individual switchboards.

Each of the plurality of power panels 100, 200, 300, 400 may receive power from the plurality of power supply sources 10, respectively, convert the received power into the DC power through the plurality of first power conversion devices 110, 210, 310, 410, and convert the DC power into the driving power through the at least one second power conversion devices 120, 220, 320, 420, so that the driving power can be supplied to the loads 20.

Each of the plurality of power panels 100, 200, 300, 400 may include the plurality of first power conversion devices 110, 210, 310, 410 connected to the plurality of power supply sources 10, respectively, to convert the power supplied from the respective power supply sources 10 into the DC power.

Each of the plurality of power panels 100, 200, 300, 400 may preferably include three conversion devices connected to the plurality of power supply sources 10, respectively.

Each of the plurality of first power conversion devices 110, 210, 310, 410 included in each of the plurality of power panels 100, 200, 300, 400 may output the DC power through the power end and the second output end that are separately provided.

The power end may be an electric circuit to which the output ends of the plurality of first power conversion devices 110, 210, 310, 410 are connected, respectively.

Accordingly, the power end may be an electric circuit, to which the output ends of the plurality of first power conversion devices 110, 210, 310, 410 are commonly connected, so that the DC power output from the plurality of first power conversion devices 110, 210, 310, 410 can flow.

The DC power which is output from one of the plurality of first power conversion devices 110, 210, 310, and 410 may flow along the power end.

The power end may be connected to the bus line 1 and each input end of the at least two second power conversion device 120, 220, 320, 420, such that the DC power can be transferred to the bus line 1 or the at least one second power conversion device 120, 220, 320, 420.

The second output end may be an output end of any one of the plurality of first power conversion devices 110, 210, 310, 410, without being connected to the power end.

Accordingly, the second output end may be an electric circuit which is separated from the power end and along which the DC power output from one of the plurality of first power conversion devices 110, 210, 310, 410 flows.

The second output end may be connected to the bus line 1 to transmit the DC power to the bus line 1.

The second output end may preferably be an output end of the third conversion device 110 #3, 210 #3, 310 #3, 410 #3 corresponding to the third supply source 10 #3.

The second output end may also be an output end of the battery corresponding to the second power source 10 #2.

According to this, the second output end may be an output end of the third conversion device 110 #3, 210 #3, 310 #3, 410 #3, to which power is supplied from the bypass power source P as the third power supply source 10 #3.

That is, the third conversion devices 110 #3, 210 #3, 310 #3, 410 #3 included in the plurality of power panels 100, 200, 300, 400, respectively, may output the DC power to two separate paths, namely, the power end and the second output end. The power end may be commonly connected to the output ends of the first and second conversion devices 110 #1 and 110 #2, 210 #1 and 210 #2, 310 #1 and 310 #2, 410 #1 and 410 #2, and the second output end may be provided as an independent output end, separate from the power end.

As such, the power ends and the second output ends to which the DC power is output from the plurality of first power conversion devices 110, 210, 310, 410 may be connected to the bus line 1.

That is, the power end may be connected to the bus line 1 and the input end of the at least one second power conversion device 120, 220, 320, 420, to transfer the DC power to the bus line 1 and the at least one second power conversion device 120, 220, 320, 420, respectively, and the second output end may be connected to the bus line 1 to transfer the DC power to the bus line 1.

The DC power converted in each of the plurality of first power conversion devices 110, 210, 310, 410 may be transferred to the at least one second power conversion device 120, 220, 320, 420 through the power end.

Each of the plurality of power panels 100, 200, 300, 400, as illustrated in FIG. 1A, may preferably include three second power conversion devices 120, 220, 320, 420, to supply the driving power to three loads 20 through the three second power conversion devices 120, 220, 320, 420.

Here, the load 20 may be a load of an electric motor M.

In each of the plurality of power panels 100, 200, 300, 400, as illustrated in FIG. 1A, the first circuit breaker 130*a*, 230*a*, 330*a*, 430*a* may preferably be provided on the electric circuit where the power end of the plurality of first power conversion devices 110, 210, 310, 410 is connected to the bus line 1.

Accordingly, the power ends of the respective power panels 100, 200, 300, 400 may be commonly connected to the bus line 1.

In each of the plurality of power panels 100, 200, 300, 400, as illustrated in FIG. 1A, the second circuit breaker 130*b*, 230*b*, 330*b*, 430*b* may preferably be provided on the electric circuit where the second output end of the plurality of first power conversion devices 110, 210, 310, 410 is connected to the bus line 1.

Accordingly, the second output ends of the respective power panels 100, 200, 300, 400 may be commonly connected to the bus line 1.

The first and second circuit breakers 130, 230, 330, 430 may be DC circuit breakers that cut off DC power, and may be provided on the electric circuits between the first and second output ends and the bus line 1.

The first and second circuit breakers 130, 230, 330, 430 may be normally opened and closed during operation, thereby controlling the connection and disconnection between the first and second output ends and the bus line 1.

Accordingly, the plurality of power panels 100, 200, 300, 400 may be connected to or disconnected from the bus line 1 by opening or closing the plurality of circuit breakers 130, 230, 330, 430.

Of the first and second circuit breakers 130, 230, 330, 430, the first circuit breaker 130*a*, 230*a*, 330*a*, 430*a* may be provided between the power end connected to the output ends of the plurality of power conversion devices 110, 210, 310, 410 and the bus line 1.

That is, the first circuit breakers 130*a*, 230*a*, 330*a*, 430*a* may be provided between the power ends of the power supply device 100 and the bus line 1, respectively, to control the connection and disconnection between the plurality of power panels 100, 200, 300, 400 and the bus line 1.

According to this, the plurality of power panels 100, 200, 300, 400 may be connected to the bus line 1 through the power ends, and controlled to be connected to or disconnected from the bus line 1 by opening or closing the first circuit breakers 130*a*, 230*a*, 330*a*, 430*a*.

Of the first and second circuit breakers 130, 230, 330, 430, the second circuit breaker 130*b*, 230*b*, 330*b*, 430*b* may be provided between the second output end as one of the plurality of first power conversion devices 110, 210, 310, 410 and the bus line 1 connected to the second output end.

That is, the second circuit breakers 130*b*, 230*b*, 330*b*, 430*b* may be provided between the second output ends of the plurality of power panels 100, 200, 300, 400 and the bus line 1, respectively, to control connection and disconnection between the power supply device 100 and the bus line 1.

According to this, the plurality of power panels 100, 200, 300, 400 may be connected to the bus line 1 through the second output ends, and controlled to be connected to or disconnected from the bus line 1 by opening or closing the second circuit breakers 130*b*, 230*b*, 330*b*, 430*b*.

The bus line 1 is a DC bus line through which DC power flows. DC power delivered through the first or second output ends of the plurality of power panels 100, 200, 300, 400 may flow along the bus line 1.

That is, the DC power may flow through the bus line 1 as the first and second circuit breakers 130, 230, 330, 430 are opened or closed.

Each of the plurality of power panels 100, 200, 300, 400 may control and monitor the operations of the plurality of first power conversion devices 110, 210, 310, 410 and the at least one second power conversion device 120, 220, 320, 420.

Each of the plurality of power panels 100, 200, 300, 400 may control the plurality of circuit breakers 130, 230, 330, 430, according to the control and monitoring results of the operations of the plurality of first power conversion devices 110, 210, 310, 410 and the at least one second power conversion device 120, 220, 320, 420.

Each of the plurality of power panels 100, 200, 300, 400 may transmit the control and monitoring results of the plurality of first power conversion devices 110, 210, 310, 410 and the at least one second power conversion device 120, 220, 320, 420 to the control device 600.

Each of the plurality of power panels 100, 200, 300, 400 may control and monitor the operations of the plurality of first power conversion devices 110, 210, 310, 410 and the at least one second power conversion device 120, 220, 320, 420, so as to detect states of the DC power and the driving power.

Each of the plurality of power panels 100, 200, 300, 400 may detect states of the DC power and the driving power and transmit a result of the detection to the control device 600.

Each of the plurality of power panels 100, 200, 300, 400 may receive power from any one of the plurality of power supply sources 10 and convert the power into the DC power.

That is, each of the plurality of power panels 100, 200, 300, 400 may be selectively supplied with power from any one of the plurality of power supply sources 10.

Each of the plurality of power panels 100, 200, 300, 400 may receive power from any one of the plurality of power supply sources 10 according to a preset supply criterion and convert the power into the DC power.

The supply criterion may be a criterion for priorities of the plurality of power supply sources 10 to supply power.

For example, the supply criterion may be set in the order of the first AC power source 10 #1, the second AC power source 10 #3, and the battery 10 #2.

According to the supply criterion, each of the plurality of power panels 100, 200, 300, 400 may receive power sequentially from the first AC power source 10 #1, the second AC power source 10 #3, and the battery 10 #2.

When power is supplied from the first AC power source 10 #1, each of the plurality of power panels 100, 200, 300, 400 may control the operation of the first conversion device 110 #1, 210 #1, 310 #1, 410 #1 which is connected to the first power source 10 #1.

In this case, each of the plurality of power panels 100, 200, 300, 400 may close the opening and closing mechanism of the first conversion device 110 #1, 210 #1, 310 #1, 410 #1, and open the opening and closing mechanism of the second conversion device 110 #1, 210 #2, 310 #2, 410 #2, and the opening and closing mechanism of the third conversion device 110 #3, 210 #3, 310 #3, 410 #3, to connect only the first conversion device 110 #1, 210 #1, 310 #1, 410 #1 and disconnect the second conversion device 110 #2, 210 #2, 310 #2, 410 #2 and the third conversion device 110 #3, 210 #3, 310 #3, 410 #3.

When power is supplied from the second AC power source 10 #3, each of the plurality of power panels 100, 200, 300, 400 may control the operation of the third conversion device 110 #3, 210 #3, 310 #3, 410 #3 connected to the second AC power source 10 #3.

In this case, each of the plurality of power panels 100, 200, 300, 400 may close the opening and closing mechanism of the third conversion device 110 #3, 210 #3, 310 #3, 410 #3, and open the opening and closing mechanism of the first conversion device 110 #1, 210 #1, 310 #1, 410 #1 and the opening and closing mechanism of the second conversion device 110 #2, 210 #2, 310 #2, 410 #2, to connect only the third conversion device 110 #3, 210 #3, 310 #3, 410 #3 and disconnect the first conversion device 110 #1, 210 #1, 310 #1, 410 #1 and the second conversion device 110 #2, 210 #2, 310 #2, 410 #2.

When power is supplied from the battery 10 #2, each of the plurality of power panels 100, 200, 300, 400 may control the operation of the second conversion device 110 #2, 210 #2, 310 #2, 410 #2 which is connected to the battery 10 #2.

In this case, each of the plurality of power panels 100, 200, 300, 400 may close the opening and closing mechanism of the second conversion device 110 #2, 210 #2, 310 #2, 410 #2, and open the opening and closing mechanism of the first conversion device 110 #2, 210 #1, 310 #1, 410 #1 and the opening and closing mechanism of the third conversion device 110 #3, 210 #3, 310 #3, 410 #3, to connect only the second conversion device 110 #2, 210 #2, 310 #2, 410 #2 and disconnect the first conversion device 110 #1, 210 #1, 310 #1, 410 #1 and the third conversion device 110 #3, 210 #3, 310 #3, 410 #3.

Each of the plurality of power panels 100, 200, 300, 400 may select any one of the plurality of first power conversion devices 110, 210, 310, 410 according to states of the plurality of power supply sources 10, such that the DC power is transferred to the at least one second power conversion device 120, 220, 320, 420 through the selected conversion device.

That is, each of the plurality of power panels 100, 200, 300, 400 may convert the DC power through one selected from the plurality of first power conversion devices 110 and transfer the converted DC power to the at least one second power conversion device 120, 220, 320, 420.

In each of the plurality of power panels 100, 200, 300, 400, when a fault has occurred in at least one of a conversion device which is transferring the DC power to the at least one second power conversion device 120, 220, 320, 420 and a power supply source corresponding to the conversion device, the DC power is transferred to the at least one second power conversion device 120, 220, 320, 420 through another conversion device other than the conversion device.

In each of the plurality of power panels 100, 200, 300, 400, when a fault has occurred in at least one of a conversion device which is transferring the DC power to the at least one second power conversion device 120, 220, 320, 420 and a power supply source corresponding to the conversion device, a power supply source which is supplying power and a conversion device may be switched such that the DC power can be transferred to the at least one second power conversion device 120, 220, 320, 420 through another conversion device other than the conversion device.

Each of the plurality of power panels 100, 200, 300, 400 may normally operate the first conversion device 110 #1, 210 #1, 310 #1, 410 #1, which receives power from the first AC power source 10 #1, so as to transfer the DC power to the at least one second power conversion device 120, 220, 320, 420.

That is, among the plurality of power supply sources 10, the first AC power source 10 #1 may supply power to the plurality of power panels 100, 200, 300, 400 with the highest priority.

When a fault has occurred in at least one of the first AC power source 10 #1 and the first conversion device 110 #1, 210 #1, 310 #1, 410 #1, each of the plurality of power panels 100, 200, 300, 400 may stop the operation of the first conversion device 110 #1, 210 #1, 310 #1, 410 #1 and operate at least one of the second conversion device 110 #2, 210 #2, 320 #2, 420 #2 receiving power from the battery 10 #2 and the third conversion device 110 #3, 210 #3, 310 #3, 410 #3 receiving power from the second AC power source 10 #3, so as to transfer the DC power to the at least one second power conversion device 120, 220, 320, 420.

That is, when a fault has occurred in the first AC power source 10 #1 that supplies power with the highest priority to the plurality of power panels 100, 200, 300, 400, the power supply source may be switched to the battery 10 #2 or the second AC power source 10 #3 to receive power.

When a fault has occurred in at least one of the first AC power source 10 #1 and the first conversion device 110 #1, 210 #1, 310 #1, 410 #1, each of the plurality of power panels 100, 200, 300, 400 may select one of the second conversion device 110 #2, 210 #2, 310 #2, 410 #2 and the third conversion device 110 #3, 210 #3, 310 #3, 410 #3 according to the states of the second conversion device 110 #2, 210 #2, 310 #2, 410 #2 and the third conversion device 110 #3, 210 #3, 310 #3, 410 #3, and operate the selected conversion device to transfer the DC power to the at least one second power conversion device 120, 220, 320, 420.

While the second circuit breaker 130b, 230b, 330b, 430b is closed, the each of the plurality of power panels 100, 200, 300, 400 may operate conversion devices other than a conversion device corresponding to the second output end, to transfer the DC power to the at least two power conversion device 120.

The operation of the power supply system 1000 including the plurality of power panels 100, 200, 300, 400 will be described with reference to FIGS. 3 to 6.

FIGS. 3 to 6 illustrates an example in which the power supply system 1000 includes five power panels 100, 200, 300, 400, 500. The number of the plurality of power panels 100, 200, 300, 400, 500 included in the power supply system 1000 may be fewer or greater than 5 or may be 5.

The preferred embodiment of the power supply system 1000 may include five power panels 100, 200, 300, 400, 500 as illustrated in FIGS. 3 to 6, and hereinafter, a description will be given of an example in which the number of the power panel is 5 as illustrated in FIGS. 3 to 6.

FIG. 3 illustrates a case where each of the plurality of power panels 100, 200, 300, 400, 500 receives power from the system power source G among the plurality of power supply sources 10. In this case, power may be received from the system power source G, with shutting down the power supply from the bypass power source P and the battery power source B. The supplied power may be converted sequentially into the DC power and the driving power so as to be supplied to each of the loads 20.

The example illustrated in FIG. 3 is a case of a typical operation in which the power supply system 1000 is operated by receiving power from the system power source G. The normal operation of the power supply system 1000 may be carried out in this manner.

FIG. 4 illustrates a case where each of the plurality of power panels 100, 200, 300, 400, 500 receives power from the bypass power supply P among the plurality of power supply sources 10, which corresponds to a case in which a fault has occurred in the system power source G. In this case, power may be received from the bypass power source P, with shutting down the power supply from the system power source G and the battery power source B. The supplied power may be converted sequentially into the DC power and the driving power so as to be supplied to each of the loads 20.

The example illustrated in FIG. 4 is a case of a specific operation in which the power supply system 1000 is operated by receiving power from the bypass power source G. Such specific operation of the power supply system 1000 may be carried out in this manner.

FIG. 5 illustrates a case where each of the plurality of power panels 100, 200, 300, 400, 500 receives power from the battery power source B among the plurality of power supply sources 10, which corresponds to a case in which a fault has occurred in the system power source G and the bypass power source P. In this case, power may be received from the battery power source G, with shutting down the power supply from the system power source G and the bypass power source P. The supplied power may be converted sequentially into the DC power and the driving power so as to be supplied to each of the loads 20.

The example illustrated in FIG. 5 is a case of an interruption operation in which the power supply system 1000 is operated by receiving power from the battery power source G. Such interruption operation of the power supply system 1000 may be carried out in this manner.

FIG. 6 illustrates a case where each of the plurality of power panels 100, 200, 300, 400, 500 receives power from the emergency power source A among the plurality of power supply sources 10, which corresponds to a case in which a fault has occurred in the system power source G, the bypass power source P, and the battery power source B. In this case, the emergency power source A may supply the driving power directly to each of the loads while the power supply from the system power source G, the bypass power source P, and the battery power source B is shut down.

The example illustrated in FIG. 6 is a case of an emergency operation in which the power supply system 1000 is operated by receiving power from the emergency power source A. Such emergency operation of the power supply system 1000 may be carried out in this manner.

In this way, the power supply system 1000 may be configured such that each of the plurality of power panels 100, 200, 300, 400, 500 is operated by receiving power from the same power supply source or selectively from one of the plurality of power supply sources 10.

For example, the first and second power panels 100 and 200 may be operated by receiving power from the system power source G, the third and fourth power panels 300, 400 may be operated by receiving power from the bypass power source P, and the fifth power panel 500 may be operated by receiving power from the battery power source B.

In addition, each of the plurality of power panels 100, 200, 300, 400, 500 may be operated by receiving power from at least one of the power supply sources 10.

For example, when the DC power is supplied from the second power panel 200 to the first power panel 100 due to a fault occurred in the first power panel 100, the second power panel 200 may convert power supplied from the system power source G into the DC power through a 2-1th conversion device 210 #1 and transfer the DC power to each of the at least one second conversion device 200. The second power panel 200 may further receive power from the bypass power source P, convert the further-received power into the DC power through a 2-3th conversion device 210 #3, and transfer the DC power converted in the 2-3th conversion device 210 #3 to each of the at least one second conversion device 200 of the first power panel 100 through the bus line 1.

In the example, by closing the first circuit breaker 130a of the first power panel 100 and the second circuit breaker 230b of the second power panel 200, the first power panel 100 and the second power panel 200 may be connected to the bus line 1, such that the DC power can be supplied from the second power panel 200 to the first power panel 100 through the bus line 1.

In this way, each of the plurality of power panels 100, 200, 300, 400, 500 can be operated by receiving power from at least one of the power supply sources 10, which may allow the power supply among the plurality of power panels 100, 200, 300, 400, 500, namely, the UPS function to be performed among the plurality of power panels 100, 200, 300, 400, 500.

In this way, the plurality of power panels 100, 200, 300, 400, 500 that converts and supplies the DC power may be controlled by the control device 600.

The control device 600 may perform communication with each of the plurality of power panels 100, 200, 300, 400, 500, so as to control each of the plurality of power panels 100, 200, 300, 400, 500 based on state information received from each of the plurality of power panels 100, 200, 300, 400, 500.

For example, the conversion and supply of the DC power in the plurality of power panels 100, 200, 300, 400, 500 and the conversion and supply of the driving power may be controlled based on state information related to the DC power and the driving power received from each of the plurality of power panels 100, 200, 300, 400, 500.

The control device 600 may perform communication with each of the plurality of power panels 100, 200, 300, 400, 500, so as to control the conversion and supply of the driving power of each of the plurality of power panels 100, 200, 300, 400, 500, or control the first and second circuit breakers 130, 230, 330, 430, 530 included in the plurality of power panels 100, 200, 300, 400, 500, based on state information received from each of the plurality of power panels 100, 200, 300, 400, 500.

The control device 600 may also detect states of the plurality of power supply sources 10 and the loads 20, or receive information related to states of the plurality of power supply sources 10 and the loads 20 from an external communication device, and control the conversion and supply of the driving power of each of the plurality of power panels

100, 200, 300, 400, 500, or control the first and second circuit breakers 130, 230, 330, 430, 530 included in the plurality of power panels 100, 200, 300, 400, 500, based on the states of the plurality of power supply sources 10 and the loads 20.

In this case, the control device 600 may transmit a control command to each of the plurality of power panels 100, 200, 300, 400, 500 to control the conversion and supply of the driving power of the plurality of power panels 100, 200, 300, 400, 500 or control the first and second circuit breakers 130, 230, 330, 430, 530 included in the plurality of power panels 100, 200, 300, 400, 500. Then, the control units 140, 240, 340, 440, 540 included in the plurality of power panels 100, 200, 300, 400, 500 can perform such control according to the control command.

For example, when a fault has occurred in the entire system power source G which is supplying power to the plurality of power panels 100, 200, 300, 400, 500, the control device 600 may open the first and second circuit breakers 130, 230, 330, 430, 530 to shut down the power supply from the system power source G and allow the power supply from another power supply source. Then, the control device 600 may transmit a control command for controlling the conversion and supply of the DC power by receiving power from other power sources except for the system power source G to the control units 140, 240, 340, 440, 540 included in the plurality of power panels 100, 200, 300, 400, 500, so as to open the first and second circuit breakers 130, 230, 330, 430, 530. Accordingly, the control device 600 may control the conversion and supply of the DC power by receiving power from the bypass power source P or the battery power source B.

In this way, the control device 600 for controlling the plurality of power panels 100, 100, 200, 300, and 500 may determine a fault-occurred target power panel of the plurality of power panels 100, 200, 300, 400, 500, and close the first circuit breaker 130a, 130a, 230a, 330a, 430, 530a of the determined fault-occurred power panel and the second circuit breaker 130b, 130b, 230b, 330b, 430, 530b of a supply target power panel, which is to supply the DC power to the fault-occurred power panel, such that the DC power can be supplied from the supply target power panel to the fault-occurred power panel through the bus line 1.

The control device 600 may open the plurality of first and second circuit breakers 130, 130, 230, 330, 430, 530 at normal times, and close the first circuit breaker 130a, 130a, 230a, 330a, 430a, 530a of the fault-occurred power panel and the second circuit breaker 130b, 130b, 230b, 330b, 430b, 530b of the supply target power panel when the DC power is supplied to the fault-occurred power panel.

That is, the control device 600 may open the plurality of first and second circuit breakers 130, 130, 230, 330, 430, 530 at normal times. When the fault-occurred power panel exists among the plurality of power panels 100, 100, 200, 300, 400, 500, the control device 600 may close the first circuit breaker 130a, 130a, 230a, 330a, 430a, 530a of the fault-occurred power panel and the second circuit breaker 130b, 130b, 230b, 330b, 430b, 530b of a supply target power panel to supply the DC power to the fault-occurred power panel.

Figure 20:
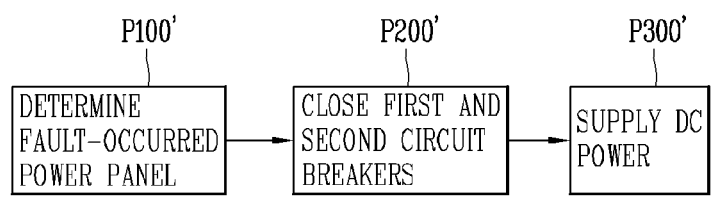
FIG. 20 is a block diagram 2 illustrating a detailed control process of a power supply system in accordance with one embodiment the present disclosure.

In this way, the control device 600 for controlling the DC power to be supplied to the fault-occurred power panel may control the supply of the DC power through the process illustrated in FIG. 20.

The control device 600, as illustrated in FIG. 20, may determine the fault-occurred target power panel (P100'), and close the first circuit breaker 130a, 130a, 230a, 330a, 430, 530a of the determined fault-occurred power panel and the second circuit breaker 130b, 130b, 230b, 330b, 430, 530b of a supply target power panel to supply the DC power to the fault-occurred power panel (P200'), such that the DC power can be supplied from the supply target power panel to the fault-occurred power panel through the bus line 1 (P300').

The control device 600 may detect a state of at least one of the plurality of power panels 100, 200, 300, 400, 500, and compare the detection result with a preset state criterion. When the state of the at least one of the plurality of power panels 100, 200, 300, 400, 500 corresponds to the preset state criterion, the control device 600 may determine the power panel corresponding to the state criterion as the fault-occurred power panel (P100').

The state criterion may include a fault criterion for a state of at least one of the plurality of power supply sources 10, the plurality of first power conversion devices 110, 210, 310, 410, 510 included in the plurality of power panels 100, 200, 300, 400, 500, and the DC power and the driving power of the plurality of power panels 100, 200, 300, 400, 500.

When receiving fault occurrence information from the plurality of power panels 100, 200, 300, 400, 500, the control device 600 may also determine a power panel, which has transmitted the fault occurrence information, as the fault-occurred power panel (P100').

When supplying the DC power to the fault-occurred power panel, the control device 600 may transmit reception request information for the reception of the DC power to the fault-occurred power panel, and transmit supply request information for the supply of the DC power to the supply target power panel.

When supplying the DC power to the fault-occurred power panel by determining the fault-occurred power panel (P100'), the control device 600 may transmit the reception request information for the reception of the DC power to the fault-occurred power panel and transmit the supply request information for the supply of the DC power to the supply target power panel, such that the fault-occurred power panel closes the first circuit breaker 130a, 230a, 330a, 430a, 530a and the supply target power panel closes the second circuit breaker 130b, 230b, 330b, 430b, 530b (P200').

The fault-occurred power panel may close the first circuit breaker 130a, 230a, 330a, 430a, 530a according to the reception request information (P200') to receive the DC power from the bus line 1 to the power end (P300'), and the supply target power panel may close the second circuit breaker 130b, 230b, 330b, 430b, 530b according to the supply request information (P200') to supply the DC power from the second output end to the bus line 1 (P300').

That is, as the fault-occurred power panel closes the first circuit breaker 130a, 230a, 330a, 430a, 530a and the supply target power panel closes the second circuit breaker 130b, 230b, 330b, 430b, 530b, the supply target power panel may supply the DC power from the second output end to the bus line 1, and the fault-occurred power panel may receive the DC power from the bus line 1 to the power end (P300').

The method of controlling the power supply system 1000 (hereinafter, referred to as a control method) as described above may be a method of operating the power supply system 1000 or a method of controlling an operation of the power supply system 1000.

The control method, as illustrated in FIG. 1A, is a method for controlling the power supply system 1000, which includes the plurality of power panels 100, 200, 300, 400 that converts power received from each of the plurality of power supply sources 10, which includes the first AC power source 10 #1 and the second AC power source 10 #3 supplying AC power and the battery power source 10 #2 storing DC power, into the DC power, converts the DC power into driving power for driving the loads 20, and supplies the driving power to the loads 20, a bus line 1 that is connected to power ends, to which the DC power is input from the plurality of power panels 100, 200, 300, 400, respectively, and second output ends separately provided from the power ends to output the DC power, such that the DC power converted in the plurality of power panels 100, 200, 300, 400 flows therethrough, a plurality of first circuit breakers 130a, 230a, 330a, 430a disposed between the power ends and the bus line 1 to control connection and disconnection between the power ends and the bus line 1, and a plurality of second circuit breakers 130b, 230b, 330b, 430b disposed between the second output ends and the bus line 1 to control connection and disconnection between the second output ends and the bus line 1. As illustrated in FIG. 21, the control method may include controlling operations of the plurality of power panels 100, 200, 300, 400 according to power supply states of the plurality of power panels 100, 200, 300, 400 (not illustrated), determining a fault-occurred power panel among the plurality of power panels 100, 200, 300, 400 (S10), transmitting information related to reception and supply of the DC power to each of the fault-occurred power panel and a supply target power panel to supply the DC power to the fault-occurred power panel (S20), closing the first circuit breaker 130a, 230a, 330a, 430a of the fault-occurred power panel and the second circuit breaker 130b, 230b, 330, 430 of the supply target power panel (S30), and supplying the DC power from the supply target power panel to the fault-occurred power panel through the bus line 1 (S40).

The control method may be performed by the control device 600.

Figure 22:
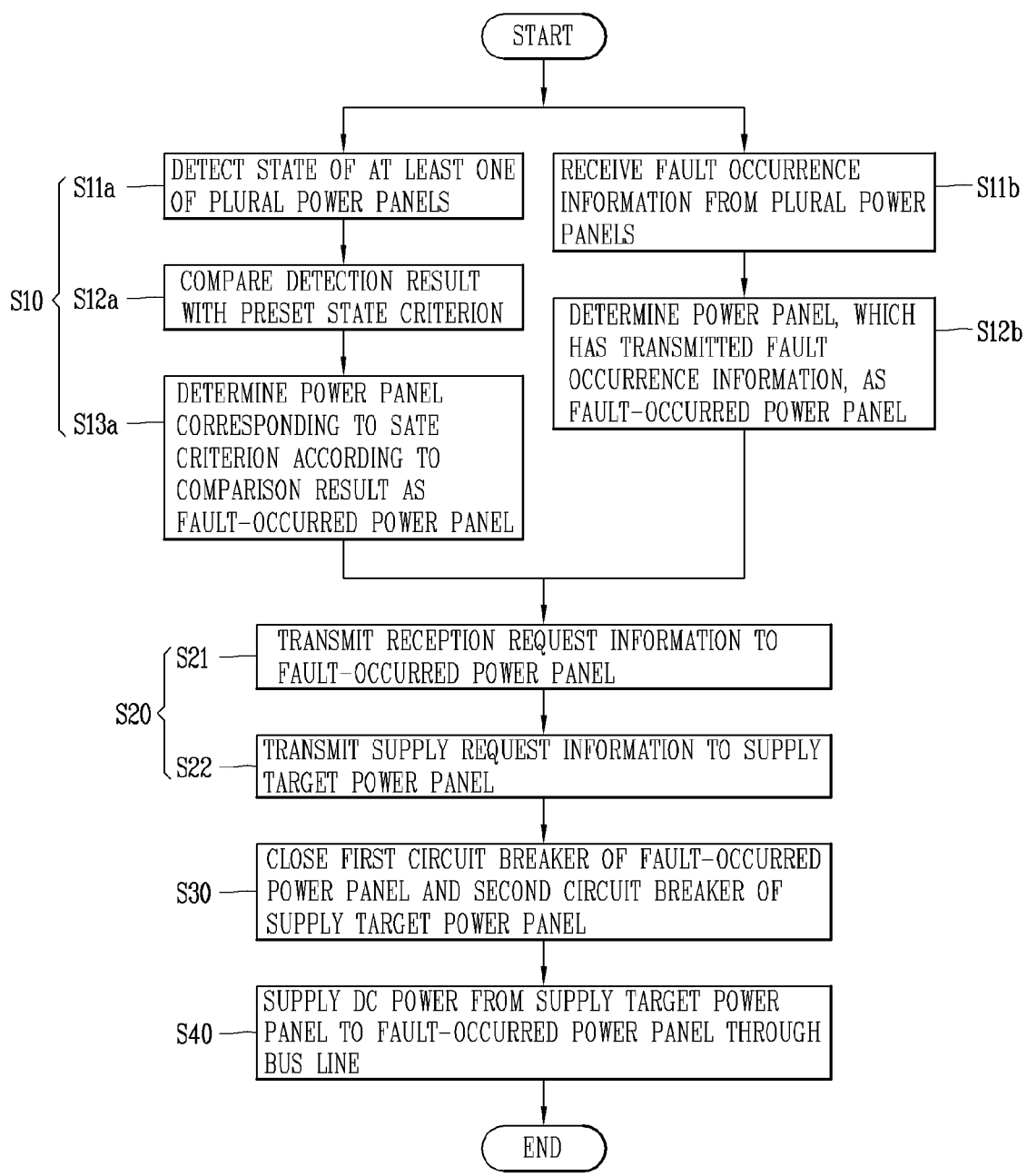
FIG. 22 is a flowchart illustrating a detailed sequence of a method for controlling a power supply system in accordance with according another embodiment of to the present disclosure.

A detailed sequence of the control method may be as illustrated in FIG. 22.

The controlling of the operation of each of the plurality of power panels 100, 200, 300, 400 may be the same as that in the foregoing embodiment of the power supply system 1000.

The controlling of the operation of each of the plurality of power panels 100, 200, 300, 400 may be configured to control the operation of each of the plurality of power panels 100, 200, 300, 400, such that power supplied from each of the plurality of power supply sources 10 is converted into the DC power to be supplied to the loads 20.

Here, when the power supply of the first AC power source 10 #1 and the second AC power source 10 #3 is interrupted, the battery power source 10 #2 may supply the stored power to the plurality of power panels 100, 200, 300, 400 while the interrupted power supply is restored in a switching manner.

That is, when the power supply of the first AC power source 10 #1 and the second AC power source 10 #3 is interrupted, the battery power source 10 #2 may maintain the power supply of the plurality of power panels 100, 200, 300, 400.

The controlling of the operation of each of the plurality of power panels 100, 200, 300, 400 may be configured to control the plurality of power panels 100, 200, 300, 400 to receive power sequentially from the first AC power source 10 #1 and the second AC power source 10 #3. Here, while the power supply of the first AC power source 10 #1 or the second AC power source 10 #3 is switched, the control device 600 may maintain the power supply using the battery power source 10 #2.

The plurality of power supply sources 10 may further include an emergency power source 10 #4 for supplying emergency power to the loads 20 when the power supply of the first AC power source 10 #1, the second AC power source 10 #3, and the battery power source 10 #2 is interrupted.

Accordingly, when the power supply of the battery power source 10 #2 is interrupted in each of the plurality of power panels 100, 200, 300, 400, the loads 20 may receive power from the emergency power source 10 #4, so as to maintain the power supply.

The controlling of the operation of each of the plurality of power panels 100, 200, 300, 400 may be configured to receive power from the first AC power source 10 #1 and convert the received power into the DC power through the first conversion device 110 #1, 210 #1, 310 #1, 410 #1, when the states of the first AC power source 10 #1 and the first conversion device 110 #1, 210 #1, 310 #1, 410 #1 which receives power from the first AC power source 10 #1 correspond to a normal state.

The controlling of the operation of each of the plurality of power panels 100, 200, 300, 400 may be configured to switch the first AC power source 10 #1 and the first conversion device 110 #1, 210 #1, 310 #1, 410 #1 into the second AC power source 10 #3 and the second conversion device 110 #3, 210 #3, 310 #3, 410 #3 receiving power from the second AC power source 10 #3, when the power supply is interrupted due to occurrence of a fault in at least one of the first AC power source 10 #1 and the first conversion device 110 #1, 210 #1, 310 #1, 410 #1.

The controlling of the operation of each of the plurality of power panels 100, 200, 300, 400 may be configured to receive power from the battery power source 10 #2 while the power supply is switched to the second AC power source 10 #3 and the second conversion device 110 #3, 210 #3, 310 #3, 410 #3, and then convert the received power into the DC power through the second conversion device 110 #2, 210 #2, 310 #2, 410 #2 receiving power from the battery power source 10 #2, when the first AC power source 10 #1 and the first conversion device 110 #1, 210 #1, 310 #1, 410 #1 are switched to the second AC power source 10 #3 and the second conversion device 110 #2, 210 #2, 310 #2, 410 #2 due to occurrence of a fault in the first AC power source 10 #1 and the first conversion device 110 #1, 210 #1, 310 #1, 410 #1.

That is, while the first AC power supply 10 #1 and the first conversion device 110 #1, 210 #1, 310 #1, 410 #1 are switched into the second AC power supply 10 #3 and the second conversion device 110 #2, 210 #2, 310 #2, 410 #2, the DC power may be converted through the battery power source 10 #2 and the second conversion device 110 #2, 210 #2, 310 #2, 410 #2, such that the power supply can be carried out uninterruptibly.

The controlling of the operation of each of the plurality of power panels 100, 200, 300, 400 may be configured to receive power from the battery power source 10 #2 and convert the power into the DC power through the battery power source 10 #2 and the second conversion device 110 #1, 210 #1, 310 #1, 410 #1 until the power supply is restored, when a fault has occurred in at least one of the first AC power 10 #1 and the first conversion device 110 #1, 210 #1, 310 #1, 410 #1 in a state where the second circuit breaker 130b, 230b, 330b, 430b is closed.

That is, while power is being supplied to the bus line 1 by closing the second circuit breaker 130b, 230b, 330b, 430b, when a fault has occurred in at least one of the first AC power source 10 #1 and the first conversion device 110 #1, 210 #1, 310 #1, 410 #1, the power supply to the bus line 1 may be stopped and the power supply through a conversion device corresponding to the second output end may be restored. Here, while the power supply through the conversion device corresponding to the second output end is restored, the power supply may be maintained through the battery power source 10 #2 and the second conversion device 110 #2, 210 #2, 310 #2, 410 #2.

In this case, the restoration of the power supply may indicate a process of opening the second circuit breaker 130b, 230b, 330b, 430b and convert the DC power converted in the conversion device corresponding to the second output end into the driving power to supply to the loads 20.

As such, the controlling of the operation of each of the plurality of power panels 100, 200, 300, 400 may be configured to control the power supply in each of the plurality of power panels 100, 200, 300, 400.

The determining step (S10) may be configured to determine a fault-occurred power panel, among the plurality of power panels 100, 200, 300, 400 while the plurality of power panels 100, 200, 300, 400 is operating.

The determining step (S10), as illustrated in FIG. 22, may include detecting a state of at least one of the plurality of power panels 100, 200, 300, 400 (S11a), comparing a result of the detection with a preset state criterion (S12a), and determining a power panel corresponding to the state criterion as the fault-occurred power panel (S13a).

The detecting the state of the at least one power panel (S11a) may be configured to detect a state of at least one of the plurality of power supply sources 10, the plurality of first power conversion devices 110, 210, 310, 410, and the DC power and the driving power of the plurality of power panels 100, 200, 300, 400.

The comparing with the state criterion (S12a) may be configured to compare the result of the detection with the state criterion which includes a fault criterion for the state of the at least one of the plurality of power supply sources 10, the plurality of first power conversion devices 110, 210, 310, 410, and the DC power and the driving power of the plurality of power panels 100, 200, 300, 400.

The detecting the fault-occurred power panel (S13a) may be configured to determine a power panel corresponding to the state criterion as the fault-occurred power panel according to a result of the comparison between the detection result of the state of the at least one of the plurality of power supply sources 10 of each of the plurality of power panels 100, 200, 300, 400, the plurality of first power conversion devices 110, 210, 310, 410, the DC power, and the driving power and the state criterion including the fault criterion of the state of the at least one of the plurality of power supply sources 10, the plurality of first power conversion devices 110, 210, 310, 410, the DC power, and the driving power.

The determining the fault-occurred power panel (S10) may be configured to determine a power panel, in which a fault has occurred in power supply of the first and second AC power sources 10 #1 and 10 #3, among the plurality of power panels 100, 200, 300, 400, as the fault-occurred power panel.

That is, the fault-occurred power panel may be a power panel in which the power supply of the first and second AC power sources 10 #1 and 10 #3 is interrupted due to an occurrence of a fault in the first and second AC power sources 10 #1 and 10 #3.

The fault-occurred power panel may be a power panel, in which only the power supply of the battery power source 10 #2 is allowed due to the occurrence of the fault in the first and second AC power sources 10 #1 and 10 #3.

That is, the determining step (S10) may be configured to determine a power panel, in which only the battery power source 10 #2 is allowed to supply power due to the occurrence of the fault in the first and second AC power sources 10 #1 and 10 #3.

Accordingly, the supply target power panel may supply power to the fault-occurred power panel, in which only the power supply of the battery power source 10 #2 is allowed to supply power due to the occurrence of the fault in the first and second AC power sources 10 #1 and 10 #3.

The determining step (S10) may include receiving fault occurrence information from at least one of the plurality of power panels 100, 200, 300, 400 (S11b), and determining a power panel which has transmitted the fault occurrence information as the fault-occurred power panel (S12b).

The receiving the fault occurrence information (S11b) may be configured to receive the fault occurrence information transmitted from a power panel, in which the fault has occurred of the plurality of power panels 100, 200, 300, 400.

The determining the fault occurrence information (S12b) may be configured to determine a power panel, which has transmitted the fault occurrence information received in the step S11b, as the fault-occurred power panel.

As such, the step (S10) of determining the fault-occurred power panel may include detecting a state of the at least one power panel (S11a), comparing the detected state with a state criterion (S12a), determining a power panel corresponding to the state criterion as the fault-occurred power panel (S13a), or may include receiving the fault occurrence information (S11b), and determining a power panel which has transmitted the fault occurrence information as the fault occurrence power panel (S12b).

That is, the determining step (S10) may be configured to determine the fault-occurred power panel by a sequential process including detecting the state of the at least one power panel (S11a), comparing the detected state with the state criterion (S12a), and determining a power panel corresponding to the state criterion as the fault-occurred power panel (S13a) or by a sequential process including receiving the fault occurrence information (S11b), and determining a power panel that has transmitted the fault occurrence information as the fault-occurred power panel (S12b).

The transmitting step (S20) may be configured to transmit information related to the reception and supply of the DC power to each of the fault-occurred power panel determined in the step S10 and the supply target power panel.

The transmitting step (S20) may be configured to transmit reception request information for the reception of the DC power to the fault-occurred power panel (S21), and transmit supply request information for the supply of the DC power to the supply target power panel (S22).

The transmitting the reception request information (S21) may be configured to transmit the reception request information to the fault-occurred power panel such that the fault-occurred power panel receives the DC power from the bus line 1 to the power end by closing the first circuit breaker 130a, 230a, 330a, 430a.

The transmitting the supply request information (S22) may be configured to transmit the supply request information to the supply target power panel such that the supply target power panel supplies the DC power from the second output end to the bus line 1 by closing the second circuit breaker 130a, 230a, 330a, 430a.

In the closing step (S30), the first circuit breaker 130a, 230a, 330a, 430a of the fault-occurred power panel and the second circuit breaker 130b, 230b, 330b, 430b of the supply target power panel may be closed according to the reception request information and the supply request information transmitted to the fault-occurred power panel and the supply target power panel, respectively, in the step S20.

The supplying step (S40) may be configured to supply the DC power from the supply target power panel to the fault-occurred power panel through the bus line 1 by closing the first circuit breaker 130a, 230a, 330a, 430a of the fault-occurred power panel and the second circuit breaker 130b, 230b, 330b, 430b of the supply target power panel in the step S30.

The supplying step (S40) may be configured such that the fault-occurred power panel receives the DC power from the bus line 1 to the power end, and the supply target power panel supplies the DC power from the second output end to the bus line 1.

That is, the supplying step (S40) may be configured such that the supply target power panel supplies the DC power from the second output end to the bus line 1, and the fault-occurred power panel receives the DC power from the bus line 1 to the power end.

The supply target power panel may convert power supplied from the second AC power source 10 #3 into the DC power to supply the DC power to the bus line 1.

That is, the supply target power panel may be a power panel, which is operated by receiving power from the first AC power source 10 #1 and can supply power only through the second AC power source 10 #3.

Accordingly, the supply target power panel may be operated by receiving power from the first AC power source 10 #1, and convert power supplied from the second AC power source 10 #3 into the DC power to supply the DC power to the bus line 1.

The supplying step (S40) may be configured to switch the supply target power panel to another power panel and supply DC power from the switched another power panel to the fault-occurred power panel when the power supply through the first AC power source 10 #1 of the supply target power panel is interrupted.

That is, in the supplying step (S40), when the power supply through the first AC power source 10 #1 of the supply target power panel is interrupted, the supply target power panel may be switched to the another power panel, such that the power supply of the supply target power panel, which is supplying the DC power to the bus line 1 through the second AC power source 10 #3, is switched to the battery power source 10 #2. Accordingly, the switched another power panel can supply the DC power to the fault-occurred power panel.

The supply target power panel may receive power from the battery power source 10 #2 and convert the received power into the DC power, while the supply target power panel is disconnected from the bus line 1 and the power supply of the second AC power source 10 #3 is restored after the power supply of the first AC power source 10 #1 is interrupted.

In other words, the supply target power panel may maintain the power supply through the battery power source 10 #2 until the power supply of the second AC power source 10 #3 is restored after the power supply of the first AC power source is interrupted.

The another power panel may convert the power supplied from the second AC power source 10 #3 into the DC power to supply the DC power to the bus line 1.

That is, the another power panel may be a power panel, which is operated by receiving power from the first AC power source 10 #1 and can supply power only using the second AC power source 10 #3.

In the supplying step (S40), when the supply target power panel is switched to the another power panel, the second circuit breaker 130b, 230b, 330, 430 of the supply target power panel may be opened to separate the supply target power panel from the bus line 1 and the second circuit breaker 130b, 230b, 330b, 430b of the another power panel may be closed to connect the another power panel to the bus line 1.

In this way, as the supply target power panel supplies the DC power from the second output end to the bus line 1 and the fault-occurred power panel receives the DC power from the bus line 1 to the power end in the step S40, the DC power can be transferred to the at least one second conversion device 120, 220, 320, 420 of the fault-occurred power panel, such that the driving power can be uninterruptibly supplied to the loads 20 of the fault-occurred power panel.

According to the control method, the power supply, namely, the UPS function among the plurality of power panels 100, 200, 300, 400, 500 can be performed. Therefore, the power supply system 1000 can maintain the power supply to the loads without interruption even when various abnormal situations occur on the system, and perform the power supply adequately and stably for such various abnormal situations occurring on the system.

In the method of controlling the plurality of power panels 100, 200, 300, 400 and the power supply among the plurality of power panels 100, 200, 300, 400, when it is determined in the step S40 that a plurality of fault-occurred power panel exists, each of the plurality of fault-occurred power panels may receive power from the battery power source 10 #2 and convert the power into the DC power while the first AC power source 10 #1 or the second AC power source 10 #3 is restored.

That is, when there is the plurality of fault-occurred power panels, the power supply to the loads 20 may be maintained by receiving power from the battery power source 10 #2.

In the control method, when it is determined in the step of determining the fault-occurred power panel of the plurality of power panels 100, 200, 300, 400 that a fault has occurred in the battery power source 10 #2 of the fault-occurred power panel, the power panel in which the fault has occurred in the battery power panel 10 #2 may supply power to the loads 20 through the emergency power source 10 #4 which supplies emergency power to the loads 20 while the first AC power source 10 #1 or the second AC power source 10 #2 is restored.

That is, when it is determined that the fault has occurred in the battery power source 10 #2 of the fault-occurred power panel, the power supply to the loads 20 may be maintained as the fault-occurred power panel receives power from the emergency power source 10 #4.

Hereinafter, a detailed example of operating the power supply system 1000 will be described with reference to FIGS. 8 to 15.

FIGS. 8 to 15 are exemplary diagrams sequentially illustrating the operation of the power supply system according to an occurrence of a fault when five power panels 100, 200, 300, 400, 500 are provided. Detailed embodiments of the power supply system 1000 may be implemented in various forms without being limited to those illustrated in FIGS. 8 to 15.

FIG. 8 illustrates an example in which a fault has occurred in the first AC power source 10 #1 of the first power panel 100 of the plurality of power panels 100, 200, 300, 400, 500, and thus the DC power is supplied to the at least one second power conversion device 220 by switching the first AC power source 10 #1 to the second AC power source 10 #3.

As illustrated in FIG. 9, when the DC power is not supplied to the at least one second power conversion device 220 due to an occurrence of a fault in the second AC power source 10 #3, the first circuit breaker 130a of the first power panel 100 may be closed, as illustrated in FIG. 10, and the second circuit breaker 230b of the second power panel 200 adjacent to the first power panel 100 may be closed, such that the DC power can be supplied to the at least one second power conversion device 220 through the conversion device 210 #3 corresponding to the second output end of the second power panel 200.

As illustrated in FIG. 11, when the second power panel 200 receives power from the second AC power panel 10 #3 and the conversion device 210 #3 connected to the second AC power source 10 #3 and having the second output end is supplying the DC power to the at least one second power conversion device 220, since the DC power cannot be supplied from the second power panel 200, the second circuit breaker 330b of the third power panel 300 adjacent to the first power panel 100 may be closed, such that the DC power can be supplied to the at least one second power conversion device 220 through the conversion device 310 #3 corresponding to the second output end of the third power panel 300.

In the state as illustrated in FIG. 11, when fault conditions occur in the first AC power source 10 #1 and the second AC power source 10 #3 of the second power panel 200 as illustrated in FIG. 12, since the DC power is being supplied from the third power panel 300 to the first power panel 100 through the bus line 1, the second power panel 200 cannot receive the DC power from other power panels. Accordingly, as illustrated in FIG. 13, the second AC power source 10 #3 of the second power panel 200 may be switched to the battery power panel 10 #2 such that the DC power can be supplied to the at least one second power conversion device 210 through the conversion device 210 #2 connected to the battery power source 10 #2.

Figure 14:
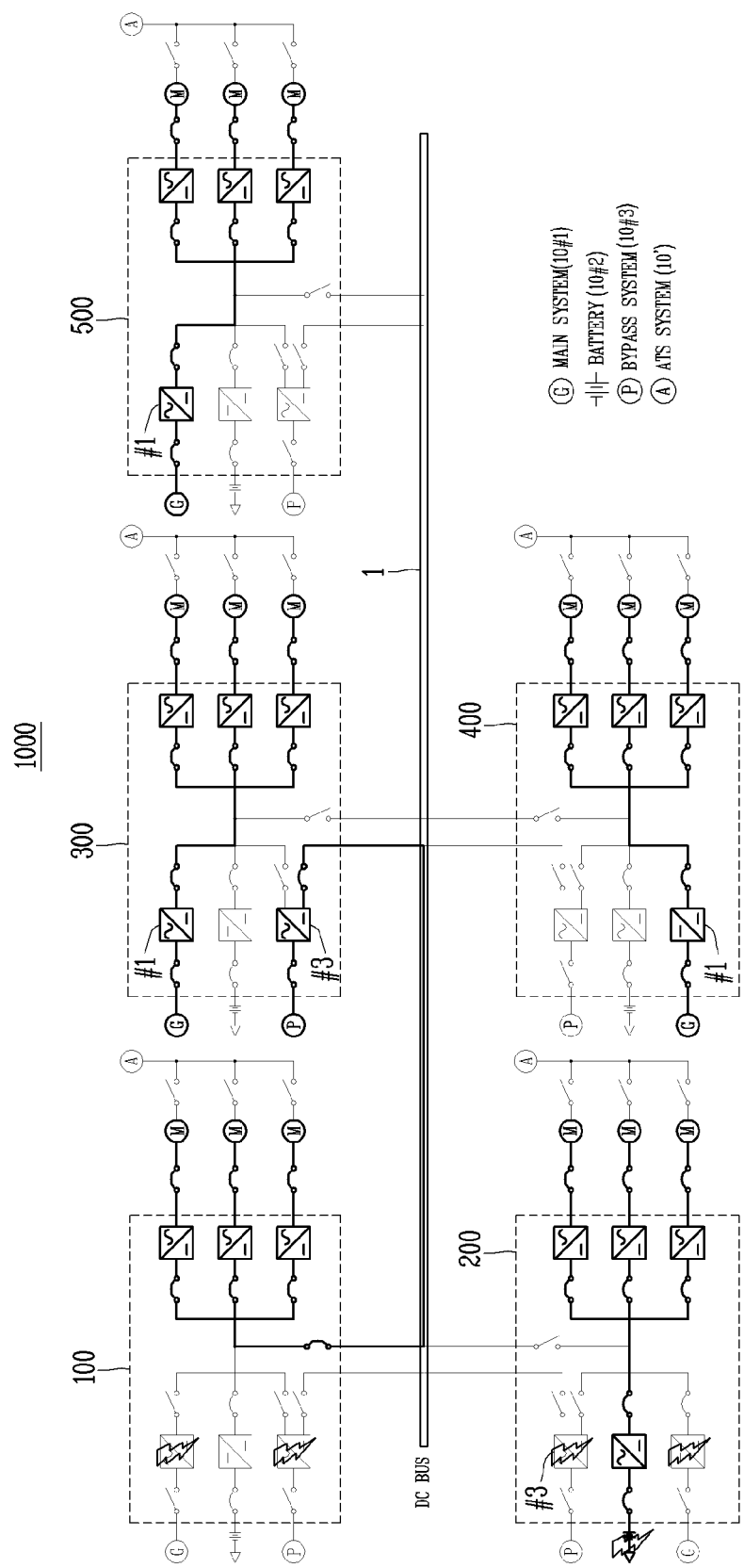
FIG. 14 is an exemplary view 7 sequentially illustrating a detailed example of a power supply system in accordance with one embodiment of the present disclosure.

In the state as illustrated in FIG. 13, when a fault has occurred in the battery power source 10 #2 of the second power panel 200, all of the plurality of power supply sources 10 supplying power to the second power panel 200 cannot supply power. Accordingly, as illustrated in FIG. 14, the battery power source 10 #2 of the second power panel 200 may be shut down and switched to an emergency power source 10', such that the driving power can be supplied from the emergency power source 10' directly to the loads 20.

As described above, when a fault has occurred in at least one of the plurality of power panels 100, 200, 300, 400, 500, the first and second circuit breakers 130, 230, 330, 430, 530 may be controlled or the power supply of the plurality of power supply sources 10 may be switched according to the state of each of the plurality of power panels 100, 200, 300, 400, 500. In this manner, the power supply, namely, the UPS function among the plurality of power panels 100, 200, 300, 400, 500 can be performed, such that the plurality of power panels 100, 200, 300, 400, 500 can uninterruptibly operate without interruption of the power supply.

According to the control method, the power supply to the loads can be uninterruptibly maintained even when various abnormal situations occur on the system, and the power supply can be performed adequately and stably for such various abnormal situations occurring on the system.

The embodiments of the power supply device, the power supply system, and the method for controlling the power supply system according to the present disclosure may be applied to a power supply device that supplies and uses DC power, a power supply system, and a method of operating the power supply system. In particular, the embodiments described above may be usefully applied to a DC UPS module and a power supply system having the same, and may also be applied to a motor control panel for controlling a plurality of motor loads, a motor control system, a motor driving system, etc.

Although those detailed embodiments according to the present disclosure have been described, various modifications may also be made without departing from the scope of the present disclosure. Therefore, the scope of the present disclosure should not be defined by being limited to the foregoing embodiments, and should be defined not only by the claims to be described later but also by equivalents of the claims.

As described above, although the present disclosure has been described by the limited embodiments and drawings, the present disclosure is not limited to the above embodiments, and various modifications and changes may be made from the disclosure by those skilled in the art. Therefore, the idea of the present disclosure should be construed only by the claims set forth below, and all equivalent or equivalent modifications thereof will be said to belong to the scope of the idea of the present disclosure.

[Brief description of reference numerals]

| | |
|---|---|
| 10: power supply source | 20: load |
| 100 (200, 300, 400, and 500): power supply device (power panel) | |
| 110 (210, 310, 410, and 510): first power conversion device (converter) | |
| 120 (220, 320, 420, and 520): second power conversion device (inverter) | |
| 130a (230a, 330a, 430a, and 530a): first circuit breaker | |
| 130b (230b, 330b, 430b, and 530b): second circuit breaker | |
| 140 (240, 340, 440, and 540): control unit | |
| 600: control device | 1000: power supply system |

The invention claimed is:

1. A method for controlling a power supply system that comprises a plurality of power panels configured to convert power, which is supplied from each of a plurality of power supply sources including first and second Alternating-Current (AC) power sources supplying AC power and a battery power source storing DC power, into Direct-Current (DC) power, convert the DC power into driving power for driving loads, and supply the driving power to the loads, a bus line connected to power ends through which the DC power is input and output to and from the plurality of power panels, respectively, such that the DC power converted in the plurality of power panels flows therethrough, a plurality of circuit breakers disposed between the power ends and the bus line, respectively, to control connection and disconnection between the power ends and the bus line, and a control device configured to monitor and control the plurality of power panels, the method comprising:
    determining a supply target power panel to supply the DC power to a fault-occurred power panel when a fault has occurred in at least one of the plurality of power panels;
    closing at least one circuit breaker connected to the fault-occurred power panel and the supply target power panel, among the plurality of circuit breakers; and
    supplying the DC power from the supply target power panel to the fault-occurred power panel through the bus line,
    wherein the determining the supply target power panel is configured to determine supply priorities of remaining power panels excluding the fault-occurred power panel and determine the supply target power panel according to the supply priorities.

2. The method of claim 1, further comprising:
determining the fault-occurred power panel among the plurality of power panels while controlling operations of the plurality of power panels according to power supply states of the plurality of power panels, respectively.

3. The method of claim 2, wherein the determining the fault-occurred power panel among the plurality of power panels is configured to determine a power panel, in which a fault has occurred in power supply of the first and second AC power sources among the plurality of power panels, as the fault-occurred power panel.

4. The method of claim 1, wherein the determining is configured to determine the supply priorities according to at least one of states of the plurality of power supply sources of each of the remaining power panels and arranged positions of the remaining power panels.

5. The method of claim 4, wherein the determining is configured to determine an available capacity of the battery power source of the plurality of power supply sources of each of the remaining power panels, so as to determine the supply priorities according to at least one of the determined available capacities and the arranged positions of the remaining power panels.

6. The method of claim 5, wherein the determining is configured to determine a degree by which the position of each of the remaining power panels is adjacent to the fault-occurred power panel, so as to determine the supply priorities based on at least one of the usable capacities and the determined adjacent degrees.

7. The method of claim 6, wherein the determining is configured to determine the supply priorities in the order of the available capacities when the supply priorities are determined based on the available capacities.

8. The method of claim 6, wherein the determining is configured to determine the supply priorities in the order of the adjacent degrees when the supply priorities are determined based on the adjacent degrees.

9. The method of claim 1, further comprising:
transmitting information related to reception and supply of the DC power to each of the determined fault-occurred power panel and the supply target power panel.

10. The method of claim 1, wherein the supplying the DC power is configured such that the fault-occurred power panel receives the DC power from the bus line, and the supply target power panel supplies the DC power from the second output end to the bus line.

11. The method of claim 1, further comprising:
replacing the supply target power panel when a fault has occurred in the supply target power panel which is supplying the DC power to the fault-occurred power panel,
wherein the replacing the supply target power panel comprises:
determining a supply replacement power panel to replace the supply target power panel according to the supply priorities;
opening a circuit breaker connected to the supply target power panel and closing a circuit breaker connected to the fault-occurred power panel and the supply replacement power panel; and
supplying the DC power from the supply replacement power panel to the fault-occurred power panel through the bus line.

12. A method for controlling a power supply system that comprises a plurality of power panels configured to convert power, which is supplied from each of a plurality of power supply sources including first and second Alternating-Current (AC) power sources supplying AC power and a battery power source storing DC power, into Direct-Current (DC) power, convert the DC power into driving power for driving loads, and supply the driving power to the loads, a bus line connected to power ends through which the DC power is input and output to and from the plurality of power panels, respectively, and second output ends separately provided from the power ends to output the DC power, such that the DC power converted in the plurality of power panels flows therealong, a plurality of first circuit breakers disposed between the power ends and the bus line, respectively, to control connection and disconnection between the power ends and the bus line, and a plurality of second circuit breakers disposed between the second output ends and the bus line, respectively, to control connection and disconnection between the second output ends and the bus line, the method comprising:
controlling operations of the plurality of power panels according to power supply states of the plurality of power panels, respectively;
determining a fault-occurred power panel among the plurality of power panels;
transmitting information related to reception and supply of the DC power to the determined fault-occurred power panel and a supply target power panel which is to supply the DC power to the fault-occurred power panel;
closing the first circuit breaker of the fault-occurred power panel and the second circuit breaker of the supply target power panel; and
supplying the DC power from the supply target power panel to the fault-occurred power panel through the bus line.

13. The method of claim 12, wherein the controlling the operations of the plurality of power panels is configured to receive power from the first AC power source and convert the received power into the DC power through a first conversion device receiving power from the first AC power source, when the first AC power source and the first conversion device are in a normal state.

14. The method of claim 13, wherein the controlling the operations of the plurality of power panels is configured to switch the first AC power source and the first conversion device into the second AC power source and a second conversion device receiving power from the second AC power source when a fault has occurred in at least one of the first AC power source and the first conversion device.

15. The method of claim 14, wherein the controlling the operations of the plurality of power panels is configured to receive power from the battery power source while the first AC power source and the first conversion device are switched into the second AC power source and the second conversion device, and convert the received power into the DC power through a second conversion device which receives power from the battery power source.

16. The method of claim 14, wherein the controlling the operations of the plurality of power panels is configured to receive power from the battery power source until power supply is restored, and convert the received power into the DC power through a second conversion device which receives power from the battery power source, when a fault has occurred in the at least one of the first AC power source and the first conversion device while the second circuit breaker is closed.

17. The method of claim 12, wherein the determining the fault-occurred power panel among the plurality of power panels comprises:
   detecting a state of at least one of the plurality of power panels;
   comparing a result of the detection with a preset state criterion; and
   determining a power panel, corresponding to the state criterion among the plurality of power panels according to a result of the comparison, as the fault-occurred power panel.

18. The method of claim 17, wherein the detecting is configured to detect a state of at least one of the plurality of power supply sources, a plurality of first conversion devices included in each of the plurality of power panels, and the DC power and the driving power of the plurality of power panels, and
   wherein the comparing is configured to compare the result of the detection with the state criterion including a fault criterion for the state of the plurality of power supply sources, the at least one of the plurality of first conversion devices, the DC power, and the driving power.

19. The method of claim 17, wherein the determining the fault-occurred power panel among the plurality of power panels is configured to determine a power panel, in which a fault has occurred in power supply of the first and second AC power sources among the plurality of power panels, as the fault-occurred power panel.

20. The method of claim 19, wherein the fault-occurred power panel is a power panel in which a fault has occurred in the first AC power source and the second AC power source and thus only the battery power source is allowed to supply power.

21. The method of claim 12, wherein the determining comprises:
   receiving fault occurrence information from the plurality of power panels; and
   determining a power panel which has transmitted the fault occurrence information as the fault-occurred power panel.

22. The method of claim 12, wherein the transmitting comprises:
   transmitting reception request information for receiving the DC power to the fault-occurred power panel; and
   transmitting supply request information for supplying the DC power to the supply target power panel.

23. The method of claim 12, wherein the supplying is configured such that the fault-occurred power panel receives the DC power from the bus line to the power end, and the supply target power panel supplies the DC power from the second output end to the bus line.

24. The method of claim 23, wherein the supplying is configured to switch the supply target power panel to another power panel and supply the DC power from the switched another power panel to the fault-occurred power panel, when the power supply through the first AC power source of the supply target power panel is interrupted.

25. The method of claim 24, wherein the supply target power panel receives power from the battery power source and converts the received power into the DC power while the supply target power panel is disconnected from the bus line and the power supply of the second AC power source is restored after the power supply of the first AC power source is interrupted.

26. The method of claim 24, wherein the another power panel converts power received from the second power source into the DC power and supplies the DC power to the bus line.

27. The method of claim 24, wherein the supplying is configured to disconnect the supply target power panel from the bus line by opening the second circuit breaker of the supply target power panel and connect the another power panel to the bus line by closing the second circuit breaker of the another power panel when switching the supply target power panel into the another power panel.

28. The method of claim 12, wherein the determining the fault-occurred power panel among the plurality of power panels is configured, when the fault-occurred power panel exists in plurality, such that each of the plurality of fault-occurred power panels receives power from the battery power source and converts the received power into the DC power while the first AC power source or the second AC power source is restored.

29. The method of claim 12, wherein the determining the fault-occurred power panel among the plurality of power panels is configured, when a fault has occurred in the battery power source of the fault-occurred power panel, such that the power panel in which the fault has occurred in the battery power source supplies power to the loads through an emergency power source supplying emergency power to the loads.

* * * * *